United States Patent
Bugenhagen et al.

(10) Patent No.: US 10,972,543 B2
(45) Date of Patent: *Apr. 6, 2021

(54) CUSTOMER BASED INTERNET OF THINGS (IOT)—TRANSPARENT PRIVACY FUNCTIONALITY

(71) Applicant: CenturyLink Intellectual Property LLC, Broomfield, CO (US)

(72) Inventors: Michael K. Bugenhagen, Leawood, KS (US); Charles I. Cook, Louisville, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/531,985

(22) Filed: Aug. 5, 2019

(65) Prior Publication Data

US 2019/0364112 A1 Nov. 28, 2019

Related U.S. Application Data

(63) Continuation of application No. 14/946,548, filed on Nov. 19, 2015, now Pat. No. 10,375,172.

(Continued)

(51) Int. Cl.
*H04L 29/08* (2006.01)
*H04L 29/06* (2006.01)

(52) U.S. Cl.
CPC ............. *H04L 67/12* (2013.01); *H04L 63/10* (2013.01); *H04L 67/2809* (2013.01)

(58) Field of Classification Search
CPC ...... H04L 67/12; H04L 67/2809; H04L 63/10
See application file for complete search history.

(56) References Cited

U.S. PATENT DOCUMENTS

| 5,717,955 A | 2/1998 | Swinehart |
| 6,125,291 A | 9/2000 | Miesel |

(Continued)

FOREIGN PATENT DOCUMENTS

| CN | 101799987 B | 11/2011 |
| KR | 10-2015-0128346 | 11/2015 |

(Continued)

OTHER PUBLICATIONS

International Preliminary Report on Patentability, dated Jul. 17, 2018, Int'l Appl. No. PCT/US16/067938, Int'l Filing Date Dec. 21, 2016, 8 pgs.

(Continued)

*Primary Examiner* — Shean Tokuta
*Assistant Examiner* — Juan C Turriate Gastulo

(57) ABSTRACT

Novel tools and techniques might provide for implementing customer-based Internet of Things ("IoT")—transparent privacy functionality. Various methods, systems, and apparatuses might provide connectivity between a network interface device ("NID") and each of one or more first user devices of a plurality of user devices associated with the customer premises and/or a user who is associated with the customer premises. In some cases, at least one virtual network function ("VNF") might be sent to each of the one or more first user devices. The NID might restrict, in some cases using the VNF, access by a third party to the information regarding the at least one portion of the at least one of one or more first user devices connected to the network or one or more applications running on one or more first user devices connected to the network.

18 Claims, 25 Drawing Sheets

Related U.S. Application Data

(60) Provisional application No. 62/196,090, filed on Jul. 23, 2015.

(56) References Cited

U.S. PATENT DOCUMENTS

| | | |
|---|---|---|
| 6,388,399 B1 | 5/2002 | Eckel |
| 6,792,319 B1 | 9/2004 | Bilger |
| 7,030,781 B2 | 4/2006 | Jones |
| 7,096,003 B2 | 8/2006 | Joao |
| 7,397,363 B2 | 7/2008 | Joao |
| 7,739,030 B2 | 6/2010 | Desai |
| 8,296,383 B2 | 10/2012 | Lindahl |
| 8,380,652 B1 | 2/2013 | Francis, Jr. |
| 8,654,936 B1 | 2/2014 | Eslambolchi et al. |
| 9,298,410 B2 | 3/2016 | Juchem |
| 9,432,340 B1 | 8/2016 | Tutt et al. |
| 9,456,276 B1 | 9/2016 | Chhetri |
| 9,460,618 B1 | 10/2016 | Soltesz |
| 9,536,425 B1 | 1/2017 | Soltesz |
| 9,646,480 B2 | 5/2017 | Fadell |
| 9,669,872 B2 | 6/2017 | Rebhan |
| 9,672,734 B1 | 6/2017 | Ratnasingam |
| 9,761,136 B2 | 9/2017 | Tonguz |
| 9,860,677 B1 | 1/2018 | Agerstam |
| 9,905,122 B2 | 2/2018 | Sloo |
| 9,917,903 B2 | 3/2018 | Clernon |
| 10,069,751 B2 | 9/2018 | Amulothu |
| 10,253,468 B1 | 4/2019 | Linville |
| 2001/0029311 A1 | 10/2001 | Khare |
| 2002/0024450 A1 | 2/2002 | Townsend |
| 2003/0061029 A1 | 3/2003 | Shaket |
| 2004/0083054 A1 | 4/2004 | Jones |
| 2004/0091313 A1 | 5/2004 | Zhou |
| 2004/0113773 A1 | 6/2004 | Nieters |
| 2004/0142658 A1 | 7/2004 | McKenna |
| 2004/0160319 A1 | 8/2004 | Joao |
| 2005/0248444 A1 | 11/2005 | Joao |
| 2006/0041761 A1* | 2/2006 | Neumann ............... G06F 21/33 713/189 |
| 2006/0150644 A1 | 7/2006 | Wruck |
| 2006/0219382 A1 | 10/2006 | Johnson |
| 2007/0048084 A1 | 3/2007 | Jung |
| 2007/0079113 A1 | 4/2007 | Kulkarni et al. |
| 2008/0197204 A1 | 8/2008 | Whitney |
| 2008/0216367 A1 | 9/2008 | Van der Poel |
| 2008/0234878 A1 | 9/2008 | Joao |
| 2008/0256008 A1 | 10/2008 | Kwok |
| 2008/0300776 A1 | 12/2008 | Petrisor |
| 2008/0303654 A1 | 12/2008 | Kates |
| 2009/0121860 A1 | 5/2009 | Kimmel |
| 2009/0125160 A1 | 5/2009 | Desai |
| 2009/0134993 A1 | 5/2009 | Ashworth |
| 2009/0327910 A1 | 12/2009 | Black |
| 2010/0045484 A1 | 2/2010 | Brynielsson |
| 2010/0124332 A1 | 5/2010 | Arena |
| 2010/0217604 A1 | 8/2010 | Baldwin et al. |
| 2010/0325421 A1 | 12/2010 | Park et al. |
| 2011/0106321 A1 | 5/2011 | Cherian |
| 2011/0161076 A1 | 6/2011 | Davis |
| 2011/0288684 A1 | 11/2011 | Farlow |
| 2012/0086563 A1 | 4/2012 | Arling |
| 2012/0249341 A1 | 10/2012 | Brown |
| 2012/0265370 A1 | 10/2012 | Kim |
| 2013/0009569 A1 | 1/2013 | Knibbe |
| 2013/0038461 A1 | 2/2013 | Hawkes |
| 2013/0074067 A1* | 3/2013 | Chowdhry ............. G06F 9/485 718/1 |
| 2013/0138424 A1 | 5/2013 | Koenig |
| 2013/0217421 A1 | 8/2013 | Kim |
| 2013/0238326 A1 | 9/2013 | Kim et al. |
| 2013/0297199 A1 | 11/2013 | Kapp |
| 2014/0018969 A1 | 1/2014 | Forbes |
| 2014/0033288 A1 | 1/2014 | Wynn |
| 2014/0146905 A1 | 5/2014 | Zavadsky |
| 2014/0167931 A1 | 6/2014 | Lee et al. |
| 2014/0180478 A1 | 6/2014 | Letsky |
| 2014/0188463 A1 | 7/2014 | Noh et al. |
| 2014/0257693 A1 | 9/2014 | Ehlers |
| 2014/0275852 A1 | 9/2014 | Hong |
| 2014/0343950 A1 | 11/2014 | Simpson et al. |
| 2015/0097686 A1 | 4/2015 | Fadell |
| 2015/0100167 A1 | 4/2015 | Sloo |
| 2015/0187200 A1 | 7/2015 | Fadell |
| 2015/0249672 A1* | 9/2015 | Burns .................. G06F 21/629 726/4 |
| 2015/0262102 A1 | 9/2015 | Tann |
| 2015/0298654 A1 | 10/2015 | Joao |
| 2015/0350247 A1 | 12/2015 | Adler et al. |
| 2015/0365278 A1 | 12/2015 | Chakrabarti et al. |
| 2016/0021127 A1 | 1/2016 | Yan |
| 2016/0029346 A1 | 1/2016 | Suresh et al. |
| 2016/0063857 A1 | 3/2016 | Fowe |
| 2016/0064829 A1 | 3/2016 | Schaepperle |
| 2016/0080322 A1 | 3/2016 | Prisser |
| 2016/0085594 A1* | 3/2016 | Wang .................. G06F 9/5077 709/226 |
| 2016/0093213 A1 | 3/2016 | Rider |
| 2016/0187995 A1 | 6/2016 | Rosewall |
| 2016/0195876 A1 | 7/2016 | Mattsson |
| 2016/0212012 A1 | 7/2016 | Young |
| 2016/0212613 A1 | 7/2016 | Huang |
| 2016/0226674 A1 | 8/2016 | Kangshang et al. |
| 2016/0248746 A1 | 8/2016 | James |
| 2016/0255086 A1* | 9/2016 | Vajravelu ............. H04L 63/101 726/4 |
| 2016/0267790 A1 | 9/2016 | Raamot |
| 2016/0277310 A1* | 9/2016 | Challa .................. H04L 67/10 |
| 2016/0278599 A1 | 9/2016 | Seo |
| 2016/0294828 A1* | 10/2016 | Zakaria ................. H04W 4/70 |
| 2016/0295364 A1 | 10/2016 | Zakaria |
| 2016/0323271 A1 | 11/2016 | Hinman |
| 2016/0329040 A1 | 11/2016 | Whinnery |
| 2016/0330042 A1 | 11/2016 | Andersen |
| 2016/0352526 A1 | 12/2016 | Adler et al. |
| 2016/0359965 A1 | 12/2016 | Murphy et al. |
| 2016/0381030 A1* | 12/2016 | Chillappa ............. H04W 4/70 726/11 |
| 2017/0006141 A1 | 1/2017 | Bhadra |
| 2017/0006643 A1 | 1/2017 | Zakaria et al. |
| 2017/0026157 A1 | 1/2017 | Bugenhagen et al. |
| 2017/0026472 A1 | 1/2017 | Bugenhagen et al. |
| 2017/0060369 A1 | 3/2017 | Goyal |
| 2017/0083005 A1 | 3/2017 | Hickman |
| 2017/0093866 A1 | 3/2017 | Ben-Noon |
| 2017/0110784 A1 | 4/2017 | Vermes et al. |
| 2017/0134937 A1 | 5/2017 | Miller |
| 2017/0141575 A1 | 5/2017 | Fulton |
| 2017/0171747 A1 | 6/2017 | Britt et al. |
| 2017/0176034 A1 | 6/2017 | Hussain |
| 2017/0181383 A1 | 6/2017 | Shen |
| 2017/0187807 A1 | 6/2017 | Clernon |
| 2017/0192437 A1 | 7/2017 | Bier |
| 2017/0195318 A1 | 7/2017 | Liu |
| 2017/0201504 A1 | 7/2017 | Funk |
| 2017/0206900 A1 | 7/2017 | Lee et al. |
| 2017/0229004 A1 | 8/2017 | Shah |
| 2017/0237815 A1* | 8/2017 | Arsenault ........... H04L 12/4633 709/217 |
| 2017/0253258 A1 | 9/2017 | Bramucci |
| 2017/0274898 A1 | 9/2017 | Nakamura |
| 2017/0279620 A1 | 9/2017 | Kravitz et al. |
| 2017/0300953 A1 | 10/2017 | Kim |
| 2017/0345295 A1 | 11/2017 | Mattar |
| 2017/0345420 A1 | 11/2017 | Barnett, Jr. |
| 2017/0358025 A1 | 12/2017 | Varma |
| 2017/0371337 A1 | 12/2017 | Ramasamy |
| 2018/0040172 A1 | 2/2018 | Funk |
| 2018/0062691 A1 | 3/2018 | Barnett, Jr. |
| 2018/0084596 A1 | 3/2018 | Schwengler et al. |
| 2018/0103579 A1 | 4/2018 | Grufman |
| 2018/0113450 A1 | 4/2018 | Sherony |
| 2018/0122506 A1 | 5/2018 | Grantcharov |
| 2018/0132227 A1 | 5/2018 | Ghosh |

(56) References Cited

U.S. PATENT DOCUMENTS

| | | |
|---|---|---|
| 2018/0168464 A1 | 6/2018 | Barnett, Jr. et al. |
| 2018/0174449 A1 | 6/2018 | Nguyen |
| 2018/0178781 A1 | 6/2018 | Funk et al. |
| 2018/0181091 A1 | 6/2018 | Funk et al. |
| 2018/0181094 A1 | 6/2018 | Funk et al. |
| 2018/0181095 A1 | 6/2018 | Funk et al. |
| 2018/0183685 A1 | 6/2018 | Cook |
| 2018/0183874 A1 | 6/2018 | Cook |
| 2018/0188704 A1 | 7/2018 | Cella |
| 2018/0299290 A1 | 10/2018 | Slavin |
| 2018/0370567 A1 | 12/2018 | Rowell |
| 2018/0374347 A1 | 12/2018 | Silver |
| 2019/0028134 A1 | 1/2019 | Barnett, Jr. |
| 2019/0035269 A1 | 1/2019 | Donovan |
| 2019/0049994 A1 | 2/2019 | Pohl |
| 2019/0073899 A1 | 3/2019 | Radomy |
| 2019/0106099 A1 | 4/2019 | Funk et al. |

FOREIGN PATENT DOCUMENTS

| | | |
|---|---|---|
| WO | WO-2009098676 | 8/2009 |
| WO | WO-2013058648 | 4/2013 |
| WO | WO-2017123392 | 7/2017 |

OTHER PUBLICATIONS

International Preliminary Report on Patentability, dated Nov. 27, 2018, Int'l Appl. No. PCT/US17/034531, Int'l Filing Date May 25, 2017; 15 pgs.

International Search Report and Written Opinion prepared by the Korean Intellectual Property Office as International Searching Authority for PCT Intl Patent App. No. PCT/US2016/067938 dated Mar. 31, 2017; 11 pages.

International Search Report and Written Opinion prepared by the Korean Intellectual Property Office as Internationalo Searching Authority for PCT International Patent Application No. PCT/US2017/034531 dated Aug. 29, 2017; 18 p.

Alexander, Chris et al., "Improved User Authentication in Off-The-Record Messaging", 2009, 7 pgs.

Bersch, Christian et al., "Bimanual Robotic Cloth Manipulation for Laundry Folding", 2011, 7 pgs.

Borisov, Nikita et al., "Off-the-Record Communication, or, Why Not to Use PGP", 2004, 8 pgs.

De Raimondo, Mario et al., "Secure Off-the-Record Messaging", 2005, 9 pgs.

Goldberg, Ian et al., "Multi-party Off-the-Record Messaging", 2007, 11 pgs.

Stedman, Ryan et al., "A User Study of Off-the-Record Messaging", 2008, pp. 1-10.

* cited by examiner

CUSTOMER BASED INTERNET OF THINGS (IOT)—TRANSPARENT PRIVACY FUNCTIONALITY

CROSS REFERENCE TO RELATED APPLICATIONS

This application is a continuation application of U.S. patent application Ser. No. 14/946,548 (the "'548 application"), filed Nov. 19, 2015 by Michael K. Bugenhagen and titled, "Customer Based Internet of Things (IOT)—Transparent Privacy Functionality", which claims priority to U.S. Patent App. No. 62/196,090 (the "'090 application"), filed Jul. 23, 2015 by Michael K. Bugenhagen and titled, "Customer Based Internet of Things (IOT)—Transparent Privacy Functionality".

This application may be related to U.S. patent application Ser. No. 14/946,540, filed on a date even herewith by Michael K. Bugenhagen and titled, "Customer Based Internet of Things (IOT)", which claims priority to U.S. Patent Application Ser. No. 62/196,086 (the "'086 application"), filed Jul. 23, 2015 by Michael K. Bugenhagen et al. and titled, "Customer Based Internet of Things (IOT)".

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and computer software for implementing Internet of Things ("IoT") functionality, and, in particular embodiments, to methods, systems, and computer software for implementing customer-based IoT and/or implementing customer-based IoT—transparent privacy functionality.

BACKGROUND

Customers are not information technology ("IT") experts, and software changes every 1-3 years to the extent that no one has the ability to keep up with the change. This, however, does not count all the issues of getting new and/or rotating home devices "plugged into" a network or computer platform/system.

The result of "churn" in Internet of things ("IoT") devices—which might include, without limitation, compute and other Internet protocol ("IP") talking device, and/or the like—and IoT providers (and/or associated IoT applications) is problematic for customers to manage.

With IoT, providers gain added information on how customers use their devices, and in fact what devices the customers own—either of which are "sellable" data. However, there are currently no systems that allow the customers to indicate what IoT connected devices they want to be made public or private.

Hence, there is a need for more robust and scalable solutions for implementing Internet of Things ("IoT") functionality, and, in some cases, for implementing customer-based IoT and/or implementing customer-based IoT—transparent privacy functionality.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
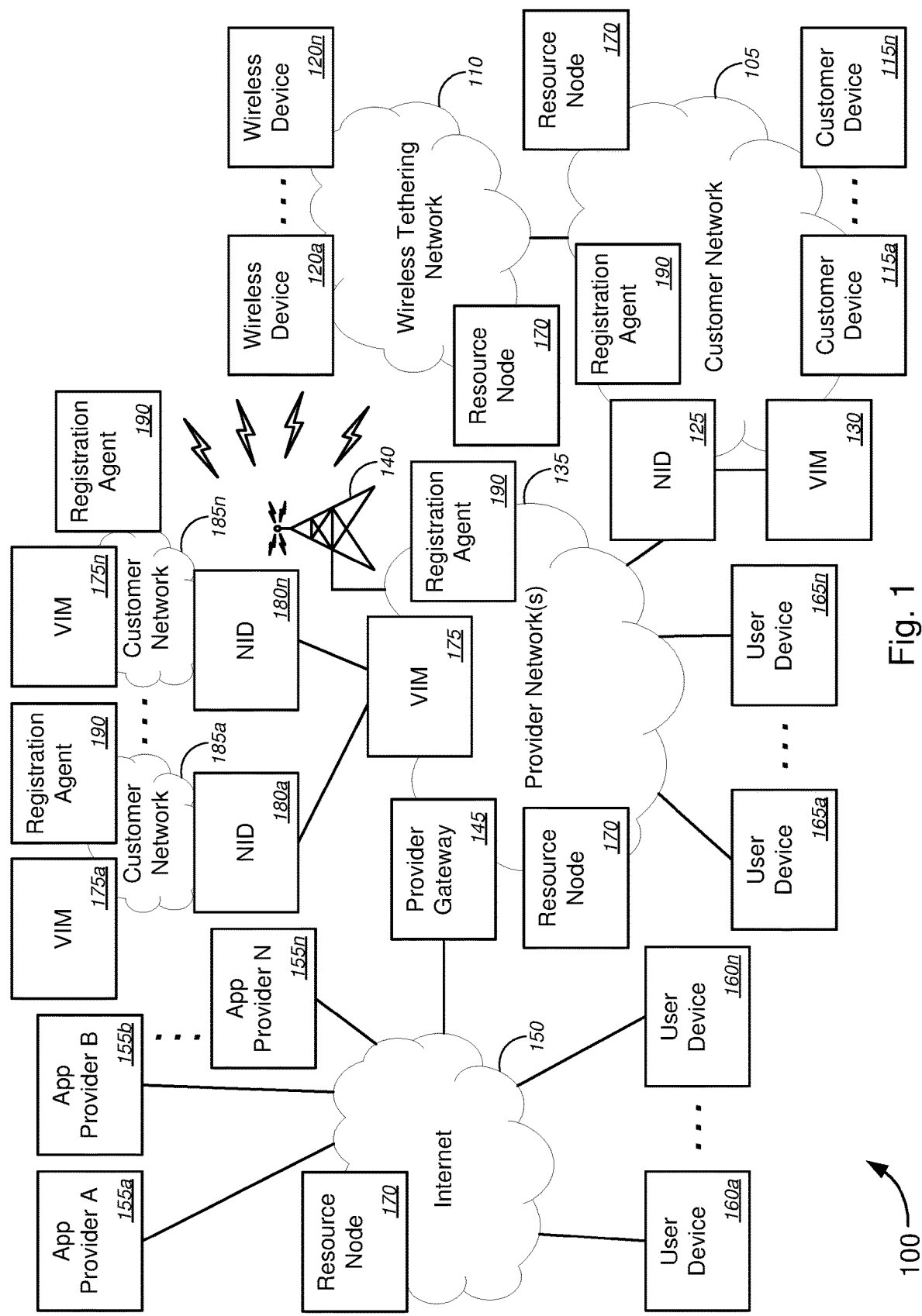
FIG. 1 is a schematic diagram illustrating a system for implementing customer-based IoT functionality, in accordance with various embodiments.

Various embodiments provide techniques for implementing Internet of Things ("IoT") functionality, and, in some cases, for implementing customer-based IoT functionality and/or implementing customer based IoT—transparent privacy functionality.

With the advent of Network Functions Virtualization ("NFV"), providers now have the capability of "mapping" a resource on, or that connect to, the "network interface device" ("NID"), which in turn connects the resource to applications that are resident on the NID, or further up in the network. Therefore, an "application" provided by the "access provider" that allows the customer to map and control available resources in their network to applications either provided by the provider, or owned by the customer, and hides the complexity becomes a valuable proposition.

In some embodiments, a virtual infrastructure manager ("VIM") is provided that manages the resources that a virtual machine ("VM") is allowed to connect to, as well as managing the connectivity of these resources. In these embodiments, the customer is provided the capability to register his or her own devices with the provider VIM in order for the provider to let the customer set policies or rules (with regard to access, mapping, etc.) of that device to the IoT and with respect to other applications.

According to some embodiments, each NID might be registered to a customer. Each device might then be registered as a "customer assignable resource," for example, in the customer's customer portal. When a customer downloads (and/or installs) an application, the virtual machine and application are associated and/or registered, e.g., in the customer portal. At this point, the orchestrator customer portal might simply control the device and application connectivity via a graphical user interface ("GUI") that shows the customer what he or she can "map" and allow together, in some cases, via drag and drop functionality, line-to-line GUI conventions functionality, and/or the like. The customer is provided functionalities (via user interfaces) to assign and/or change access, mapping, and other associated/related matters relating to the VM, application, and/or devices, or the like. For the purposes of this convention, there could be "zones" or multiple groups versus a single connectivity group that allow the customer to isolate applications and/or devices from the Internet, and that provide the customer with his or her own virtual private network ("VPN") and/or network. It should be assumed that when a new device or application registers itself to a customer GUI, the GUI and/or the system might signal the customer via an e-mail, GUI visual indicator, a "push"-type notification methodology, or other form of communication or notification, and/or the like.

In some embodiments, maintenance services—including, without limitation, trouble shooting by the Application owner—might be provided. Certain "home network troubleshooting" packages will be provided by the service provider to help manage customer experience remotely via an "orchestrator operations portal" that is strictly maintained and monitored by the service provider. Common Group Based Policy ("GBP") is also a property the customer may have control of as part of the definition (e.g., right click access) to applications and devices. This policy includes multiple levels of access rights involved in this system, for example: (1) only lets them examine their own application and attached resources; (2) enables them to see all resources registered to the NID and map those (change customer mapping, etc.); and (3) enables the broader access to the NID.

This concept is a hybridization of placing virtual applications on a customer's modem, cell phone, etc., or hosting virtual applications in a network device in the network, whereby the customer is allowed to attach his or her own home network devices to the modem, and then map what devices are given access to what application(s), and vice versa, in a more automated and secure fashion.

Currently, virtual network function as a service ("VN-FaaS") is the common industry solution. The embodiments described herein take that Apple iTunes store or Android market application and add the ability to securely map applications via the customer portal, which is an IoT function, but normally also controlled by the provider.

In one example, the framework might support "application functions" that are used or implemented by third party providers, such as alarm monitoring companies, home medical care services, and other remote monitoring and/or remote service companies, or the like. In these cases, the various embodiments might enable authentication of the third party application, as well as allowing the customers to register their devices to the third party service via the customer GUI. In some cases, a service provider can make a wireless app for implementing these functionalities. In some instances, the various embodiments may be implemented as a framework with a customer portal.

With having added exposure to customer information via IoT, it is foreseeable that that information is of value to sellers. Most sellers get "chunks" of this information and spend significant amounts of money doing so. The true value of these are generally gaining information on what the customer has or does. This is partially agreeable to most customers, but not all. To this extent, the providers should make tools to allow the customers to "set" what level of privacy they want concerning information that can be obtained through implementation of IoT functionality.

The various embodiments allow for two levels: (1) what IoT devices and/or apps does a customer have; and (2) how do they use them (e.g., usage and trend tracking); and/or the like. The system and apparatus of the various embodiments provide the customer with functionality, options, and/or capability to control who can see these types of information and who are blocked from seeing such information. In this manner, the customer is given full transparency into IoT functionality and privacy settings implementation.

The '086 and '090 applications (which are already incorporated herein by reference in their entirety) describe implementing customer-based IoT functionality. The IoT functionality may utilize network functions virtualization ("NFV") functionality, which are described in detail in U.S. patent application Ser. No. 14/678,208 (the "'208 application"), filed Apr. 3, 2015 by Michael J. Fargano et al., entitled, "Network Functions Virtualization Interconnection Gateway," U.S. patent application Ser. No. 14/678,280 (the "'280 application"), filed Apr. 3, 2015 by Michael J. Fargano et al., entitled, "Network Functions Virtualization Interconnection Hub," and U.S. patent application Ser. No. 14/678,309 (the "'309 application"), filed Apr. 3, 2015 by Michael J. Fargano et al., entitled, "Customer Environment Network Functions Virtualization (NFV), which each claim priority to U.S. Patent Application Ser. No. 61/974,927 (the "'927 application"), filed Apr. 3, 2014 by Michael J. Fargano, entitled, "Network Functions Virtualization Interconnection Gateway," U.S. Patent Application Ser. No. 61/974,930 (the "'930 application"), filed Apr. 3, 2014 by Michael J. Fargano, entitled, "Network Functions Virtualization Interconnection Hub," U.S. Patent Application Ser. No. 61/976,896 (the "'896 application"), filed Apr. 8, 2014 by Michael J. Fargano, entitled, "Customer Environment Network Functions Virtualization (NFV)," and to U.S. Patent Application Ser. No. 61/977,820 (the "'820 application"), filed Apr. 10, 2014 by Michael J. Fargano, entitled, "Customer Environment Network Functions Virtualization (NFV)," the disclosures of each of these applications being incorporated herein by reference in their entirety for all purposes. The IoT functionality may also utilize NFV functionality and other functionalities for implementing remote access of applications, as described in detail in U.S. patent application Ser. No. 14/730,695 (the "'695 application"), filed Jun. 4, 2015 by Charles I. Cook et al., entitled, "Remoting Application Servers," which claims priority to U.S. patent application Ser. No. 62/037,096 (the "'096 application"), filed Aug. 13, 2014 by Charles I. Cook et al., entitled, "Remoting Application Servers," the disclosures of each of which being incorporated herein by reference in their entirety for all purposes.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various embodiments described herein, while embodying (in some cases) software products, computer-performed methods, and/or computer systems, represent tangible, concrete improvements to existing technological areas, including, without limitation, network communications technology, network virtualization technology, network configuration technology, application access technology, remote application access technology, device access technology, remote device access technology, and/or the like. In other aspects, certain embodiments, can improve the functioning of a computer or network system itself (e.g., computing devices or systems that form parts of the network, computing devices or systems for performing the functionalities described below, etc.), for example, by enabling more robust access and mapping within an Internet of Things ("IoT") platform by user devices and/or user network devices, enabling access provision and/or restriction of devices and/or information about the devices in the IoT network by third parties, and/or the like. In particular, to the extent any abstract concepts are present in the various embodiments, those concepts can be implemented as described herein by devices, software, systems, and methods that involve specific novel functionality (e.g., steps or operations), such as implementing remote management of IoT device access and mapping within the network(s) to which the device is connected, implementing remote management of access provision and/or restriction of IoT devices and/or information about the devices by third parties, and/or the like, to name a few examples, that extend beyond mere conventional computer processing operations. These functionalities can produce tangible results outside of the implementing computer system, including, merely by way of example, ability to allow/deny access to particular IoT devices in the network(s) to which the device is connected, ability to allow/deny access to information about particular IoT devices in the network(s) to which the device is connected, ability to map such devices within such networks, and/or the like, any of which may be observed or measured by customers and/or service providers.

In an aspect, a method might comprise providing, with a network interface device ("NID") serving as a demarcation point between a local area network ("LAN") at a customer premises and a service provider network, connectivity between the NID and each of one or more first user devices of a plurality of user devices associated with at least one of the customer premises or a user who is associated with the customer premises. The method might also comprise providing a customer with a user interface to select privacy settings for Internet of Things ("IoT")-connected devices in a network and receiving, via the user interface, user selections for privacy settings for at least one of one or more first user devices connected to the network or one or more applications running on one or more first user devices connected to the network. The method might further comprise, in response to determining that the received user selections comprise a selection to restrict access to information regarding at least one portion of the at least one of one or more first user devices connected to the network or one or more applications running on one or more first user devices connected to the network, restricting, with the NID, access by a third party to the information regarding the at least one portion of the at least one of one or more first user devices connected to the network or one or more applications running on one or more first user devices connected to the network.

In some embodiments, the method might further comprise sending, with the NID, at least one virtual network function ("VNF") or application on a virtual machine (hereinafter, collectively or individually referred to as a "VNF") to each of the one or more first user devices via the LAN, the at least one VNF comprising a device identifier and a LAN device interconnection VNF. In such embodiments, restricting, with the NID, access by a third party to the information regarding the at least one portion of the at least one of one or more first user devices connected to the network or one or more applications running on one or more first user devices connected to the network might comprise restricting, with the NID and using the at least one VNF sent to each of the one or more first user devices, access by a third party to the information regarding the at least one portion of the at least one of one or more first user devices connected to the network or one or more applications running on one or more first user devices connected to the network.

Merely by way of example, the user interface might comprise a user interface displayed on at least one first user device of the one or more first user devices, a user interface displayed on at least one second user device of the plurality of user devices associated with at least one of the customer premises or the user who is associated with the customer premises, a user interface displayed on a web portal associated with the NID, a user interface displayed on a web portal associated with a service provider associated with the service provider network, and/or the like. In some cases, the third party might comprise at least one of a service provider, who is associated with one of an application ("app") or a VNF that is running on the one or more of the plurality of user devices, or a party that is unassociated with the app or the VNF, and/or the like.

According to some embodiments, the method might further comprise, based on a determination that the received user selections comprise a selection to set to privacy settings to private for one of a software application ("app") or a VNF that is running on one or more of the plurality of user devices, restricting, with the NID, a third party from at least one of: access to the one of the app or the VNF that is running on the one or more of the plurality of user devices; access to information regarding resources mapped to the one or more of the plurality of user devices on which the one of the app or the VNF that is running; access to information regarding all resources registered to the NID that are mapped to the one or more of the plurality of user devices; access to information regarding all resources registered to the NID; access to the resources mapped to the one or more of the plurality of user devices on which the one of the app or the VNF that is running; access to all resources registered to the NID that are mapped to the one or more of the plurality of user devices; access to the NID; and/or the like.

Alternatively, in some instances, the method might further comprise, based on a determination that the received user selections comprise a selection to set to privacy settings to public for one of a software application ("app") or a VNF that is running on one or more of the plurality of user devices, providing, with the NID, a third party with at least one of: access to the one of the app or the VNF that is running on the one or more of the plurality of user devices; access to information regarding resources mapped to the one or more of the plurality of user devices on which the one of the app or the VNF that is running; access to information regarding all resources registered to the NID that are mapped to the one or more of the plurality of user devices; access to information regarding all resources registered to the NID; access to the resources mapped to the one or more of the plurality of user devices on which the one of the app or the VNF that is running; access to all resources registered to the NID that are mapped to the one or more of the plurality of user devices; access to the NID; and/or the like.

In some embodiments, the privacy settings for at least one of one or more user devices connected to the network or one or more applications running on one or more user devices connected to the network comprise at least one of: option to allow or deny third party general access; option to allow or deny third party selective access to information about device type of at least one user device of the one or more user devices; option to allow or deny third party selective access to information about use of at least one user device of the one or more user devices; option to allow or deny third party selective access to information about one or more applications running on at least one user device of the one or more user devices; option to allow or deny third party selective access to information about one or more NFVs running on at least one user device of the one or more user devices; option to allow or deny third party selective access to information about types of resource usage on at least one user device of the one or more user devices; option to allow or deny third party selective access to information about amount of resource use on at least one user device of the one or more user devices; and/or the like.

According to some embodiments, the method might further comprise receiving, via the user interface, user selections for privacy settings for the NID, wherein the privacy settings for the NID comprises at least one of: option to allow or deny third party general access; option to allow or deny third party selective access to information about device type of at least one user device of the one or more user devices that is mapped to the NID; option to allow or deny third party selective access to information about use of at least one user device of the one or more user devices that is mapped to the NID; option to allow or deny third party selective access to information about one or more applications running on at least one user device of the one or more user devices that is mapped to the NID; option to allow or deny third party selective access to information about one or more NFVs running on at least one user device of the one or more user devices that is mapped to the NID; option to allow or deny third party selective access to information about types of resource usage on at least one user device of the one or more user devices that is mapped to the NID; option to allow or deny third party selective access to information about amount of resource use on at least one user device of the one or more user devices that is mapped to the NID; option to allow or deny third party selective access to information about device types of all devices in the LAN; option to allow or deny third party selective access to information about use of all devices in the LAN; option to allow or deny third party selective access to information about one or more applications running on all devices in the LAN; option to allow or deny third party selective access to information about one or more VNF running on all devices in the LAN; option to allow or deny third party selective access to information about types of resource usage on all devices in the LAN; option to allow or deny third party selective access to information about amount of resource use on all devices in the LAN; and/or the like.

The NID, in some cases, might comprise at least one of an optical network terminal ("ONT"), a residential gateway ("RG") device, a business gateway ("BG") device, or a virtual gateway ("vG") device, and/or the like. According to some embodiments, the plurality of user devices might comprise one or more of a desktop computer, a laptop computer, a tablet computer, a smart phone, a mobile phone, a personal digital assistant, a printer, a scanner, a data storage device, a network access point ("NAP"), a television, a set-top box, an image capture device, an image projection device, a video capture device, a video projection device, a watch, a clock, a gaming console, a thermostat, a kitchen appliance, a medical device, a vehicle, a speaker, an audio headset, a telephone system, a media recording device, a media playback device, a lighting system, a sensing device, a door locking system, a customer premises security control system, a window locking system, a window covering system, or a sprinkler system, and/or the like. The customer premises might comprise at least one of an Internet of things ("IoT") local environment, a customer residential premises, a multi-dwelling unit, a short-term lodging facility, a customer commercial premises, or a customer business premises, and/or the like.

In some cases, providing connectivity between the NID and each of the one or more first user devices of the plurality of user devices associated with at least one of the customer premises or the user who is associated with the customer premises might comprise determining, with the NID, whether at least one second user device of the one or more first user devices is associated with at least one of the customer premises or the user who is associated with the customer premises; authenticating, with the NID, each of the at least one second user device of the one or more first user devices as being associated with at least one of the customer premises or the user who is associated with the customer premises, based at least in part on a determination that each of the at least one second user device of the one or more first user devices is associated with at least one of the customer premises or the user who is associated with the customer premises; and providing, with the NID, connectivity between the NID and each of the at least one second user device, in response to authenticating each of the at least one of the one or more user devices.

The method, in some instances, might further comprise associating, with the NID, each of the one or more first user devices, prior to sending the at least one VNF to each of the one or more first user devices. Associating each of the one or more first user devices, in some cases, might comprise receiving, with the NID and from the at least one third user device of the plurality of user devices, a user request to associate each of the one or more first user devices with the NID and associating, with the NID, each of the one or more first user devices based at least in part on the user request to associate each of the one or more first user devices with the NID. Alternatively, associating each of the one or more first user devices might comprise determining, with the NID, whether at least one second user device of the one or more first user devices is connected to the LAN for the first time and automatically associating, with the NID, each of the at least one second user device in response to a determination that at least one second user device is connected to the LAN for the first time.

The method, in some cases, might further comprise registering, with at least one of the NID or a network device in the service provider network, each of the one or more first user devices, prior to sending the at least one VNF to each of the one or more first user devices. Registering each of the one or more first user devices, in some cases, might comprise receiving, with at least one of the NID or the network device in the service provider network and from the at least one third user device of the plurality of user devices, a user request to register each of the one or more first user devices with the NID and registering, with at least one of the NID or the network device in the service provider network, each of the one or more first user devices based at least in part on the user request to register each of the one or more first user devices with the NID. Alternatively, registering each of the one or more first user devices might comprise determining, with at least one of the NID or the network device in the service provider network, whether at least one second user device of the one or more first user devices is connected to at least one of the LAN or the service provider network for the first time and automatically registering, with at least one of the NID or the network device in the service provider network, each of the at least one second user device in response to a determination that at least one second user device is connected to at least one of the LAN or the service provider network for the first time.

According to some embodiments, the first user input is received via a user interface that comprises a web portal. Alternatively, or additionally, in some instances, the first user input is received via a user interface that comprises a software application ("app") running on the at least one third user device.

In some instances, the method might further comprise sending, with the NID, one or more VNFs to at least one network device in the service provider network that is accessible via one of LAN-to-network service chaining or network-to-LAN service chaining, each of the one or more VNFs comprising a device identifier and a LAN device interconnection VNF. In some cases, the at least one VNF and the one or more VNFs are the same VNFs, and the same VNFs are split between the one or more first user devices, which are in the LAN, and the at least one network device in the service provider network.

The method might further comprise mapping, with a virtual infrastructure manager ("VIM") that is communicatively coupled to the NID, each of the one or more first user devices with each of one or more second user devices of the plurality of user devices associated with at least one of the customer premises or the user who is associated with the customer premises, and with each resource node of a plurality of resource nodes in communication with the NID, based at least in part on first user input received via at least one third user device of the plurality of user devices.

The plurality of resource nodes might, in some cases, comprise at least one of one or more internal resource nodes or one or more external resource nodes, each resource node comprising at least one of compute resources, memory resources, data storage resources, network communication resources, security resources, or hardware resources, and/or the like. In some instances, the one or more internal resource nodes might each comprise one of the plurality of user devices associated with at least one of the customer premises or a user who is associated with the customer premises, and/or the like. In some cases, the one or more external resource nodes might each comprise one of a cloud computing resource or a service provider network resource, wherein the cloud computing resource and the service provider network resource each comprises at least one of a network-based hardware resource, a network-based compute resource, a network-based memory resource, a network-based data storage resource, a network-based network communication resource, a network-based security resource, a network-based VNF as a service ("VNFaaS") resource, or a network-based application resource.

According to some embodiments, the method might further comprise determining, with the VIM, the type and amount of resources required by each of the one or more first user devices to each perform one or more functions and determining, with the VIM, which of the resource nodes of the plurality of resource nodes in communication with the NID possess desired types and amount of resources that are determined to be required. The method might further comprise allocating, with the VIM, resources to each of the one or more first user devices based at least in part on the determined type and amount of resources required by each of the one or more first user devices to each perform the one or more functions, based at least in part on the determined resource nodes having the desired types and amount of resources determined to be required, and based at least in part on the mapping of each of the one or more first user devices with each of the one or more second user devices and with each resource node. In some instances, allocating resources to each of the one or more first user devices is further based on second user input received via the at least one third user device of the plurality of user devices. In some cases, the second user input indicates at least one of access permissions for one or more of the plurality of user devices associated with at least one of the customer premises or the user who is associated with the customer premises, or resource usage permissions for the one or more of the plurality of user devices associated with at least one of the customer premises or the user who is associated with the customer premises. According to some embodiments, the VIM might be one of located in the LAN, located in the service provider network, or split between the LAN and the service provider network.

In some embodiments, the IoT network may be expanded by bridging multiple NIDs together. For example, an extended family might elect to connect their IoT networks together, despite being geographically separate. In some cases, a business with multiple locations might choose to connect the IoT networks of the separate multiple locations together into an integrated IoT network. In other cases, multiple communities in a city or town might elect to connect the IoT networks of the separate communities together into an integrated city-wide or town-wide IoT network. To achieve these expanded IoT networks, the method, in some embodiments, might further comprise bridging the NID with one or more second NIDs that are communicatively coupled to the service provider network. The method might also comprise mapping, with the VIM, each of the one or more first user devices with each of the one or more second user devices of the plurality of user devices associated with at least one of the customer premises or the user who is associated with the customer premises, with each resource node of a plurality of resource nodes in communication with the NID, with each of one or more fifth user devices associated with at least one second customer premises that is separate from the customer premises, and with each resource node of a plurality of second resource nodes in communication with at least one second NID of the one or more second NIDs.

In another aspect, a system might comprise a network interface device ("NID") serving as a demarcation point between a local area network ("LAN") at a customer premises and a service provider network. The NID might comprise at least one first processor and a first non-transitory computer readable medium in communication with the at least one first processor. The first non-transitory computer readable medium might have encoded thereon computer software comprising a first set of instructions that, when executed by the at least one first processor, causes the NID to perform one or more operations. The first set of instructions might comprise instructions for providing connectivity between the NID and each of one or more first user devices of a plurality of user devices associated with at least one of the customer premises or a user who is associated with the customer premises and instructions for, in response to determining that user selections that are received, via a user interface that is provided to a customer to select privacy settings for Internet of Things ("IoT")-connected devices in a network, comprise a selection to restrict access to information regarding at least one portion of at least one of one or more first user devices connected to the network or one or more applications running on one or more first user devices connected to the network, restricting access by a third party to the information regarding the at least one portion of the at least one of one or more first user devices connected to the network or one or more applications running on one or more first user devices connected to the network.

In some embodiments, the first set of instructions might further comprise instructions for sending at least one virtual network function ("VNF") to each of the one or more first user devices via the LAN, the at least one VNF comprising a device identifier and a LAN device interconnection VNF. The instructions for restricting access by a third party to the information regarding the at least one portion of the at least one of one or more first user devices connected to the network or one or more applications running on one or more first user devices connected to the network might comprise instructions for restricting, using the at least one VNF sent to each of the one or more first user devices, access by a third party to the information regarding the at least one portion of the at least one of one or more first user devices connected to the network or one or more applications running on one or more first user devices connected to the network.

In yet another aspect, a network interface device ("NID") might be provided that serves as a demarcation point between a local area network ("LAN") at a customer premises and a service provider network. The NID might comprise at least one processor and a non-transitory computer readable medium in communication with the at least one processor. The computer readable medium might have encoded thereon computer software comprising a set of instructions that, when executed by the at least one processor, causes the NID to perform one or more operations. The set of instructions might comprise instructions for providing connectivity between the NID and each of one or more first user devices of a plurality of user devices associated with at least one of the customer premises or a user who is associated with the customer premises and instructions for, in response to determining that user selections that are received, via a user interface that is provided to a customer to select privacy settings for Internet of Things ("IoT")-connected devices in a network, comprise a selection to restrict access to information regarding at least one portion of at least one of one or more first user devices connected to the network or one or more applications running on one or more first user devices connected to the network, restricting access by a third party to the information regarding the at least one portion of the at least one of one or more first user devices connected to the network or one or more applications running on one or more first user devices connected to the network.

According to some embodiments, the set of instructions might further comprise instructions for sending at least one virtual network function ("VNF") to each of the one or more first user devices via the LAN, the at least one VNF comprising a device identifier and a LAN device interconnection VNF. The instructions for restricting access by a third party to the information regarding the at least one portion of the at least one of one or more first user devices connected to the network or one or more applications running on one or more first user devices connected to the network might comprise instructions for restricting, using the at least one VNF sent to each of the one or more first user devices, access by a third party to the information regarding the at least one portion of the at least one of one or more first user devices connected to the network or one or more applications running on one or more first user devices connected to the network.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

Figure 8:
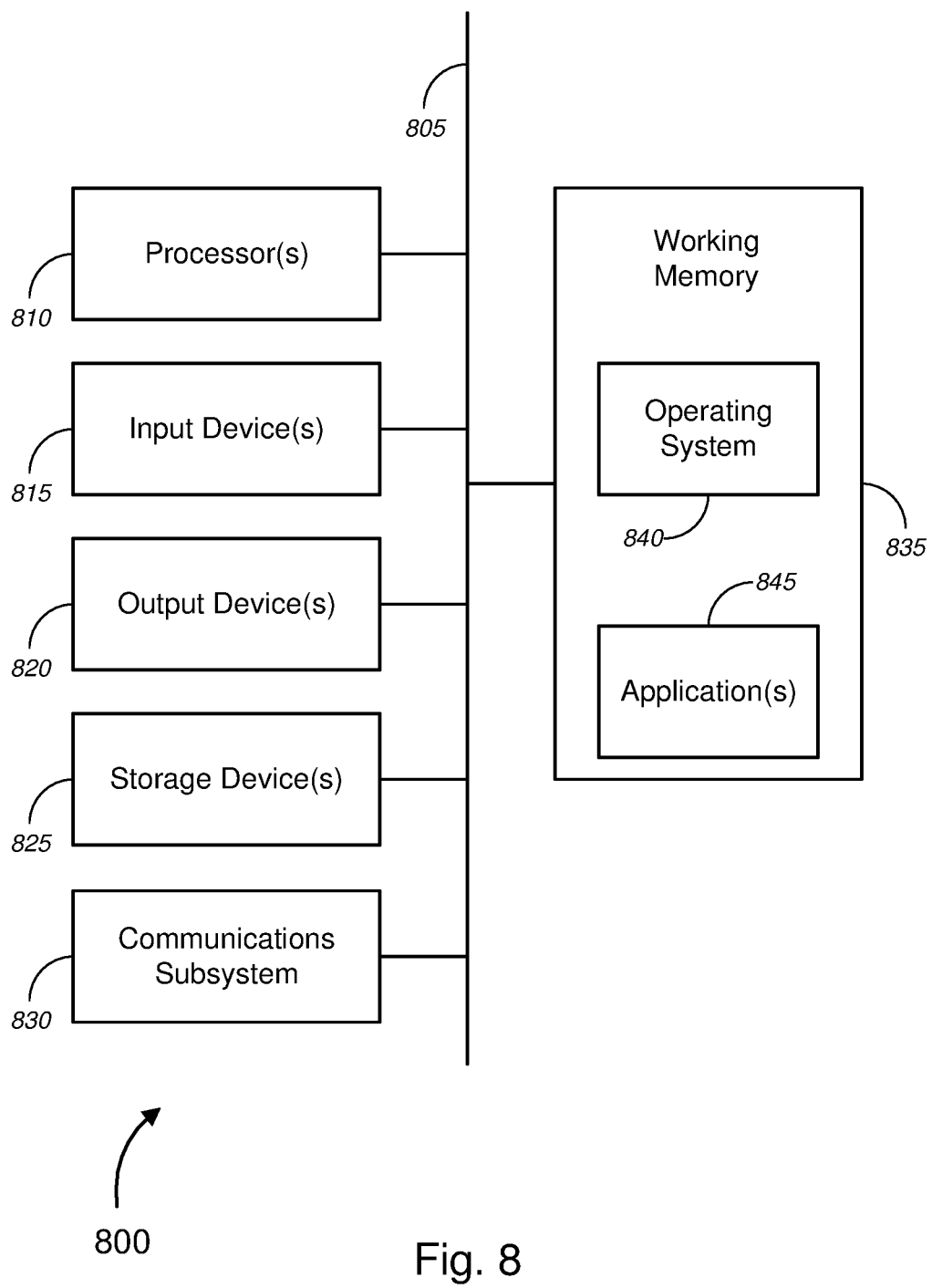
FIG. 8 is a block diagram illustrating an exemplary computer or system hardware architecture, in accordance with various embodiments.
Figure 9:
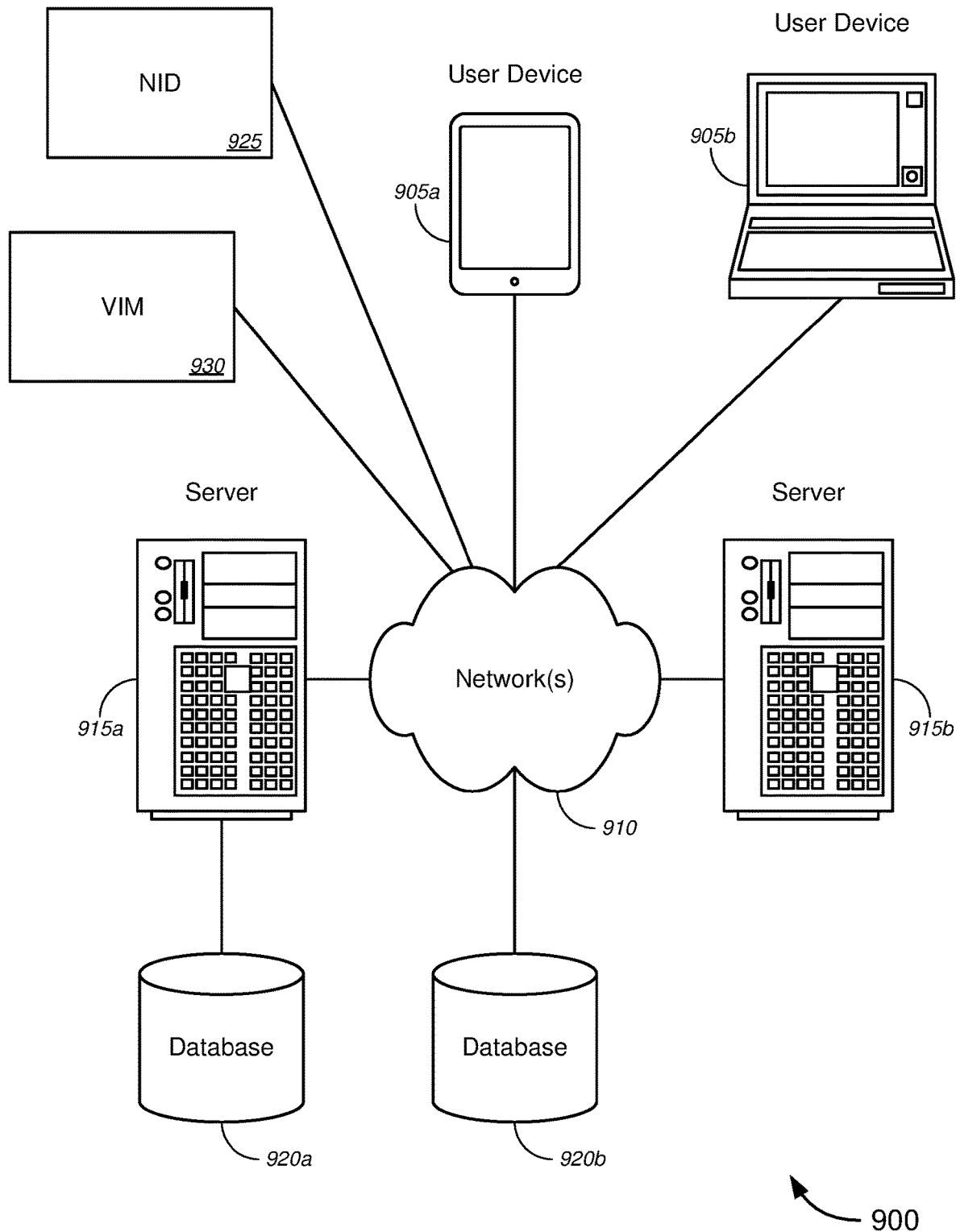
FIG. 9 is a block diagram illustrating a networked system of computers, computing systems, or system hardware architecture, which can be used in accordance with various embodiments.

We now turn to the embodiments as illustrated by the drawings. FIGS. 1-9 illustrate some of the features of the method, system, and apparatus for implementing customer-based Internet of Things ("IoT") functionality, as referred to above. FIGS. 1-5 illustrate some of the specific (although non-limiting) exemplary features of the method, system, and apparatus for implementing customer-based IoT functionality, while FIGS. 6 and 7 illustrate some of the specific (although non-limiting) exemplary features of the method, system, and apparatus for implementing customer-based IoT—transparent privacy functionality, and FIGS. 8 and 9 illustrate exemplary system and hardware implementation. The methods, systems, and apparatuses illustrated by FIGS. 1-9 refer to examples of different embodiments that include various components and steps, which can be considered alternatives or which can be used in conjunction with one another in the various embodiments. The description of the illustrated methods, systems, and apparatuses shown in FIGS. 1-9 is provided for purposes of illustration and should not be considered to limit the scope of the different embodiments.

With reference to the figures, FIG. 1 is a schematic diagram illustrating a system 100 for implementing customer-based IoT functionality, in accordance with various embodiments. The embodiments as represented in FIG. 1 are merely illustrative and are not intended to limit the scope of the various embodiments.

Turning to FIG. 1, system 100 might comprise a customer network 105 (such as a local area network ("LAN"), or the like), a wireless tethering network or wireless network 110, one or more customer devices 115 in communication with the customer network 105, one or more wireless devices 120 in communication with the wireless network 110, a first network interface device ("NID") 125, a first virtual infrastructure manager ("VIM") 130, a provider network(s) 135, one or more telecommunications relay systems 140, one or more provider gateways 145, the Internet 150, one or more application ("app") provider servers 155, one or more user devices 160 in communication with the Internet 150, one or more user devices 165 in communication with the provider network(s) 135, one or more resource nodes 170, one or more external or second VIMs 175, one or more second NIDs 180, one or more second customer networks 185, one or more registration agents 190, and/or the like. The one or more app provider servers 155 might comprise app provider A server(s) 155*a*, app provider B server(s) 155*b*, through app provider N server(s) 155*n*. In some cases, the second VIMs 175 might include one or more of a VIM 175 located within the provider network(s) 135, a VIM 175*a* located at customer network 185*a* through a VIM 175*n* located at customer network 185*n*, or the like.

The networks 105, 110, 135, and 185 (including customer networks 185*a*-185*n*) might each include any suitable network, including, but not limited to, a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; or any combination of these and/or other networks. The one or more telecommunications relay systems 140 might include, without limitation, one or more wireless network interfaces (e.g., wireless modems, wireless access points, and the like), one or more towers, one or more satellites, and/or the like.

The first NID 125 (or the second NID 180) might include, without limitation, at least one of an optical network terminal ("ONT"), a residential gateway ("RG") device, a business gateway ("BG") device, or a virtual gateway ("vG") device, and/or the like. RGs, BGs, and vGs, particularly in the context of VNFaaS is described in detail in U.S. patent application Ser. No. 14/601,891 (the "'891 application"), filed Jan. 21, 2015 by Michael J. Fargano et al., entitled, "Consumer Choice for Broadband Application and Content Services," which claims priority to U.S. Patent Application Ser. No. 61/929,804 (the "'804 application"), filed Jan. 21, 2014 by Michael J. Fargano and U.S. Patent Application Ser. No. 61/930,772 (the "'772 application"), filed Jan. 23, 2014 by Michael J. Fargano, each entitled, "Consumer Choice for Broadband Application and Content Services," the disclosures of each of these applications being incorporated herein by reference in their entirety for all purposes. In some cases, "NID" might be a general term for a device that interfaces the subscriber's LAN to the Network and this NID concept is not constrained to whether it is physically located at the customer premises or in the network. Sometimes, the term "NID" implies a specific piece of equipment that gets deployed at the customer location. In the various embodiments, the interface device (e.g., NID 125, NID 180, and/or the like), the infrastructure manager (e.g., VIM 130, VIM 175, and/or the like), and/or the registration agent (e.g., registration agent 190, and/or the like) can be located either at the customer premises (e.g., in the LAN or customer network 105, or the like), the Network Service Provider network (e.g., provider network(s) 135), or distributed across both (which may be the preferred approach in a network with virtualized network functions ("VNFs")).

The various components of system 100 can achieve the functionality as described below with respect to system 200 of FIG. 2, customer portal of FIG. 3, and the processes of method 400 of FIG. 4. The customer devices 115 and the wireless devices 120 correspond generally to the plurality of user devices 215 of FIG. 2 (and user devices 705 of FIG. 7), which includes, without limitation, one or more of a desktop computer, a laptop computer, a tablet computer, a smart phone, a mobile phone, a personal digital assistant, a printer, a scanner, a data storage device, a network access point ("NAP"), a television, a set-top box, an image capture device, an image projection device, a video capture device, a video projection device, a watch, a clock, a gaming console, a thermostat, a kitchen appliance, a medical device, a vehicle, a speaker, an audio headset, a telephone system, a media recording device, a media playback device, a lighting system, a sensing device, a door locking system, a customer premises security control system, a window locking system, a window covering system, or a sprinkler system, and/or the like. The VIM (e.g., VIM 130 or VIM 175, or the like) is a virtual machine running on the NID (e.g., NID 125, NID 180, or the like) or other network hardware (e.g., resource node 170, provider gateway 145, registration agent 190, and/or the like), and is configured to provide one or more of hardware virtualization, storage virtualization, resource allocation, physical-virtual resource coordination, and/or the like.

The one or more customer devices 115 might comprise customer device 115a through customer device 115n, while the one or more wireless devices 120 might comprise wireless device 120a through wireless device 120n. Similarly, the one or more user devices 160 might comprise user device 160a through user device 160n, the one or more user devices 165 might comprise user device 165a through user device 165n. According to some embodiments, at least one resource node of the one or more resource nodes 170 might be the same device as one of at least one customer device 115 of the one or more customer devices 115, at least one wireless device 120 of the one or more wireless devices 120, at least one user device 160 of the one or more user devices 160, at least one user device 165 of the one or more user devices 165, or the like. Each resource node might include, without limitation, at least one of compute resources, memory resources, data storage resources, network communication resources, security resources, or hardware resources, and/or the like. In some instances, each of the one or more user devices 160 and the one or more user devices 165 might be physically or functionally similar to at least one of the one or more customer devices 115 or the one or more wireless devices 120. According to some embodiments, one or more of the NID (e.g., NID 125, NID 180, etc.), the VIM (e.g., VIM 130, VIM 175, etc.), the registration agent (e.g., registration agent 190), the gateway device (e.g., provider gateway 145, other gateway devices, etc.), and/or the like might be hosted on a resource node (e.g., resource node 170) in any of the networks (e.g., customer network 105, wireless tethering network 110, customer networks 185a-185n, provider network(s) 135, the Internet 150, etc.), hosted on a virtual machine or the like in such a resource node in any of the networks, and/or the like.

In some embodiments, one or more VNFs might be sent to a network device (e.g., NID 125, NID 180, VIM 130, VIM 175, registration agent 190, resource node 170, etc.) in the provider network(s) (e.g., provider network(s) 135, or a network accessible via the provider network(s) 135 such as customer network(s) 185a-185n, the Internet 150, etc.) that is accessible via one of LAN-to-network service chaining or network-to-LAN service chaining, each of the one or more VNFs comprising a device identifier and a LAN device interconnection VNF. Herein, the LAN might refer to one or both of the customer network 105 and/or the wireless tethering network 110. Service chaining is described in detail in the '208, '280, and '309 applications (which are already incorporated herein by reference in their entirety). In some cases, the VNFs might be split between the one or more customer devices 115a-115n, which are in the LAN (e.g., customer network 105 and/or the wireless tethering network 110, or the like), and the at least one network device (e.g., NID 125, NID 180, VIM 130, VIM 175, registration agent 190, resource node 170, etc.) in the service provider network (e.g., provider network(s) 135, or a network accessible via the provider network(s) 135 such as customer network(s) 185a-185n, the Internet 150, etc.). In some instances, the VIM might be one of located in the LAN, located in the service provider network, or split between the LAN and the service provider network.

Merely by way of example, various embodiments might bridge the first NID 125 with one or more second NIDs 180a-180n (that are located in or associated with customer networks 185a-185n, respectively), the one or more second NIDs 180a-180n (collectively, "NIDs 180") being communicatively coupled to the service provider network(s) 135. The various embodiments might further map, e.g., via the VIM (e.g., VIM 130, VIM 175, VIM 175a-175n, or the like), each of the one or more first user devices (e.g., customer devices 115, wireless devices 120, etc.) with each of the one or more second user devices (e.g., other devices among the customer devices 115, wireless devices 120, etc.) of the plurality of user devices associated with at least one of the customer premises or the user who is associated with the customer premises, with each resource node of a plurality of resource nodes (e.g., resource node 170, etc.) in communication with the NID 125, with each of one or more fifth user devices (not shown) associated with at least one second customer premises (e.g., in which the customer networks 185a-185n are located) that is separate from the customer premises (in which the customer network 105 and the wireless tethering network 110 are located), and with each resource node of a plurality of second resource nodes in communication with at least one second NID of the one or more second NIDs (e.g., NID 180a-185n).

Figure 2:
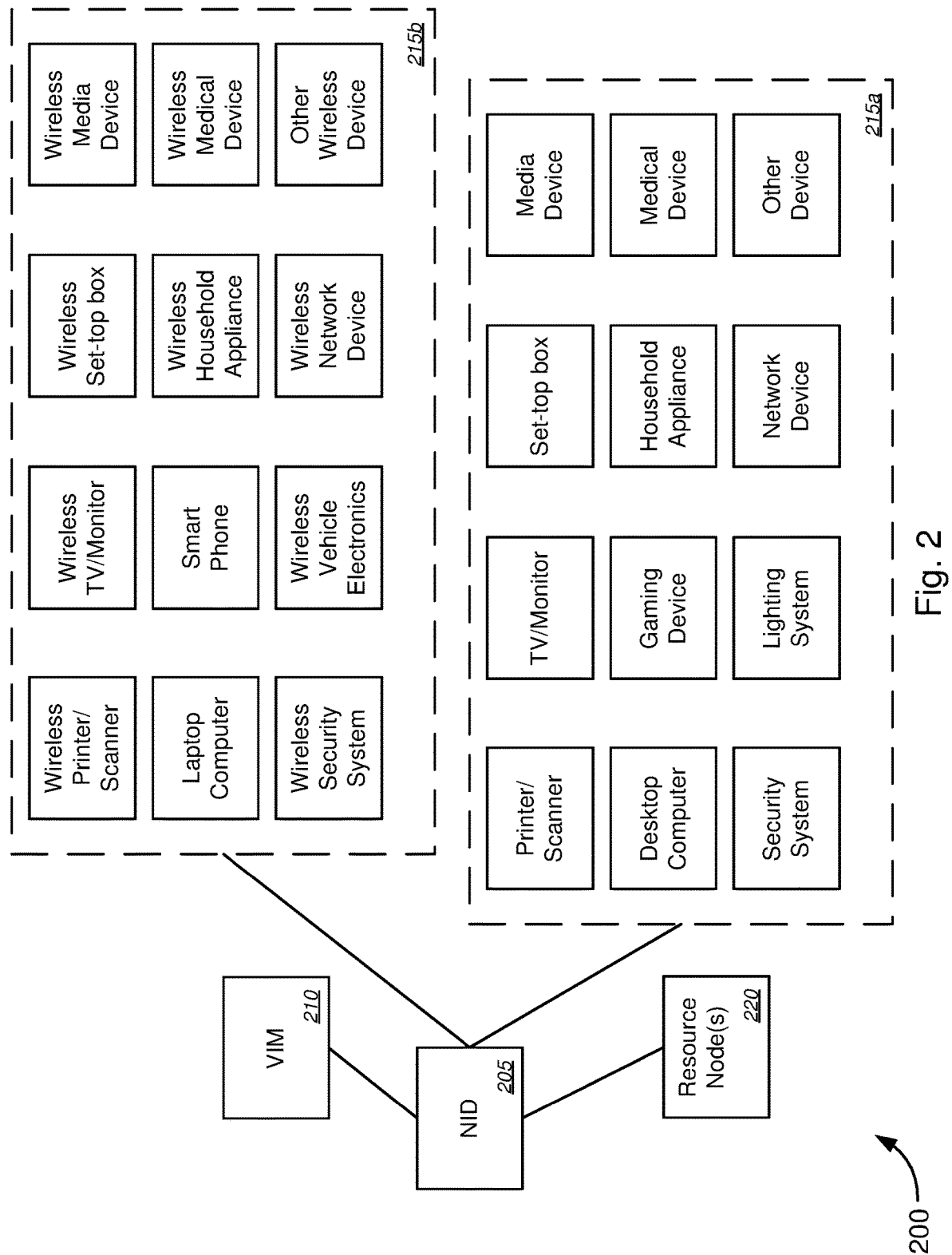
FIG. 2 is a schematic diagram illustrating an embodiment of a system for implementing customer-based IoT functionality.

FIG. 2 is a schematic diagram illustrating an embodiment of a system for implementing customer-based IoT functionality. The embodiments as represented in FIG. 2 are merely illustrative and are not intended to limit the scope of the various embodiments. With reference to FIG. 2, system 200 might comprise a NID 205 (which might be similar, if not identical, to NID 125 or one of NID 180 of FIG. 1), a virtual infrastructure manager 210 (which might be similar, if not identical, to one of VIM 130, VIM 175, or VIM 175a-175n of FIG. 1), one or more user devices 215, and one or more resource nodes 220 (which might be similar, if not identical, to resource node 170 of FIG. 1). The one or more user devices might include one or more wired user devices 215a and one or more wireless user devices 215b. In some embodiments, the NID 205 might include, without limitation, at least one of an optical network terminal ("ONT"), a residential gateway ("RG") device, a business gateway ("BG") device, or a virtual gateway ("vG") device, and/or the like. In some cases, "NID" might be a general term for a device that interfaces the subscriber's LAN to the Network and that this NID concept is not constrained to whether it is physically located at the customer premises or in the Network. Sometimes, the term "NID" implies a specific piece of equipment that gets deployed at the customer location. In the various embodiments, the interface device can be located either at the customer premises, the Network Service Provider network, or distributed across both (which may be the preferred approach in a network with virtualized network functions ("VNFs")).

The VIM 210 is or includes a system that manages the "resources" (e.g., hardware resources or the resources of the various user devices 215). In some cases, the VIM manages "resources" that a virtual machine ("VM") is allowed to connect to. In various embodiments, a customer is provided with the ability or capability to register (e.g., through a customer portal as shown in FIG. 3, through an app, and/or the like) his or her own devices with the provider VIM in order for the provider to allow the customer to set policies or rules (including, without limitation, access policies or rules, mapping policies or rules, and/or the like) of those particular devices with respect to IoT and/or other applications.

According to some embodiments, the one or more user devices 215 might include, without limitation, a printer or a scanner, a TV or monitor, a set-top box ("STB") or other media sources/media playback devices, a Bluetooth™ headset or speaker or other Bluetooth™ device, a car or other vehicle, a toaster or other kitchen appliance, a heart monitor or other medical device (or medical diagnostic device), and/or other devices, which might include, but are not limited to, a desktop computer, a laptop computer, a tablet computer, a smart phone, a mobile phone, a personal digital assistant, a data storage device, a network access point ("NAP"), an image capture device, an image projection device, a video capture device, a video projection device, a watch, a clock, a gaming console, a thermostat, a telephone system, a media recording device, a media playback device, a lighting system, a sensing device, a door locking system, a customer premises security control system, a window locking system, a window covering system, or a sprinkler system, and/or the like.

In some instances, the one or more wired user devices 215a might include, but is not limited to, a printer, a scanner, a combination printer/scanner, a TV or monitor, a STB, a media device (e.g., a video recording or playback device, an audio recording or playback device, an image recording or playback device, and/or the like), a desktop computer, a gaming device (e.g., a gaming console, a portable gaming device, and/or the like), a household appliance (e.g., a refrigerator, a microwave, a range, an oven, a dishwasher, a rice maker, a pressure cooker, a slow cooker, a toaster, a bread maker, a juicer, a coffee machine, a vacuum machine, a washer, a dryer, an air conditioner, a furnace, a thermostat, and/or the like), a medical device (e.g., a heart-rate monitor, a blood pressure monitor, an oximeter, and/or the like), a security system, a lighting system, a network device (e.g., a NID, an ONT, a RG, a BG, a vG, a router, a modem, a hub, a NAP, and/or the like), and/or other devices (e.g., a telephone, a telephone system, an intercom, a sensing device, a door locking system, a window locking system, a window covering system, a sprinkler system, a garage door opening/closing system, a front door opening/closing/locking/unlocking system, a back door opening/closing or locking/unlocking system, a patio door opening/closing or locking/unlocking system, and/or the like), or the like.

In some cases, the one or more wireless user devices 215b might include, but is not limited to, a wireless printer, a wireless scanner, a combination wireless printer/scanner, a wireless TV or monitor, a wireless STB, a wireless media device (e.g., a wireless video recording or playback device, a wireless audio recording or playback device, a wireless image recording or playback device, and/or the like), a laptop computer, a smart phone, a tablet computer, a wireless household appliance (e.g., a refrigerator, a microwave, a range, an oven, a dishwasher, a rice maker, a pressure cooker, a slow cooker, a toaster, a bread maker, a juicer, a coffee machine, a vacuum machine, a washer, a dryer, an air conditioner, a furnace, a thermostat, and/or the like), a wireless medical device (e.g., a wireless heart-rate monitor, a wireless blood pressure monitor, a wireless oximeter, and/or the like), a wireless security system, wireless vehicle electronics, a wireless network device (e.g., a wireless NID, a wireless ONT, a wireless RG, a wireless BG, a wireless vG, a wireless router, a wireless modem, a wireless hub, a wireless NAP, and/or the like), and/or other wireless devices (e.g., a wireless telephone, a wireless telephone system, a wireless intercom, a wireless sensing device, a wireless door locking system, a wireless window locking system, a wireless window covering system, a wireless lighting system, a wireless sprinkler system, a wireless garage door opening/closing system, a wireless front door opening/closing or locking/unlocking system, a wireless back door opening/closing or locking/unlocking system, a wireless patio door opening/closing or locking/unlocking system, and/or the like), or the like.

According to some embodiments, at least one of the one or more resource nodes 220 might be the same device as one of a wired device 215a or a wireless device 215b. Each resource node 220 might include, but is not limited to, at least one of compute resources, memory resources, data storage resources, network communication resources, security resources, or hardware resources, and/or the like. In some embodiments, at least one of the one or more resource nodes 220 might be dedicated hardware or network resources separate from any of the devices 215.

In some embodiments, NID 205 might comprise a processor that is configured (via one or more instructions stored on a non-transitory computer readable medium in communication with the processor) to cause the NID to provide connectivity between the NID and each of one or more first user devices of a plurality of user devices associated with at least one of the customer premises or a user who is associated with the customer premises and to cause the NID to send at least one virtual network function ("VNF") to each of the one or more first user devices via the LAN, the at least one VNF comprising a device identifier and a LAN device interconnection VNF.

In some instances, VIM 210 might comprise a processor that is configured (via one or more instructions stored on a non-transitory computer readable medium in communication with the processor) to cause the VIM to identify, within the LAN, one or more first user devices of a plurality of user devices associated with at least one of the customer premises or the user who is associated with the customer premises, in response to the one or more first devices being connected to the LAN and/or to map each of the one or more first user devices with each of one or more second user devices of the plurality of user devices associated with at least one of the customer premises or the user who is associated with the customer premises, and with each resource node of a plurality of resource nodes in communication with the NID, based at least in part on first user input received via at least one third user device of the plurality of user devices. In some embodiments, VIM 210 might be located or embodied in provider gateway 140. In some cases, VIM 210 might be part of, located at, or otherwise executed in NID 205.

Figure 3B:
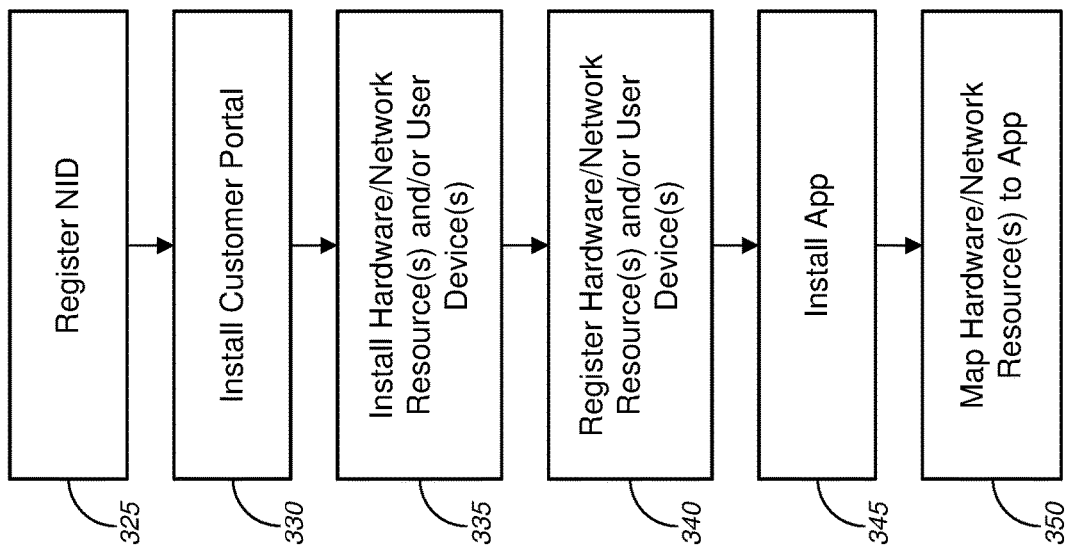
FIG. 3B represents a system flow diagram illustrating a method for mapping hardware and/or network resources to a software application for implementing customer-based IoT functionality, in accordance with various embodiments.
Figure 3A:
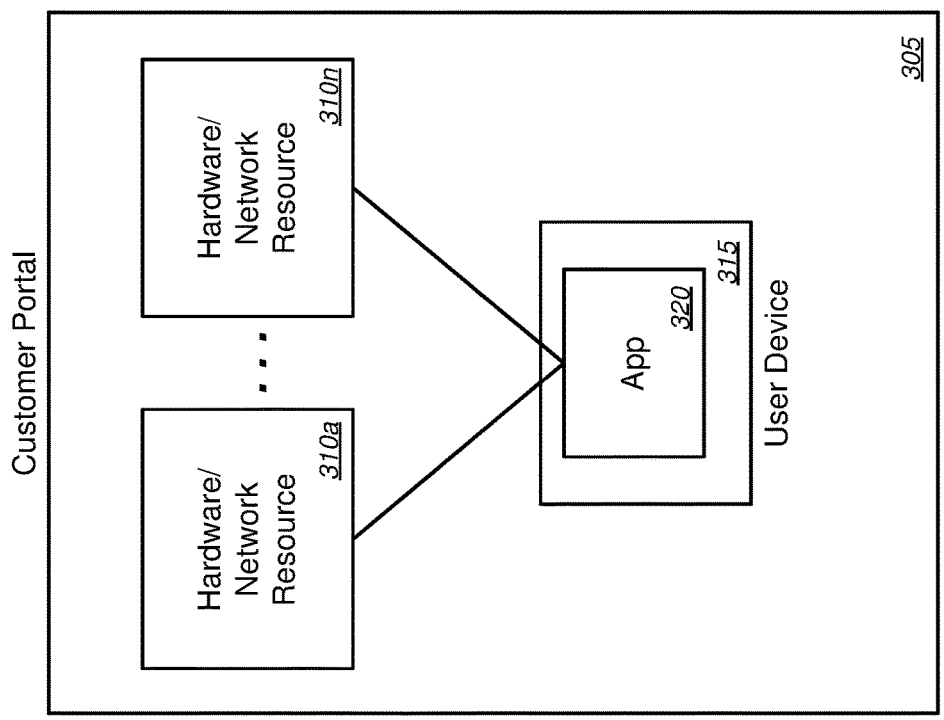
FIG. 3A is a schematic diagram illustrating a customer portal through which customer-based IoT functionality can be implemented, in accordance with various embodiments.

FIG. 3A is a schematic diagram illustrating a customer portal through which customer-based IoT functionality can be implemented, in accordance with various embodiments. FIG. 3B represents a system flow diagram illustrating a method 300 for mapping hardware and/or network resources to a software application for implementing customer-based IoT functionality, in accordance with various embodiments. The embodiments as represented in FIGS. 3A and 3B (collectively, "FIG. 3") are merely illustrative and are not intended to limit the scope of the various embodiments. While the techniques and procedures in FIG. 3B are depicted and/or described in a certain order for purposes of illustration, it should be appreciated that certain procedures may be reordered and/or omitted within the scope of various embodiments. Moreover, while the method 300 illustrated by FIG. 3B can be implemented by or with (and, in some cases, are described below with respect to) the systems 100 and 200 of FIGS. 1 and 2, respectively (or components thereof) as well as the customer portal of FIG. 3A, such methods may also be implemented using any suitable hardware implementation or system. Similarly, while each of the systems 100 and 200 of FIGS. 1 and 2, respectively (or components thereof) as well as the customer portal of FIG.

3A can operate or be used according to the method 300 illustrated by FIG. 3B (e.g., by executing instructions embodied on a computer readable medium), the systems 100 and 200 of FIGS. 1 and 2, respectively (or components thereof) as well as the customer portal of FIG. 3A each can be used according to other modes of operation and/or perform other suitable procedures.

With reference to FIG. 3A, customer portal 305 might host, provide access to, or link one or more hardware/network resources 310 and a user device 315. The user device 315 might have an app 320 running thereon. The one or more hardware/network resources 310 might comprise a first hardware/network resource 310a through an $N^{th}$ hardware/network resource 310n. Each hardware/network resource might include, without limitation, at least one of compute resources, memory resources, data storage resources, network communication resources, security resources, or hardware resources, and/or the like, and might be embodied by a user device (e.g., one of customer device 115, wireless device 120, user device 160, user device 165, resource node 170, NID 205, user device 215, wired user device 215a, wireless user device 215b, resource node 220, and/or the like, as described in detail above with respect to FIGS. 1 and 2) or other resources. The user device 315 might include or be embodied by any of customer device 115, wireless device 120, user device 160, user device 165, NID 205, wired user device 215a, wireless user device 215b, and/or the like, as described in detail above with respect to FIGS. 1 and 2

In some embodiments, as shown with respect to the non-limiting example in FIG. 3B, method 300 might comprise registering a NID (e.g., NID 125, NIDs 180a-180n, or NID 205 of corresponding FIGS. 1 and 2) (block 325). In some embodiments, method 300 might also include installing a customer portal (e.g., customer portal 305) (block 330). At block 335, method 300 might comprise installing one or more hardware/network resources (e.g., hardware network resources 310, or the like) and/or installing one or more user devices (e.g., user device 315, or the like). Method 300 might further comprise registering the one or more hardware/network resources and/or the one or more user devices (block 340). Method 300, at block 345, might comprise installing one or more apps (e.g., on at least one user device, such as user device 315, or the like). At block 350, method 300 might comprise mapping at least one hardware/network resource (and/or at least one user device) to the app. In some embodiments, mapping resources to the app might be performed through the app, in some cases through the customer portal. In particular, the app, when installed, might provide the user/customer with the ability, functionality, or option to map resources (e.g., resources of the hardware/network resource(s) or user/customer device (s)) to the app, thereby providing the framework for allowing the various hardware/network resources and/or user/customer devices to implement IoT functionalities.

FIGS. 4A-4D (collectively, "FIG. 4") represent system flow diagrams illustrating a method 400 for implementing customer-based IoT functionality, in accordance with various embodiments. The embodiments as represented in FIG. 4 are merely illustrative and are not intended to limit the scope of the various embodiments. With reference to FIG. 4, method 400 in FIG. 4A continues onto FIG. 4B, linked by the circular marker denoted by "A," continues from FIG. 4B onto FIG. 4C, linked by the circular marker denoted by "B," and continues from FIG. 4C onto FIG. 4D, linked by the circular marker denoted by "C." Blocks outlined in dash-long dash lines indicate optional processes in the method 400.

While the techniques and procedures are depicted and/or described in a certain order for purposes of illustration, it should be appreciated that certain procedures may be reordered and/or omitted within the scope of various embodiments. Moreover, while the method illustrated by FIG. 4 can be implemented by or with (and, in some cases, are described below with respect to) the systems 100 and 200 of FIGS. 1 and 2, respectively (or components thereof) as well as the customer portal of FIG. 3A, such methods may also be implemented using any suitable hardware implementation or system. Similarly, while each of the systems 100 and 200 of FIGS. 1 and 2, respectively (or components thereof) as well as the customer portal of FIG. 3A can operate or be used according to the method illustrated by FIG. 4 (e.g., by executing instructions embodied on a computer readable medium), the systems 100 and 200 of FIGS. 1 and 2, respectively (or components thereof) as well as the customer portal of FIG. 3A each can be used according to other modes of operation and/or perform other suitable procedures.

Figure 4A:
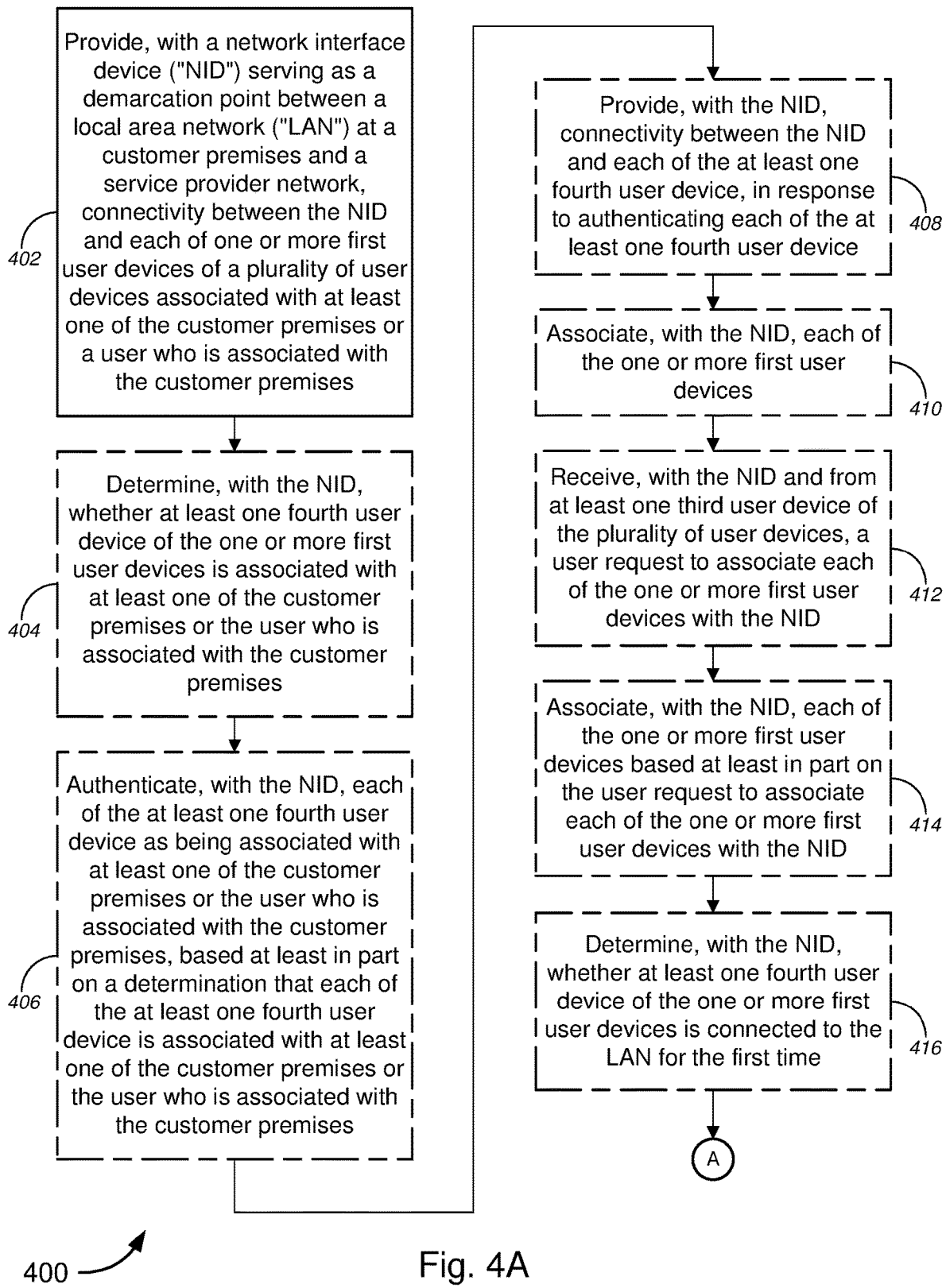
FIGS. 4A-4D represent system flow diagrams illustrating a method for implementing customer-based IoT functionality, in accordance with various embodiments.

Turning to FIG. 4A, method 400 might comprise, at block 402, providing, with a network interface device ("NID") serving as a demarcation point between a local area network ("LAN") at a customer premises and a service provider network, connectivity between the NID (e.g., NID 125, NIDs 180a-180n, or NID 205 of corresponding FIGS. 1 and 2) and each of one or more first user devices of a plurality of user devices (e.g., one or more of customer device(s) 115, wireless device(s) 120, user device(s) 160, user device(s) 165, resource node(s) 170, NID 205, user device(s) 215, wired user device(s) 215a, wireless user device(s) 215b, resource node(s) 220, and/or the like, as described in detail above with respect to FIGS. 1 and 2) that are associated with at least one of the customer premises or a user who is associated with the customer premises. In some embodiments, providing connectivity between the NID and each of the one or more first user devices of the plurality of user devices associated with at least one of the customer premises or the user who is associated with the customer premises might comprise determining, with the NID, whether at least one fourth user device of the one or more first user devices is associated with at least one of the customer premises or the user who is associated with the customer premises (optional block 404); authenticating, with the NID, each of the at least one fourth user device of the one or more first user devices as being associated with at least one of the customer premises or the user who is associated with the customer premises, based at least in part on a determination that each of the at least one fourth user device of the one or more first user devices is associated with at least one of the customer premises or the user who is associated with the customer premises (optional block 406); and providing, with the NID, connectivity between the NID and each of the at least one fourth user device, in response to authenticating each of the at least one fourth user device of the one or more first user devices (optional block 408).

At optional block 410, method 400 might comprise associating, with the NID, each of the one or more first user devices (prior to sending the at least one VNF to each of the one or more first user devices at block 430 below). In some instances, associating each of the one or more first user devices might comprise receiving, with the NID and from the at least one third user device of the plurality of user devices, a user request to associate each of the one or more first user devices with the NID (optional block 412) and associating, with the NID, each of the one or more first user devices, based at least in part on the user request to associate each of the one or more first user devices with the NID (optional block 414). Alternatively, associating each of the one or more first user devices might comprise determining, with the NID, whether at least one fourth user device of the one or more first user devices is connected to the LAN for the first time (optional block 416) and automatically associating, with the NID, each of the at least one fourth user device in response to a determination that at least one fourth user device is connected to the LAN for the first time (optional block 418; shown in FIG. 4B, following circular marker denoted by "A").

Figure 4B:
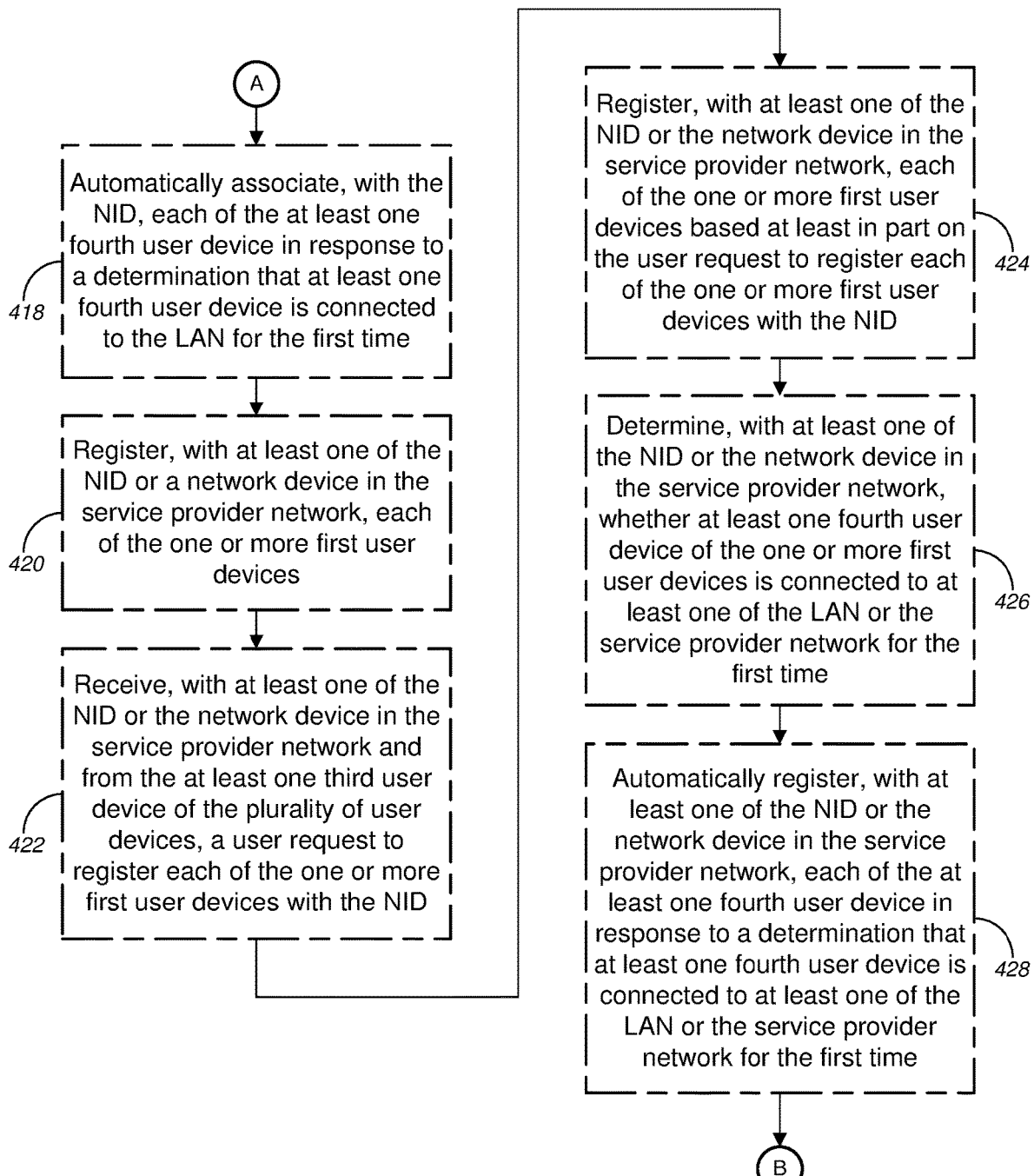

As shown in FIG. 4B, method 400 might, at optional block 420, comprise registering, with the NID (e.g., NID 125 of FIG. 1) or with a network device (e.g., at least one of VIM 130, NID 180a-180n, VIM 175, VIM 175a-175n, registration agent 190, and/or the like of FIG. 1) in the service provider network (e.g., provider network(s) 135 or other networks 185a-185n accessible to NID 125 via provider network(s) 135, or the like, of FIG. 1), each of the one or more first user devices (prior to sending the at least one VNF to each of the one or more first user devices at block 430 below). In some instances, registering each of the one or more first user devices might comprise receiving, with at least one of the NID or the network device in the service provider network and from the at least one third user device of the plurality of user devices, a user request to register each of the one or more first user devices with the NID (optional block 422) and registering, with at least one of the NID or the network device in the service provider network, each of the one or more first user devices, based at least in part on the user request to register each of the one or more first user devices with the NID (optional block 424). Alternatively, registering each of the one or more first user devices might comprise determining, with at least one of the NID or the network device in the service provider network, whether at least one fourth user device of the one or more first user devices is connected to the LAN for the first time (optional block 426) and automatically registering, with the NID, each of the at least one fourth user device in response to a determination that at least one fourth user device is connected to the LAN for the first time (optional block 428). Method 400 then proceeds to block 430 in FIG. 4C, following circular marker denoted by "B".

Figure 4C:
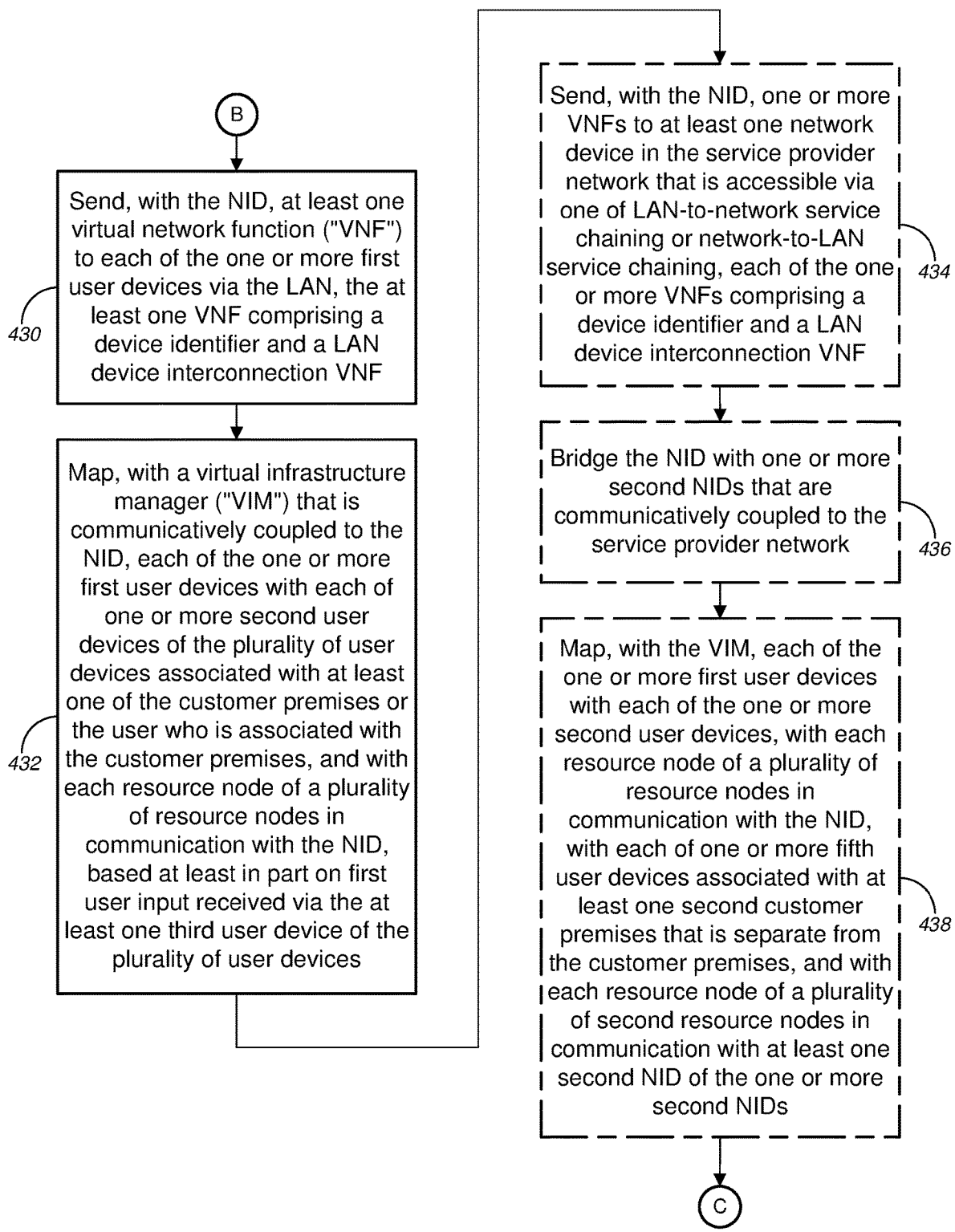

Turning to FIG. 4C, method 400, at block 430, might comprise sending, with the NID, at least one virtual network function ("VNF") to each of the one or more first user devices via the LAN, the at least one VNF comprising a device identifier and a LAN device interconnection VNF. In some cases, the at least one VNF is sent to each user device via an application programming interface ("API") between the NID and each user device. At block 432, method 400 might comprise mapping, with a virtual infrastructure manager ("VIM") that is communicatively coupled to the NID, each of the one or more first user devices with each of one or more second user devices of the plurality of user devices associated with at least one of the customer premises or the user who is associated with the customer premises, and with each resource node of a plurality of resource nodes in communication with the NID, based at least in part on first user input received via at least one third user device (e.g., user device 315 of FIG. 3) of the plurality of user devices. In some cases, the VIM might be one of located in the LAN, located in the service provider network, or split between the LAN and the service provider network.

In some embodiments, method 400 might further comprise sending, with the NID, one or more VNFs to at least one network device in the service provider network that is accessible via one of LAN-to-network service chaining or network-to-LAN service chaining, each of the one or more VNFs comprising a device identifier and a LAN device interconnection VNF (optional block 434). Service chaining is described in detail in the '208, '280, and '309 applications (which are already incorporated herein by reference in their entirety). At optional block 436, method 400 might comprise bridging the NID with one or more second NIDs (e.g., one of NIDs 180a-180n of FIG. 1) that are communicatively coupled to the service provider network. Method 400, at optional block 438, might comprise mapping, with the VIM, each of the one or more first user devices with each of the one or more second user devices, with each resource node of a plurality of resource nodes in communication with the NID, with each of one or more fifth user devices associated with at least one second customer premises that is separate from the customer premises, and with each resource node of a plurality of second resource nodes in communication with at least one second NID of the one or more second NIDs. Method 400 then proceeds to block 440 in FIG. 4D, following circular marker denoted by "C".

Figure 4D:
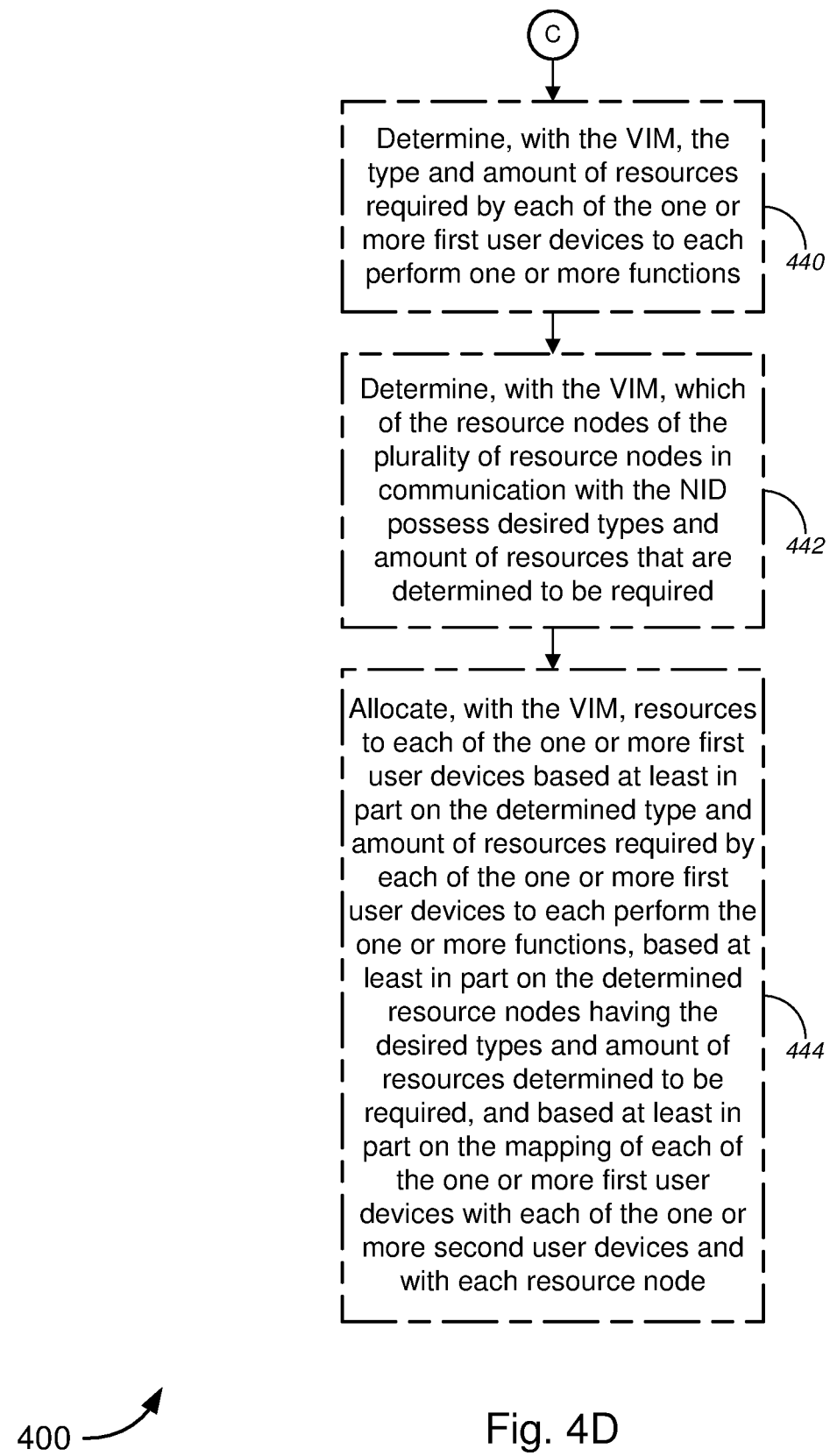

According to some embodiments, as shown in FIG. 4D, method 400 might further comprise determining, with the VIM, the type and amount of resources required by each of the one or more first user devices to each perform one or more functions (optional block 440), determining, with the VIM, which of the resource nodes of the plurality of resource nodes in communication with the NID possess desired types and amount of resources that are determined to be required (optional block 442), and allocating, with the VIM, resources to each of the one or more first user devices, based at least in part on the determined type and amount of resources required by each of the one or more first user devices to each perform the one or more functions, based at least in part on the determined resource nodes having the desired types and amount of resources determined to be required, and based at least in part on the mapping of each of the one or more first user devices with each of the one or more second user devices and with each resource node (optional block 444). In some cases, allocating resources to each of the one or more first user devices is further based on second user input received via the at least one third user device of the plurality of user devices.

Merely by way of example, although not shown in FIG. 4, method 400 might further comprise providing a service provider, who is associated with one of a software application ("app") or a VNF that is running on one or more of the plurality of user devices, with at least one of: access to the one of the app or the VNF that is running on the one or more of the plurality of user devices; access to information regarding resources mapped to the one or more of the plurality of user devices on which the one of the app or the VNF that is running; access to information regarding all resources registered to the NID that are mapped to the one or more of the plurality of user devices; access to information regarding all resources registered to the NID; access to the resources mapped to the one or more of the plurality of user devices on which the one of the app or the VNF that is running; access to all resources registered to the NID that are mapped to the one or more of the plurality of user devices; or access to the NID; and/or the like.

FIGS. 5A-5F (collectively, "FIG. 5") are exemplary illustrations of user devices 500 used by users that present graphical user interfaces configured for implementing customer-based IoT functionality, in accordance with various embodiments. The embodiments as represented in FIG. 5 are merely illustrative and are not intended to limit the scope of the various embodiments. For example, although the graphical user interfaces of FIG. 5 depict a line-by-line or line-to-line type GUI, various embodiments may employ a drag-and-drop type GUI (not shown) that allows for more intuitive graphical interaction between the user and the icons representing user devices, network devices, hardware resources, network resources, networks, permissions, and/or the like.

In FIG. 5, although a tablet computer is shown as the user device 500, any suitable user device (including, but not limited to, any of customer device 115, wireless device 120, user device 160, user device 165, wired user device 215a, wireless user device 215b, and/or the like, as described in detail above with respect to FIGS. 1 and 2) may be used in accordance with the various embodiments. As shown in the embodiments of FIG. 5, user device 500 might comprise a device housing 505 and a display 505a (which may be a touchscreen display or a non-touchscreen display). An app, an application window, or program window may be displayed on the display 505a. In the various examples of FIG. 5, the app running on the user device 500 is an IoT Mapping and Access Settings app, although the various embodiments are not limited to such an app for providing Customer-based IoT, as described herein, and can be any suitable app or program. The app or app window displayed in display 505a might provide a user with the ability, functionality, or options to map and modify access to one or more user devices and/or hardware/network resources.

Figure 5A:
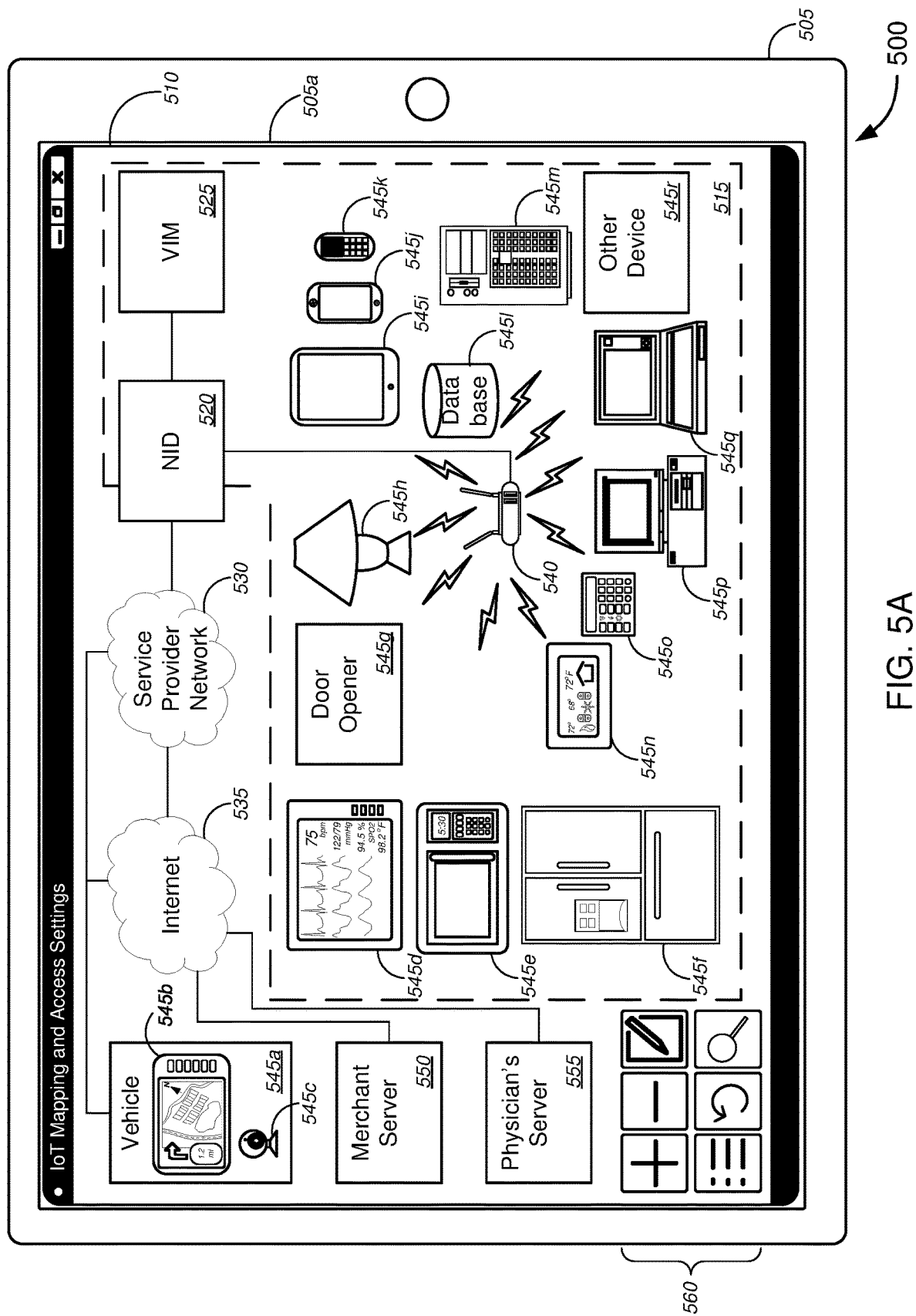
FIGS. 5A-5F are exemplary illustrations of user devices used by users that present graphical user interfaces configured for implementing customer-based IoT functionality, in accordance with various embodiments.

With reference to FIG. 5A, the app might display an icon/graphic of a local area network ("LAN") 515, which is shown in FIG. 5 as an area surrounded by a long-dash line. The app might further display icons of a NID 520, which serves as a demarcation point between the LAN and external networks, a VIM 525 in communication with the NID 520, a service provider network 530, the Internet 535, and a gateway device 540, or the like. The NID 520 or the gateway device 540 might be embodied as a single device, or as separate devices, and one or both might include, without limitation, a NID, an ONT, a RG, a BG, a vG, a router, a modem, a hub, a NAP, and/or the like. The NID 520 and/or the gateway device 540 might communicate with one or more user devices via wired connection and/or wireless connection. The app might further display icons of one or more user devices and/or hardware/network resources 545, which, in the non-limiting embodiment of FIG. 5A, might include, but is not limited to, a vehicle 545a, a navigation system 545b (e.g., a GPS or other navigation system), an image/video-capture device 545c, a medical device 545d (e.g., a medical diagnostic device, a medical monitor, and/or the like), a food heating/cooking/preparation device 545e (e.g., a microwave machine, an oven, a stove or range, a rice maker, a pressure cooker, a slow cooker, a toaster, a bread maker, a juicer, a coffee machine, etc.), a refrigerator 545f, a door opener/closer 545g (e.g., a garage door opening/closing system, a front door opening/closing or locking/unlocking system, a back door opening/closing or locking/unlocking system, a patio door opening/closing or locking/unlocking system, and/or the like), a lighting system 545h, a tablet computer 545i, a smart phone 545j, a mobile phone 545k, a database or data storage device 545l, a server computer 545m, a thermostat 545n, a security system 545o, a desktop computer 545p, a laptop computer 545q, and other user device(s) 545r, or the like. In some cases, the other user device(s) 545r might include, without limitation, a printer, a scanner, a combination printer/scanner, a TV or monitor, a STB, a media device (e.g., a video recording or playback device, an audio recording or playback device, an image recording or playback device, and/or the like), a gaming device (e.g., a gaming console, a portable gaming device, and/or the like), other household appliance (e.g., a dishwasher, a vacuum machine, a washer, a dryer, an air conditioner, a furnace, and/or the like), a telephone, a telephone system, an intercom, a sensing device, a window locking system, and/or the like.

In some embodiments, the app might also display one or more merchant server icons 550, one or more physician server icons, and/or the like. The app might also display control icons or buttons 560, including buttons (typically, soft buttons or the like) for adding/registering new user devices, new hardware/network resources, new third party servers, new networks, etc.; for removing/de-registering user devices, hardware/network resources, third party servers, networks, etc.; for editing mapping, access, and/or communications options for particular or selected user devices, hardware/network resources, third party servers, networks, and/or the like; for accessing menu options; for undoing changes; for searching for particular user devices, hardware/network resources, third party servers, networks, etc.; and/or the like.

In a non-limiting embodiment of FIG. 5A, a user might map and establish communications access amongst his or her vehicle 545a, navigation system 545b, vehicle camera 545c, door opener 545g, thermostat 545n, security system 545o, and/or the like. When the user drives toward home, the vehicle 545a and/or the navigation system 545b might determine that the user is heading home, and might autonomously connect, via the Internet 535 and/or service provider network 530 as well as via NID 520 and/or gateway device 540, with thermostat 545n to change the temperature in the home to a more comfortable level (e.g., to turn on the air conditioner on a hot summer day, to turn on the heater on a cold winter day, etc.) [herein referred to as "Coming Home Example"]. When the vehicle 545a gets close to the house (e.g., within view of the home, or close to or on the driveway, etc.), the vehicle 545a and/or navigation system 545b might autonomously connect, via one or more of the Internet 535, the service provider network 530, the NID 520, and/or the gateway device 540, with the security system 545o to turn off the alarm. In some cases, the vehicle camera 545c (and/or other biometric identifier in the vehicle 545a) might be used to authenticate the user, and authentication information from the vehicle camera 545c (and/or other biometric identifier in the vehicle 545a) might be sent to the security system 545o as part of its determination as to whether or not to turn off the alarm. In some instances, an authentication device in the vehicle might use the authentication information from the vehicle camera 545c (and/or other biometric identifier in the vehicle 545a) to determine whether the user is in fact the owner of the home or otherwise authorized to enter the home, and a positive or negative authentication is sent to the security system to turn off or maintain the alarm. Once the user is authenticated, the security system 545o might autonomously communicate with the door opener 545g—including the garage door opener, the front/side/back/patio door locking/unlocking and/or opening/closing system, or the like—to open the garage door to let the vehicle 545a enter the garage, to unlock and/or open a door that the user customarily uses to enter the house (e.g., front, side, back, or patio door, or the like).

In some cases, if the navigation system 545a indicates to the security system 545o that the user was at the grocery store and/or the vehicle 545a indicates that the trunk or back/side door was open for some time after the grocery trip (which might indicate a large number of items bought or the like), the security system 545o might open the side door, which might be closest to the garage or closest to the pantry/kitchen, rather than the customary front door, thereby allowing easy transfer of groceries to the pantry/kitchen, or the like. In some cases, especially at night, the security system 545o might autonomously communicate, either directly or via the NID 520 and/or the gateway device 540, with the lighting system 545h to light the room and/or the path for the user. If the user typically turns on the TV (for news, sports, weather, programming, etc.) or radio/MP3 player or the like when entering the home, the security system 545o might autonomously communicate, either directly or via the NID 520 and/or the gateway device 540, with a media device (e.g., TV, media player, etc.) to anticipate the user's needs or desires.

In some embodiments, refrigerator 545f might determine that particular ingredients for particular dishes have been used up or has expired [hereinafter, "Grocery List Maker Example"], and might autonomously communicate, via the Internet 535 and/or service provider network 530 as well as via NID 520 and/or gateway device 540, with the vehicle 545a and/or navigation system 545b. The navigation system 545b might plot a route or course to a nearby store and/or a store that the user frequents (based on a search of its database of past locations the user has shopped for the particular ingredients). In some cases, the navigation system 545b and/or the refrigerator 545f might autonomously communicate, via the Internet 535 and/or service provider network 530 as well as via NID 520 and/or gateway device 540, with desktop 545p, laptop 545q, tablet computer 545i, smartphone 545j, mobile phone 545k, server 545m, and/or the like (collectively, "Internet searching devices" or "computing devices") to search for the particular ingredients on store websites or the like.

In some cases, the tablet computer 545i and/or smart phone 545j might determine from e-mail, text message, chat message, social media communications, or other communications between the user and friends/family regarding trying a particular dish (herein, "Food Recommendations Example"), and might communicate with the Internet searching devices or computing devices to perform an Internet search of the dish to determine the necessary ingredients, and might communicate with the refrigerator 545f (or a smart pantry or the like (not shown)) to determine if the ingredients are available at home. If the ingredients are determined to be unavailable at home, the Internet search might determine where to purchase at least some of the missing ingredients, and the information can be relayed to the navigation system 545a to plot a route or course to the suitable stores. The user's smartphone 545j and/or tablet computer 545i might be populated with a shopping list when the user enters the store [hereinafter, "Shopping List Example"]. In some instances, Internet-discovered photographs or images of ingredients might also be provided to help the user locate the missing ingredients. Database 545l might communicate autonomously with the refrigerator 545f (and/or pantry system or the like) to track food items, supplies, etc., as well as expiry dates, etc.

According to some embodiments, medical device 545d might monitor the bio-readings of the user during normal activities, during exercise, and/or the like, and might autonomously communicate, via one or more of the Internet 535, the service provider network 530, the NID 520, and/or the gateway device 540, with a physician's server 555 that may be associated with the user's doctor. The physician's server 555 and/or the doctor might recommend certain foods, and the processes described above for Food Recommendations may be repeated (in terms of Internet searching ingredients for the doctor-recommended foods, determining if the ingredients are already available at home, Internet searching where to purchase missing ingredients, plotting a route or course to one or more stores to purchase the missing ingredients, populating a shopping list on the user's smartphone or tablet to facilitate shopping for the missing ingredient, and/or the like).

In some instances, where a user has earlier in the day (e.g., morning), placed ingredients in a cooking/food preparation appliance 545e (e.g., microwave, pressure cooker, slow cooker, oven, and/or the like), but has not yet started the food preparation process, the navigation system 545b and/or vehicle 545b might communicate (in a similar manner as described above) with the cooking appliance to turn on at an appropriate time before the estimated arrival of the user at home. In some cases, the cooking appliance might communicate (in a similar manner) with the database 545l and/or with the Internet searching devices or computing devices, which might search the Internet for cooking times for the food being cooked, in order to determine when to start cooking.

In some embodiments, each of the devices 545 might determine when parts need to be replaced (e.g., filters for refrigerator 545f, batteries for electronics, bulbs for lights, etc.), and the affected device 545 might autonomously communicate—either directly (i.e., via one or more of the Internet 535, the service provider network 530, the NID 520, the gateway device 540, and/or the like) or indirectly additionally via the Internet searching devices or computing devices—with one or more merchant servers 550 to order the replacement parts [hereinafter, "Parts Replacement Example"].

Figure 5B:
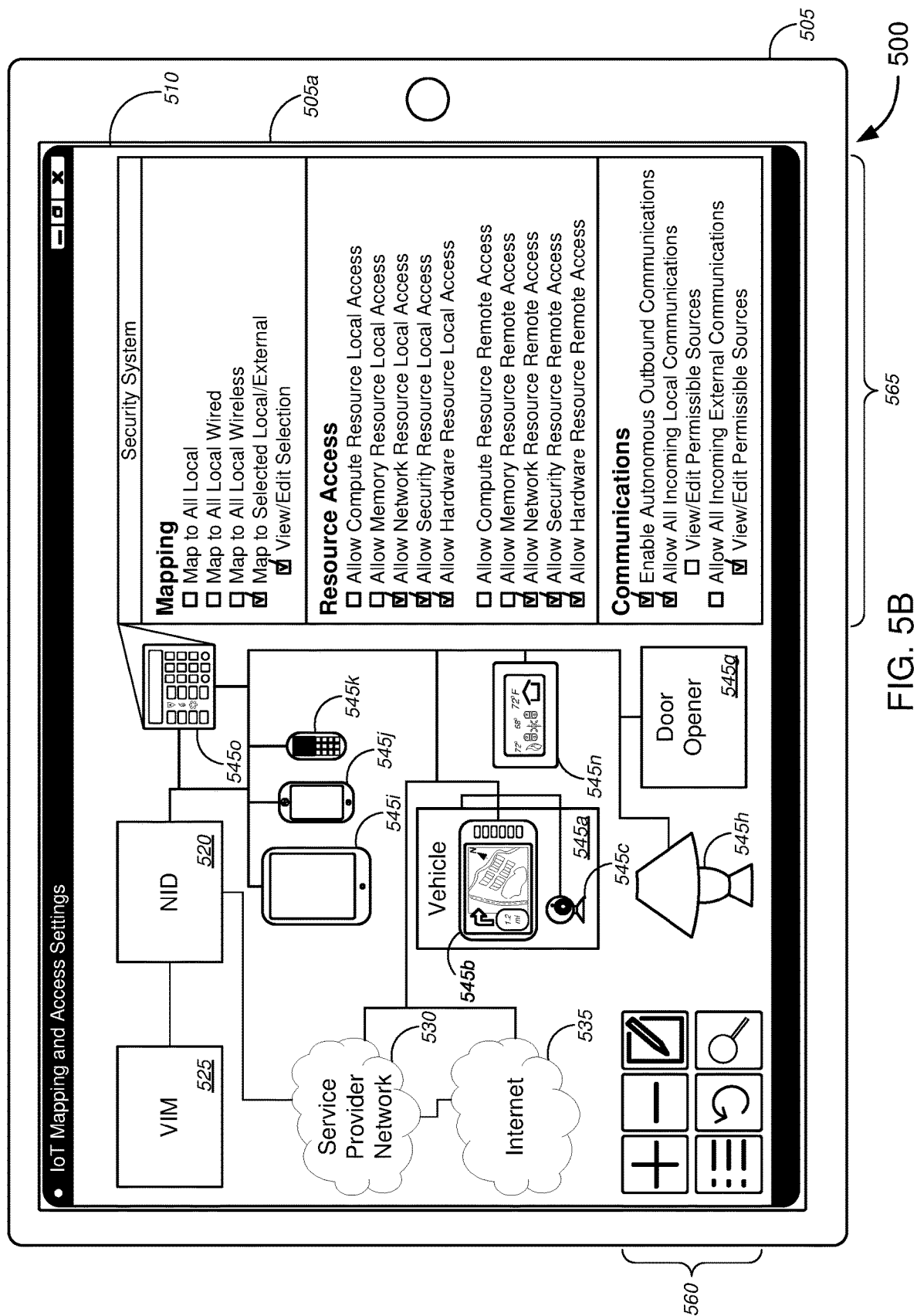

Turning to the embodiment of FIG. 5B, when editing or viewing the mapping, access, and communications options for the security system 545o, for instance, a panel or sub-window 565 might be displayed showing the mapping, resource access, and communications options. In some embodiments, the mapping options might include, without limitation, an option to map the security system to all local user devices, hardware/network resources, networks, etc. (which might be connected to and (in some cases) registered to the NID 520 and/or the VIM 525), an option to map to all local wired user devices, hardware/network resources, networks, etc., an option to map to all local wireless user devices, hardware/network resources, networks, etc., an option to map to selected local or external user devices, hardware/network resources, third party servers, networks, etc., and/or the like. When the option to map to selected local or external user devices, hardware/network resources, third party servers, networks, etc. is selected, an option might be provided to view or edit the selection(s). In some instances, the resource access options might include, but is not limited to, an option to allow compute resource local access, an option to allow memory resource local access, an option to allow network resource local access, an option to allow security resource local access, an option to allow hardware resource local access, an option to allow compute resource remote access, an option to allow memory resource remote access, an option to allow network resource remote access, an option to allow security resource remote access, an option to allow hardware resource remote access, and/or the like. In some cases, the communications options might include, without limitation, an option to enable autonomous outbound communications, an option to allow all incoming local communications or an option to view/edit permissible local sources, an option to allow all incoming external communications or an option to view/edit permissible external/remote sources, and/or the like.

In the embodiment of FIG. 5B, the panel 565 for editing or viewing the mapping, access, and communications options for the security system 545*o* might be set by a user to "map to selected local/external" devices, and to "view/edit selection." With reference to the Coming Home Example as described above, the security system 545*o* might be mapped to at least the vehicle 545*a*, the navigation system 545*b*, the vehicle camera 545*c*, the thermostat 545*n*, the lighting system 545*h*, the door opener 545*g*, and/or the like. In some cases, the security system 545*o* might also be mapped to the tablet computer 545*i*, the smart phone 545*j*, and/or the mobile phone 545*k*, for example, to allow for remote updates, notifications, and/or control of the security system via the tablet computer 545*i*, the smart phone 545*j*, and/or the mobile phone 545*k*. Alternatively, or additionally, settings of the security system 545*o* might be changed via the tablet computer 545*i*, the smart phone 545*j*, and/or the mobile phone 545*k*, and the mapping allows for pre-authenticated communication for permitting the user to make such setting changes, particularly, from a remote location.

In some embodiments, the user might allow local access (to the mapped local devices 545 and/or hardware/network resources) to the security system's 545*o* network resource, security resource, and/or hardware resource. In a similar manner, the user might also allow remote access (to the mapped remote devices 545 and/or hardware/network resources) to the security system's 545*o* network resource, security resource, and/or hardware resource. According to some embodiments, the user might also select to enable autonomous outbound communications by the security system 545*o*, which would allow the security system 545*o* to autonomously initiate communications with other user devices 545 and/or hardware/network resources, such as communications with the vehicle 545*a*, navigation system 545*b*, and/or the vehicle camera 545*c*, with the thermostat 545*n*, the door opener 545*g*, the lighting system 545*h*, the media device, and/or the like, as described above in the Coming Home Example, or the like. Similarly, the user might, in some cases, allow all incoming local communications, and might select not to allow all incoming external communications, instead choosing to view/edit permissible remote sources of communications, or the like.

Figure 5C:
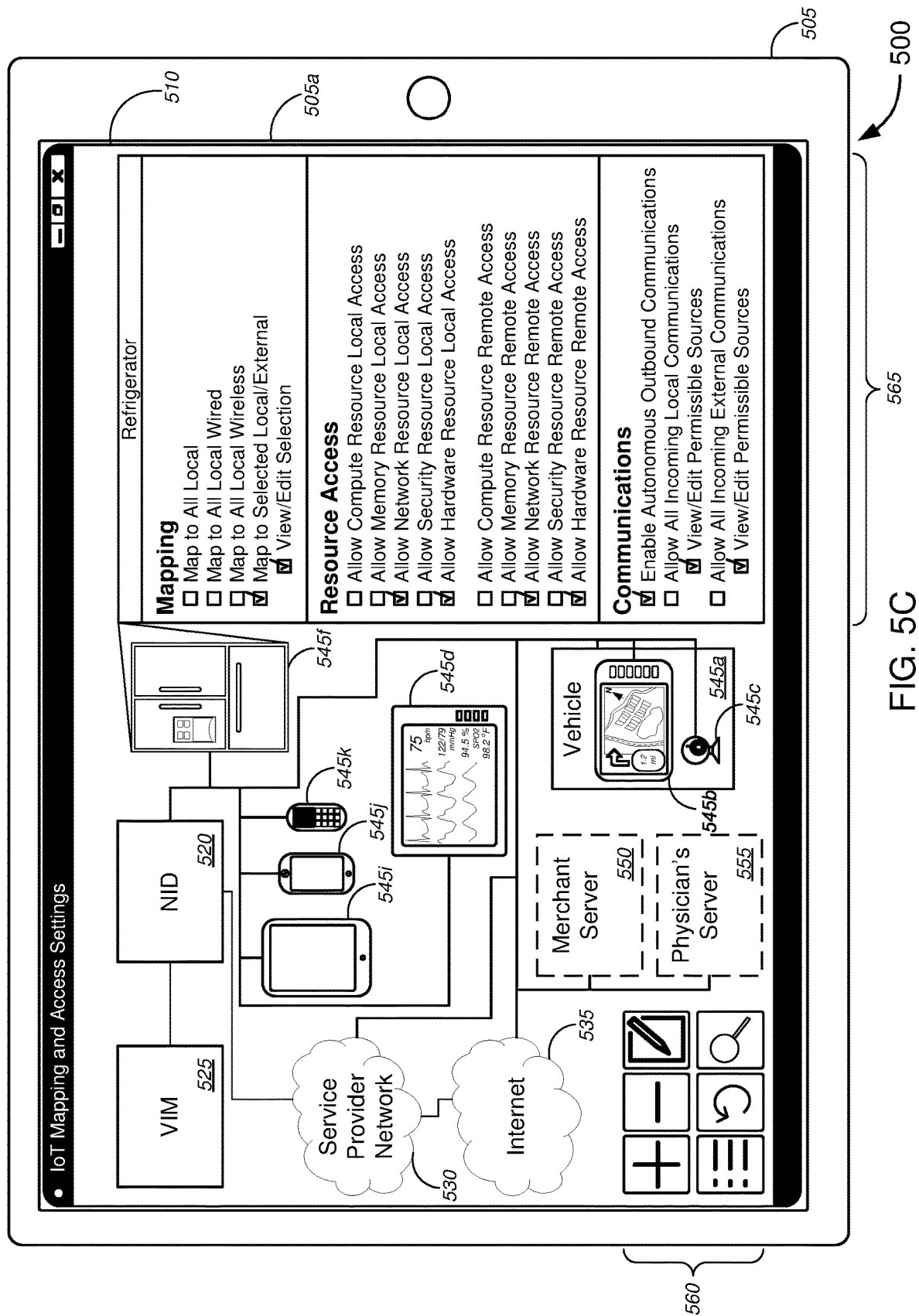

With reference to FIG. 5C, the panel 565 for editing or viewing the mapping, access, and communications options for the refrigerator 545*f* might also be set by a user to "map to selected local/external" devices, and to "view/edit selection." With reference to the Grocery List Maker Example, the Food Recommendations Example, the Shopping List Example, and the Parts Replacement Example, the refrigerator 545*f* might be mapped to at least the vehicle 545*a*, the navigation system 545*b*, the medical device 545*d*, the Internet searching devices or computing devices (which includes the tablet computer 545*i*, the smart phone 545*j*, and/or the mobile phone 545*k*, among other devices, such as the desktop 545*p*, laptop 545*q*, and server 545*m* (shown in FIG. 5A)), the pantry system (not shown), database 5451 (shown in FIG. 5A), the merchant server 550, the physician's server 555, and/or the like.

In some embodiments, the user might allow local access (to the mapped local devices 545 and/or hardware/network resources) to the refrigerator's 545*f* network resource and/or hardware resource. In a similar manner, the user might also allow remote access (to the mapped remote devices 545 and/or hardware/network resources) to the refrigerator's 545*f* network resource and/or hardware resource. According to some embodiments, the user might also select to enable autonomous outbound communications by the refrigerator 545*f*, which would allow the refrigerator 545*f* to autonomously initiate communications with other user devices 545 and/or hardware/network resources, such as communications with the vehicle 545*a*, the navigation system 545*b*, the medical device 545*d*, the Internet searching devices or computing devices (which includes the tablet computer 545*i*, the smart phone 545*j*, and/or the mobile phone 545*k*, among other devices, such as the desktop 545*p*, laptop 545*q*, and server 545*m* (shown in FIG. 5A)), the pantry system (not shown), database 5451 (shown in FIG. 5A), the merchant server 550, the physician's server 555, and/or the like, as described above in the Grocery List Maker Example, the Food Recommendations Example, the Shopping List Example, and the Parts Replacement Example, or the like. Similarly, the user might, in some cases, select not to allow all incoming local or external communications, instead choosing to view/edit permissible local and remote sources of communications, or the like.

Figure 5D:
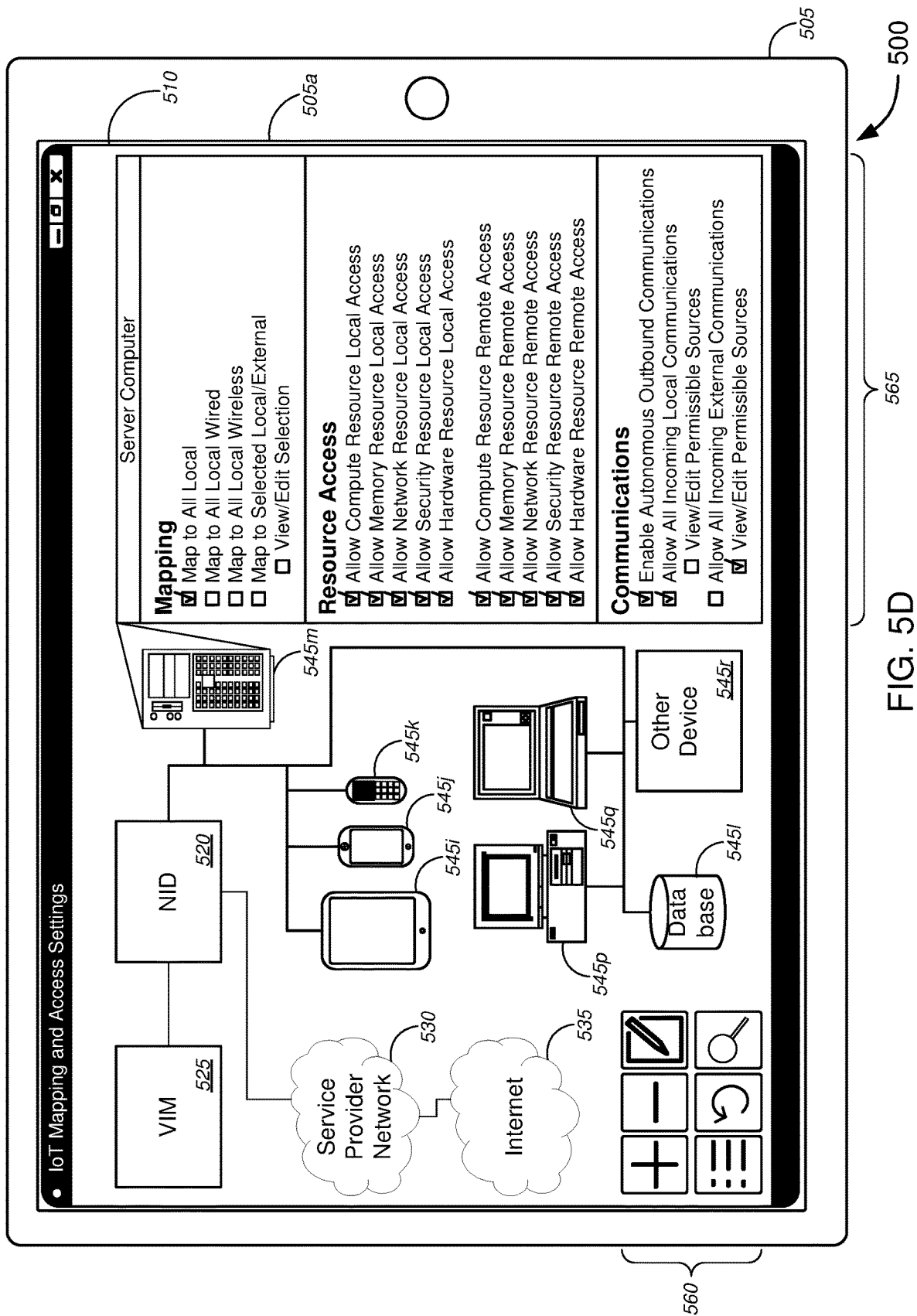

Turning to FIG. 5D, in some embodiments, a server 545*m* located at a customer premises might be set, by the user via the panel 565, to "map to all local" devices, or the like. In some embodiments, the user might allow local access (to the mapped local devices 545 and/or hardware/network resources) to the server's 545*m* compute resource, memory resource, network resource, security resource, and/or hardware resource. In a similar manner, the user might also allow remote access (to the mapped remote devices 545 and/or hardware/network resources) to the server's 545*m* compute resource, memory resource, network resource, security resource, and/or hardware resource. According to some embodiments, the user might also select to enable autonomous outbound communications by the server 545*m*, which would allow the server 545*m* to autonomously initiate communications with other user devices 545 and/or hardware/network resources, such as communications with the tablet computer 545*i*, the smart phone 545*j*, the mobile phone 545*k*, desktop 545*p*, laptop 545*q*, database 5451, other devices 545*r*, and/or the like, as described above. Similarly, the user might, in some cases, allow all incoming local communications, and might select not to allow all incoming external communications, instead choosing to view/edit permissible remote sources of communications, or the like.

Figure 5E:
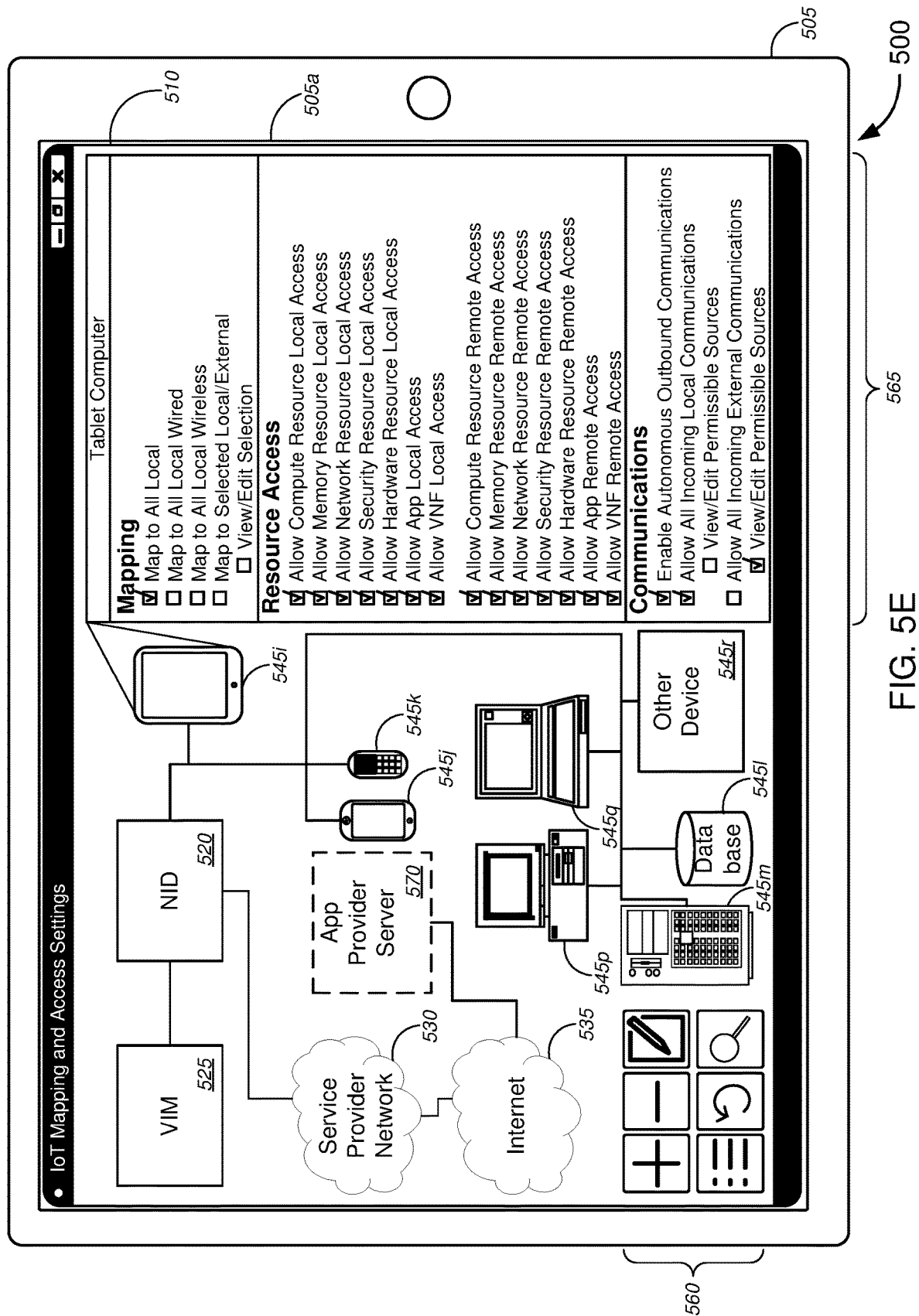

In the embodiment of FIG. 5E, a tablet computer 545*i* might be set, by the user via the panel 565, to "map to all local" devices, or the like. In some embodiments, the user might allow local access (to the mapped local devices 545 and/or hardware/network resources) to the server's 545*m* compute resource, memory resource, network resource, security resource, and/or hardware resource. In a similar manner, the user might also allow remote access (to the mapped remote devices 545 and/or hardware/network resources) to the server's 545*m* compute resource, memory resource, network resource, security resource, and/or hardware resource. In some instances, the user might further allow local access to one or more apps or programs running on the tablet computer 545*i* and/or local access to one or more virtual network functions ("VNFs") running on the tablet computer 545*i*, or the like. Likewise, the user might further allow remote access to one or more apps or programs running on the tablet computer 545*i* and/or remote access to one or more VNFs running on the tablet computer 545*i*, or the like.

According to some embodiments, the user might also select to enable autonomous outbound communications by the tablet computer 545*i*, which would allow the tablet computer 545*i* to autonomously initiate communications with other user devices 545 and/or hardware/network resources, such as communications with the smart phone 545*j*, the mobile phone 545*k*, desktop 545*p*, laptop 545*q*, server 545*m*, database 545*l*, other devices 545*r*, app provider server 570, and/or the like, as described above. Similarly, the user might, in some cases, allow all incoming local communications, and might select not to allow all incoming external communications, instead choosing to view/edit permissible remote sources of communications, or the like.

Figure 5F:
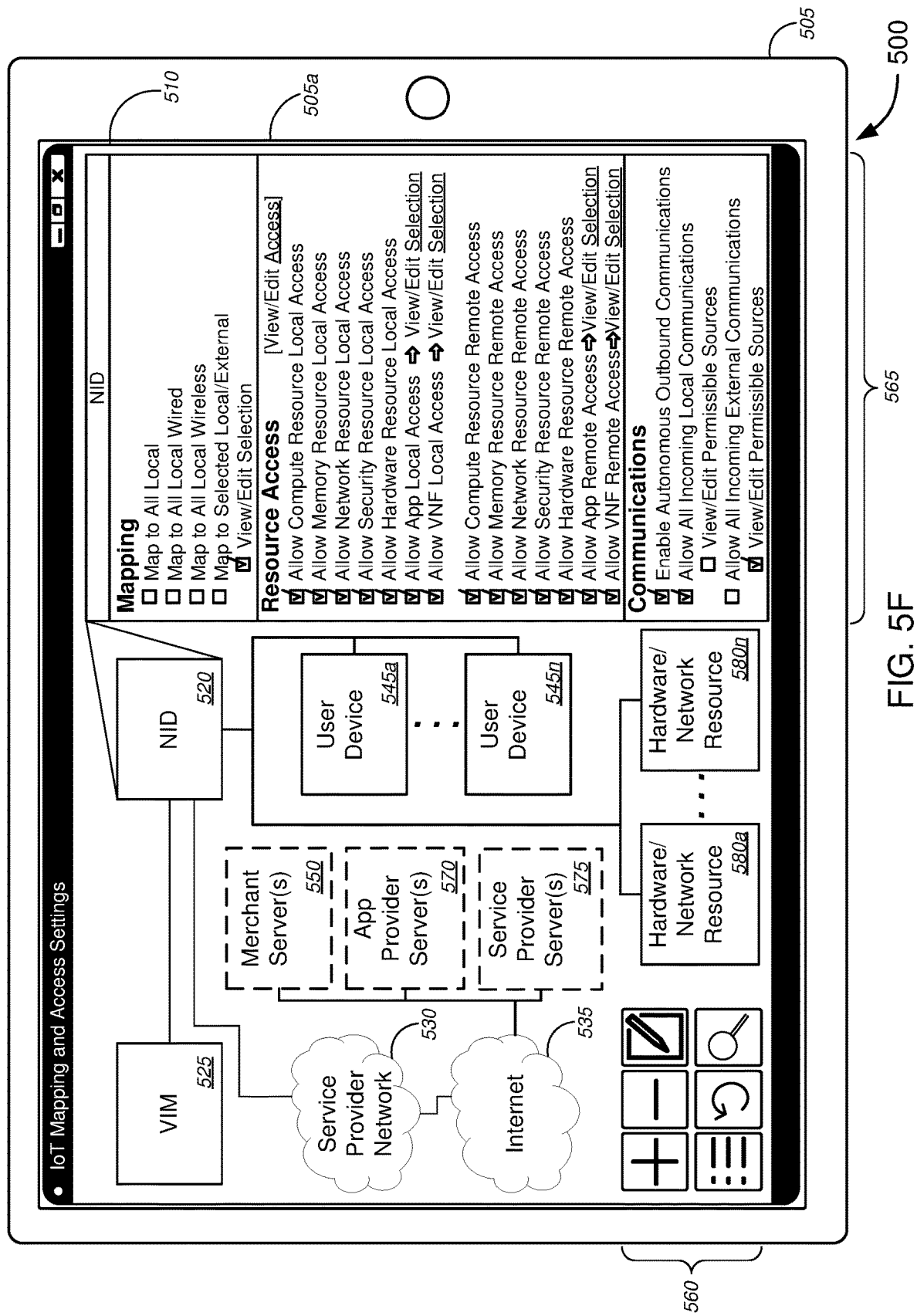

With reference to FIG. 5F, in some embodiments, the panel 565 for editing or viewing the mapping, access, and communications options for the NID 520 might be set by a user to "view/edit selection" of devices 545 and/or hardware/network resources. Using the panel 565, the user might view or edit access of resources that are mapped to and/or registered with the NID 520, including, but not limited to, user device 545*a* through 545*n*, hardware/network resource 580*a* through 580*n*, merchant server(s) 550, app provider server(s) 570, service provider server(s) 575, and/or the like.

According to some embodiments, the user might allow local access (to the mapped local devices 545 and/or hardware/network resources) to the NID's 520 compute resource, memory resource, network resource, security resource, and/or hardware resource, and/or to the compute resource, memory resource, network resource, security resource, and/or hardware resource of user devices 545 and/or hardware/network resources that are mapped to and/or registered with the NID 520. In a similar manner, the user might also allow remote access (to the mapped local devices 545 and/or hardware/network resources) to the NID's 520 compute resource, memory resource, network resource, security resource, and/or hardware resource, and/or to the compute resource, memory resource, network resource, security resource, and/or hardware resource of user devices 545 and/or hardware/network resources that are mapped to and/or registered with the NID 520. In some instances, the user might further allow local access to one or more apps or programs and/or to one or more VNFs, or the like, running on the NID 520 and/or on user devices 545 and/or hardware/network resources that are mapped to and/or registered with the NID 520. In some cases, the user might be given the option to view and/or edit the selection of apps/programs and/or VNFs. Likewise, the user might further allow remote access to one or more apps or programs and/or to one or more VNFs, or the like, running on the NID 520 and/or on user devices 545 and/or hardware/network resources that are mapped to and/or registered with the NID 520. In some cases, the user might be given the option to view and/or edit the selection of apps/programs and/or VNFs.

According to some embodiments, the user might also select to enable autonomous outbound communications by the NID 520 and/or on user devices 545 and/or hardware/network resources that are mapped to and/or registered with the NID 520, which would allow the NID 520 and/or on user devices 545 and/or hardware/network resources that are mapped to and/or registered with the NID 520 to autonomously initiate communications with other user devices 545 and/or hardware/network resources, such as communications with the user device 545*a* through 545*n*, hardware/network resource 580*a* through 580*n*, merchant server(s) 550, app provider server(s) 570, service provider server(s) 575, and/or the like, as described above. Similarly, the user might, in some cases, allow all incoming local communications, and might select not to allow all incoming external communications, instead choosing to view/edit permissible remote sources of communications, or the like.

The various embodiments are not limited to the specific examples as described above with respect to FIGS. 5A-5F, and any suitable implementation in accordance with the embodiments described may be implemented as appropriate or as desired. In the various embodiments, one or more first VNFs might allow for inter-device/inter-network (autonomous) communications, while one or more second VNFs might allow for generating the GUI for mapping and access control of resources or device communications. In some cases, the one or more first VNFs and the one or more second VNFs might be the same VNFs.

FIGS. 6A-6D (collectively, "FIG. 6") represent system flow diagrams illustrating a method 600 for implementing customer-based IoT—transparent privacy functionality, in accordance with various embodiments. The embodiments as represented in FIG. 6 are merely illustrative and are not intended to limit the scope of the various embodiments. With reference to FIG. 6, method 600 in FIG. 6A continues onto FIG. 6B, linked by the circular marker denoted by "A," continues from FIG. 6B onto FIG. 6C, linked by the circular marker denoted by "B," and continues from FIG. 6C onto FIG. 6D, linked by the circular marker denoted by "C." Blocks outlined in dash-long dash lines indicate optional processes in the method 600.

While the techniques and procedures are depicted and/or described in a certain order for purposes of illustration, it should be appreciated that certain procedures may be reordered and/or omitted within the scope of various embodiments. Moreover, while the method illustrated by FIG. 6 can be implemented by or with (and, in some cases, are described below with respect to) the systems 100 and 200 of FIGS. 1 and 2, respectively (or components thereof) as well as the customer portal of FIG. 3A, such methods may also be implemented using any suitable hardware implementation or system. Similarly, while each of the systems 100 and 200 of FIGS. 1 and 2, respectively (or components thereof) as well as the customer portal of FIG. 3A can operate or be used according to the method illustrated by FIG. 6 (e.g., by executing instructions embodied on a computer readable medium), the systems 100 and 200 of FIGS. 1 and 2, respectively (or components thereof) as well as the customer portal of FIG. 3A each can be used according to other modes of operation and/or perform other suitable procedures.

Figure 6A:
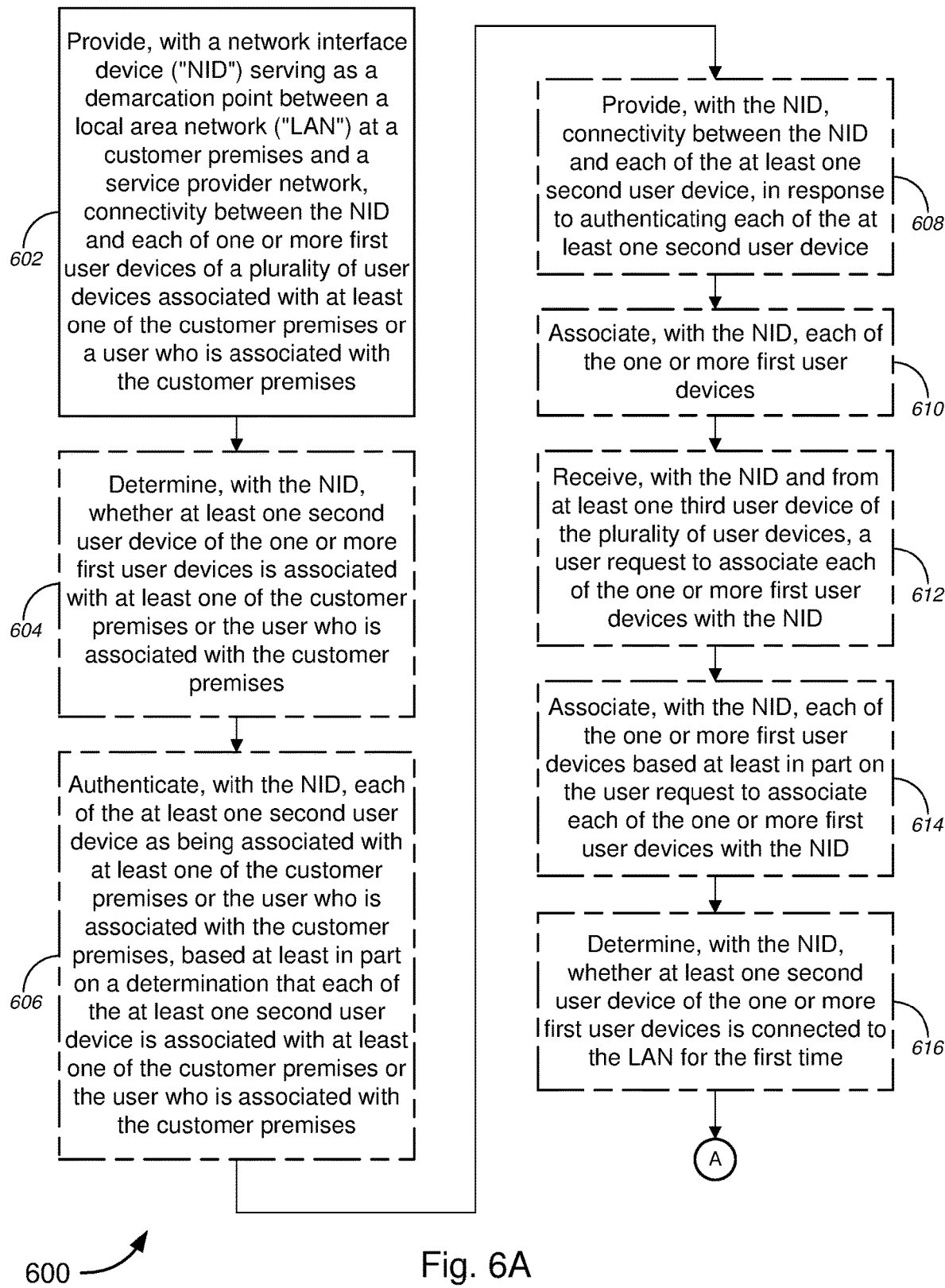
FIGS. 6A-6D represent system flow diagrams illustrating a method for implementing customer-based IoT—transparent privacy functionality, in accordance with various embodiments.

Turning to FIG. 6A, method 600 might comprise, at block 602, providing, with a network interface device ("NID") serving as a demarcation point between a local area network ("LAN") at a customer premises and a service provider network, connectivity between the NID (e.g., NID 125, NIDs 180*a*-180*n*, or NID 205 of corresponding FIGS. 1 and 2) and each of one or more first user devices of a plurality of user devices (e.g., one or more of customer device(s) 115, wireless device(s) 120, user device(s) 160, user device(s) 165, resource node(s) 170, NID 205, user device(s) 215, wired user device(s) 215*a*, wireless user device(s) 215*b*, resource node(s) 220, and/or the like, as described in detail above with respect to FIGS. 1 and 2) that are associated with at least one of the customer premises or a user who is associated with the customer premises. In some embodiments, providing connectivity between the NID and each of the one or more first user devices of the plurality of user devices associated with at least one of the customer premises or the user who is associated with the customer premises might comprise determining, with the NID, whether at least one second user device of the one or more first user devices is associated with at least one of the customer premises or the user who is associated with the customer premises (optional block 604); authenticating, with the NID, each of the at least one second user device of the one or more first user devices as being associated with at least one of the customer premises or the user who is associated with the customer premises, based at least in part on a determination that each of the at least one second user device of the one or more first user devices is associated with at least one of the customer premises or the user who is associated with the customer premises (optional block 606); and providing, with the NID, connectivity between the NID and each of the at least one second user device, in response to authenticating each of the at least one second user device of the one or more first user devices (optional block 608).

At optional block 610, method 600 might comprise associating, with the NID, each of the one or more first user devices (prior to sending the at least one VNF to each of the one or more first user devices at optional block 636 below). In some instances, associating each of the one or more first user devices might comprise receiving, with the NID and from the at least one third user device of the plurality of user devices, a user request to associate each of the one or more first user devices with the NID (optional block 612) and associating, with the NID, each of the one or more first user devices, based at least in part on the user request to associate each of the one or more first user devices with the NID (optional block 614). Alternatively, associating each of the one or more first user devices might comprise determining, with the NID, whether at least one second user device of the one or more first user devices is connected to the LAN for the first time (optional block 616) and automatically associating, with the NID, each of the at least one second user device in response to a determination that at least one second user device is connected to the LAN for the first time (optional block 618; shown in FIG. 6B, following circular marker denoted by "A").

Figure 6B:
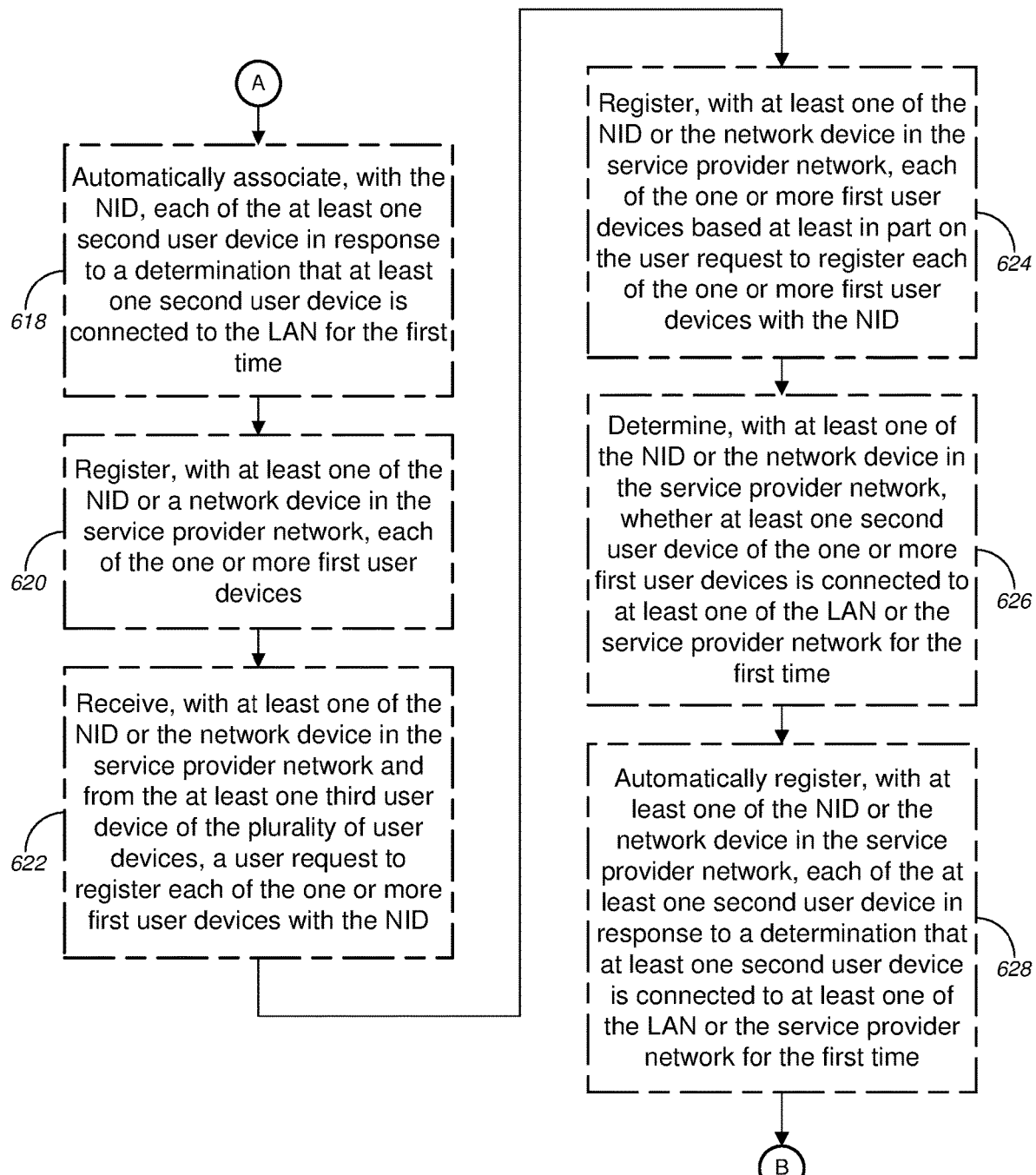

As shown in FIG. 6B, method 600 might, at optional block 620, comprise registering, with the NID (e.g., NID 125 of FIG. 1) or with a network device (e.g., at least one of VIM 130, NID 180a-180n, VIM 175, VIM 175a-175n, registration agent 190, and/or the like of FIG. 1) in the service provider network (e.g., provider network(s) 135 or other networks 185a-185n accessible to NID 125 via provider network(s) 135, or the like, of FIG. 1), each of the one or more first user devices (prior to sending the at least one VNF to each of the one or more first user devices at optional block 636 below). In some instances, registering each of the one or more first user devices might comprise receiving, with at least one of the NID or the network device in the service provider network and from the at least one third user device of the plurality of user devices, a user request to register each of the one or more first user devices with the NID (optional block 622) and registering, with at least one of the NID or the network device in the service provider network, each of the one or more first user devices, based at least in part on the user request to register each of the one or more first user devices with the NID (optional block 624). Alternatively, registering each of the one or more first user devices might comprise determining, with at least one of the NID or the network device in the service provider network, whether at least one second user device of the one or more first user devices is connected to the LAN for the first time (optional block 626) and automatically registering, with the NID, each of the at least one second user device in response to a determination that at least one second user device is connected to the LAN for the first time (optional block 628). Method 600 then proceeds to block 630 in FIG. 6C, following circular marker denoted by "B".

Figure 6C:
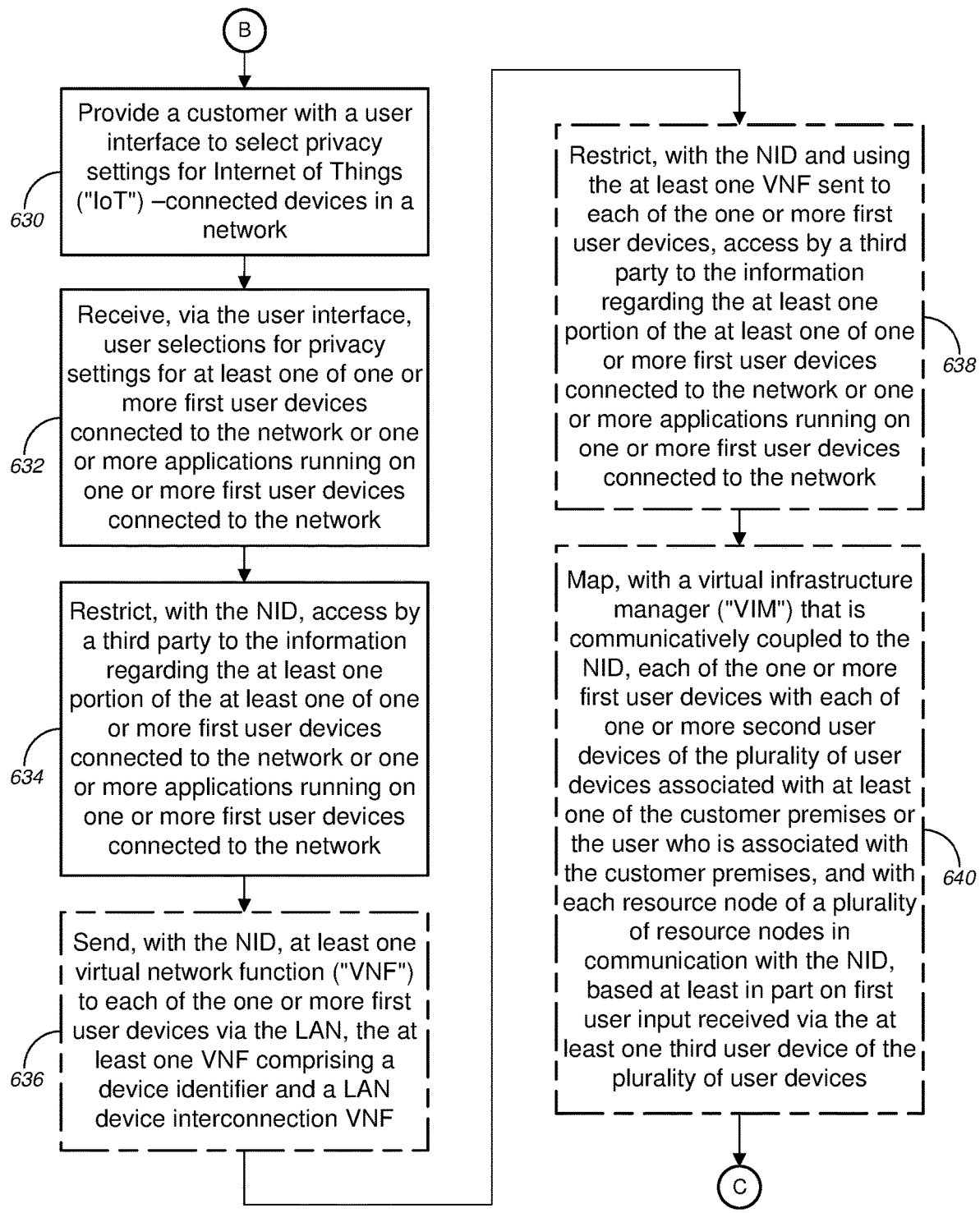

Turning to FIG. 6C, method 600 might further comprise providing a customer with a user interface to select privacy settings for Internet of Things ("IoT")—connected devices in a network (block 630) and receiving, via the user interface, user selections for privacy settings for at least one of one or more first user devices connected to the network or one or more applications running on one or more first user devices connected to the network (block 632). At block 634, method 600 might comprise, in response to determining that the received user selections comprise a selection to restrict access to information regarding at least one portion of the at least one of one or more first user devices connected to the network or one or more applications running on one or more first user devices connected to the network, restricting, with the NID, access by a third party to the information regarding the at least one portion of the at least one of one or more first user devices connected to the network or one or more applications running on one or more first user devices connected to the network.

Method 600, at optional block 636, might comprise sending, with the NID, at least one virtual network function ("VNF") to each of the one or more first user devices via the LAN, the at least one VNF comprising a device identifier and a LAN device interconnection VNF. In some cases, the at least one VNF is sent to each user device via an application programming interface ("API") between the NID and each user device. Method 600 might further comprise, at optional block 638, restricting, with the NID and using the at least one VNF sent to each of the one or more first user devices, access by a third party to the information regarding the at least one portion of the at least one of one or more first user devices connected to the network or one or more applications running on one or more first user devices connected to the network. At block 640, method 600 might comprise mapping, with a virtual infrastructure manager ("VIM") that is communicatively coupled to the NID, each of the one or more first user devices with each of one or more second user devices of the plurality of user devices associated with at least one of the customer premises or the user who is associated with the customer premises, and with each resource node of a plurality of resource nodes in communication with the NID, based at least in part on first user input received via at least one third user device (e.g., user device 315 of FIG. 3) of the plurality of user devices. In some cases, the VIM might be one of located in the LAN, located in the service provider network, or split between the LAN and the service provider network. Method 600 then proceeds to block 642 in FIG. 6D, following circular marker denoted by "C".

Figure 6D:
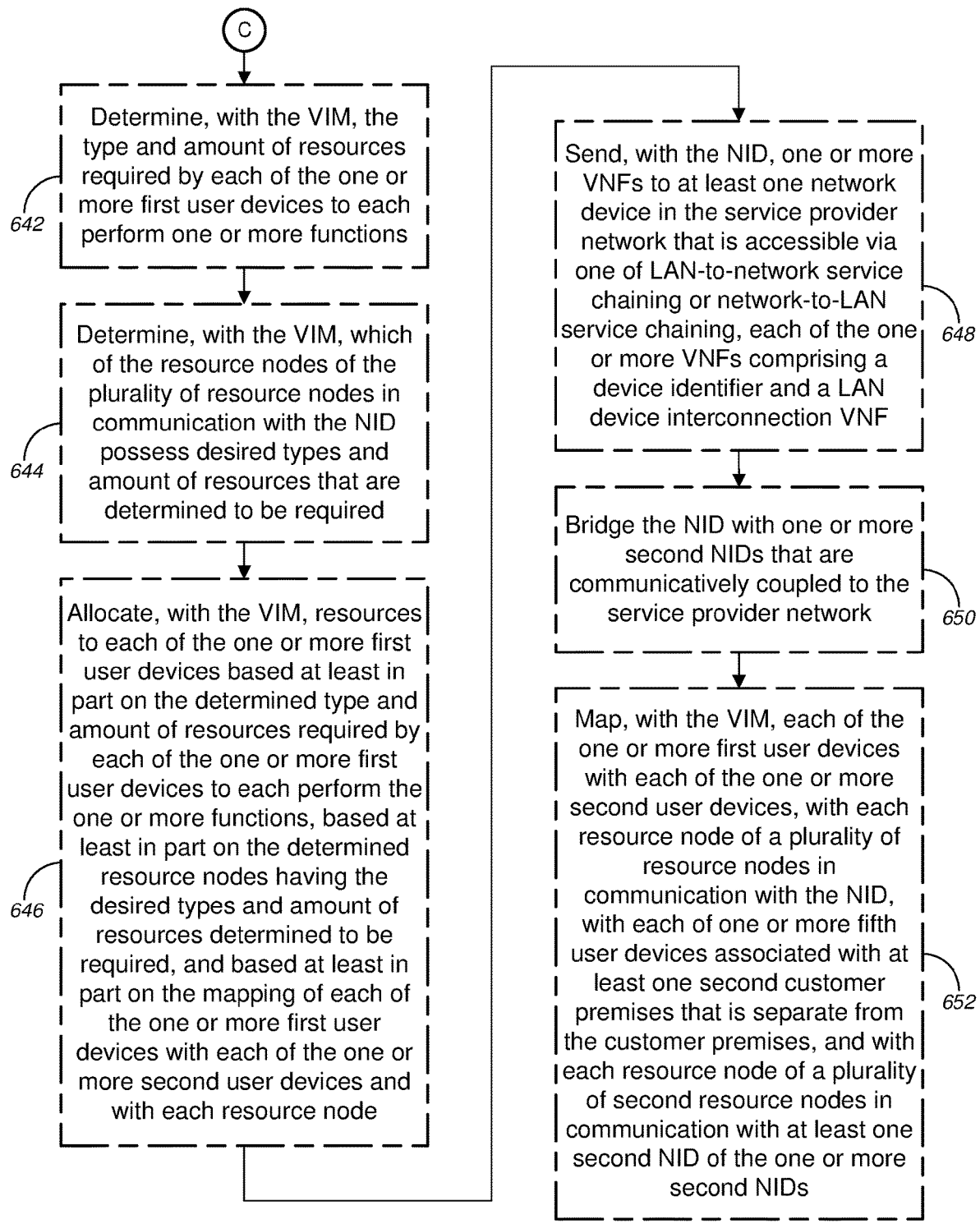

According to some embodiments, as shown in FIG. 6D, method 600 might further comprise determining, with the VIM, the type and amount of resources required by each of the one or more first user devices to each perform one or more functions (optional block 642), determining, with the VIM, which of the resource nodes of the plurality of resource nodes in communication with the NID possess desired types and amount of resources that are determined to be required (optional block 644), and allocating, with the VIM, resources to each of the one or more first user devices, based at least in part on the determined type and amount of resources required by each of the one or more first user devices to each perform the one or more functions, based at least in part on the determined resource nodes having the desired types and amount of resources determined to be required, and based at least in part on the mapping of each of the one or more first user devices with each of the one or more second user devices and with each resource node (optional block 646). In some cases, allocating resources to each of the one or more first user devices is further based on second user input received via the at least one third user device of the plurality of user devices.

In some embodiments, method 600 might further comprise sending, with the NID, one or more VNFs to at least one network device in the service provider network that is accessible via one of LAN-to-network service chaining or network-to-LAN service chaining, each of the one or more VNFs comprising a device identifier and a LAN device interconnection VNF (optional block 648). Service chaining is described in detail in the '208, '280, and '309 applications (which are already incorporated herein by reference in their entirety). At optional block 650, method 600 might comprise bridging the NID with one or more second NIDs (e.g., one of NIDs 180a-180n of FIG. 1) that are communicatively coupled to the service provider network. Method 600, at optional block 652, might comprise mapping, with the VIM, each of the one or more first user devices with each of the one or more second user devices, with each resource node of a plurality of resource nodes in communication with the NID, with each of one or more fifth user devices associated with at least one second customer premises that is separate from the customer premises, and with each resource node of a plurality of second resource nodes in communication with at least one second NID of the one or more second NIDs.

Merely by way of example, although not shown in FIG. 6, method 600 might further comprise, based on a determination that the received user selections comprise a selection to set to privacy settings to private for one of a software application ("app") or a VNF that is running on one or more of the plurality of user devices, restricting, with the NID, a third party—which herein might refer to at least one of a service provider, who is associated with one of an application ("app") or a VNF that is running on the one or more of the plurality of user devices, or a party that is unassociated with the app or the VNF—from at least one of: access to the one of the app or the VNF that is running on the one or more of the plurality of user devices; access to information regarding resources mapped to the one or more of the plurality of user devices on which the one of the app or the VNF that is running; access to information regarding all resources registered to the NID that are mapped to the one or more of the plurality of user devices; access to information regarding all resources registered to the NID; access to the resources mapped to the one or more of the plurality of user devices on which the one of the app or the VNF that is running; access to all resources registered to the NID that are mapped to the one or more of the plurality of user devices; or access to the NID; and/or the like.

Alternatively, or in addition, method 600 might further comprise (although not shown in FIG. 6), based on a determination that the received user selections comprise a selection to set to privacy settings to public for one of a software application ("app") or a VNF that is running on one or more of the plurality of user devices, providing, with the NID, a third party with at least one of: access to the one of the app or the VNF that is running on the one or more of the plurality of user devices; access to information regarding resources mapped to the one or more of the plurality of user devices on which the one of the app or the VNF that is running; access to information regarding all resources registered to the NID that are mapped to the one or more of the plurality of user devices; access to information regarding all resources registered to the NID; access to the resources mapped to the one or more of the plurality of user devices on which the one of the app or the VNF that is running; access to all resources registered to the NID that are mapped to the one or more of the plurality of user devices; or access to the NID; and/or the like.

According to some embodiments, the privacy settings for at least one of one or more user devices connected to the network or one or more applications running on one or more user devices connected to the network comprise at least one of: option to allow or deny third party general access; option to allow or deny third party selective access to information about device type of at least one user device of the one or more user devices; option to allow or deny third party selective access to information about use of at least one user device of the one or more user devices; option to allow or deny third party selective access to information about one or more applications running on at least one user device of the one or more user devices; option to allow or deny third party selective access to information about one or more NFVs running on at least one user device of the one or more user devices; option to allow or deny third party selective access to information about types of resource usage on at least one user device of the one or more user devices; option to allow or deny third party selective access to information about amount of resource use on at least one user device of the one or more user devices; and/or the like.

In some embodiments, although not shown in FIG. 6, method 600 might also comprise receiving, via the user interface, user selections for privacy settings for the NID, wherein the privacy settings for the NID comprises at least one of: option to allow or deny third party general access; option to allow or deny third party selective access to information about device type of at least one user device of the one or more user devices that is mapped to the NID; option to allow or deny third party selective access to information about use of at least one user device of the one or more user devices that is mapped to the NID; option to allow or deny third party selective access to information about one or more applications running on at least one user device of the one or more user devices that is mapped to the NID; option to allow or deny third party selective access to information about one or more NFVs running on at least one user device of the one or more user devices that is mapped to the NID; option to allow or deny third party selective access to information about types of resource usage on at least one user device of the one or more user devices that is mapped to the NID; option to allow or deny third party selective access to information about amount of resource use on at least one user device of the one or more user devices that is mapped to the NID; option to allow or deny third party selective access to information about device types of all devices in the LAN; option to allow or deny third party selective access to information about use of all devices in the LAN; option to allow or deny third party selective access to information about one or more applications running on all devices in the LAN; option to allow or deny third party selective access to information about one or more VNF running on all devices in the LAN; option to allow or deny third party selective access to information about types of resource usage on all devices in the LAN; option to allow or deny third party selective access to information about amount of resource use on all devices in the LAN; and/or the like.

Figure 7A:
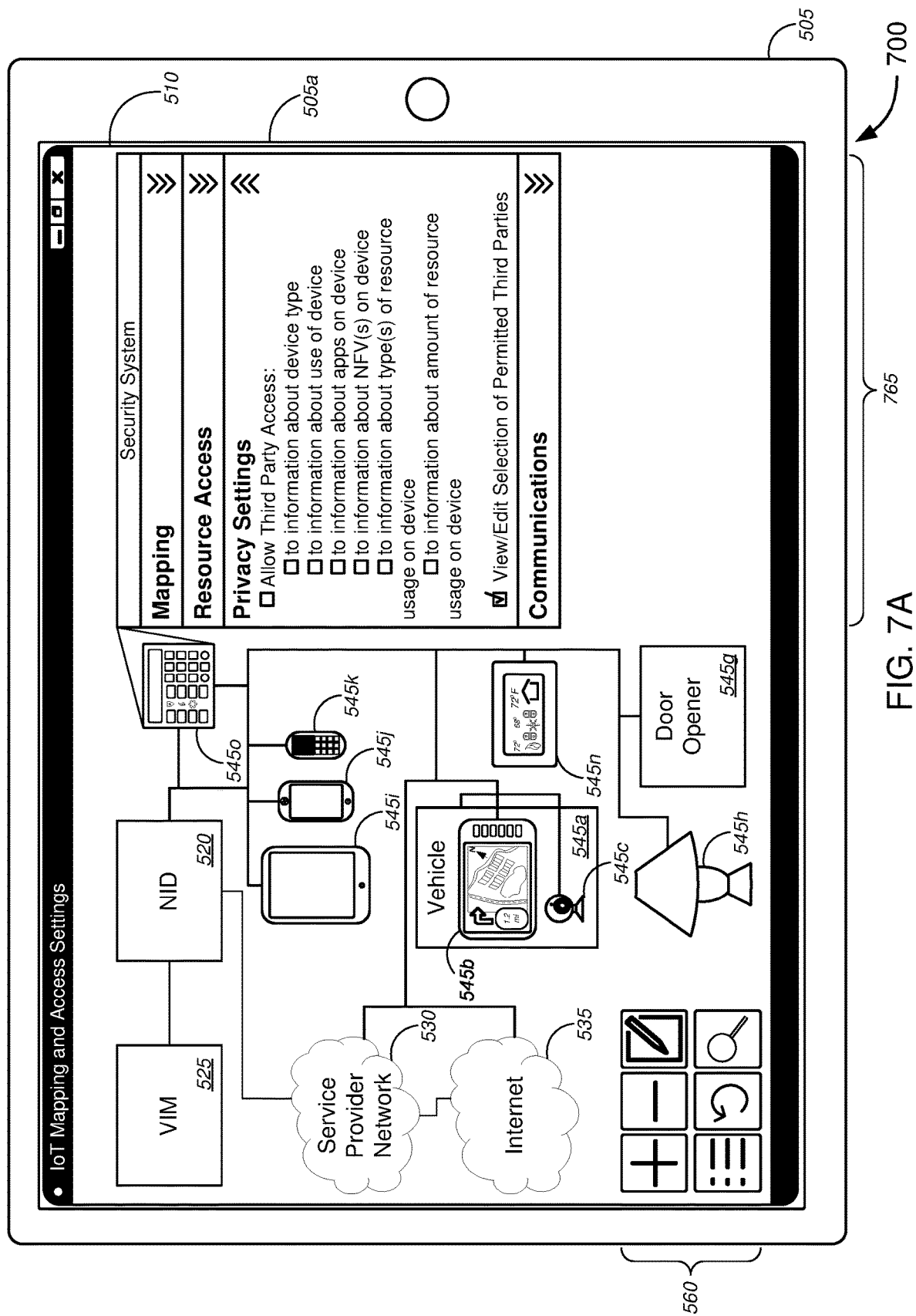
FIGS. 7A-7F are exemplary illustrations of user devices used by users that present graphical user interfaces configured for implementing customer-based IoT—transparent privacy functionality, in accordance with various embodiments.
Figure 7B:
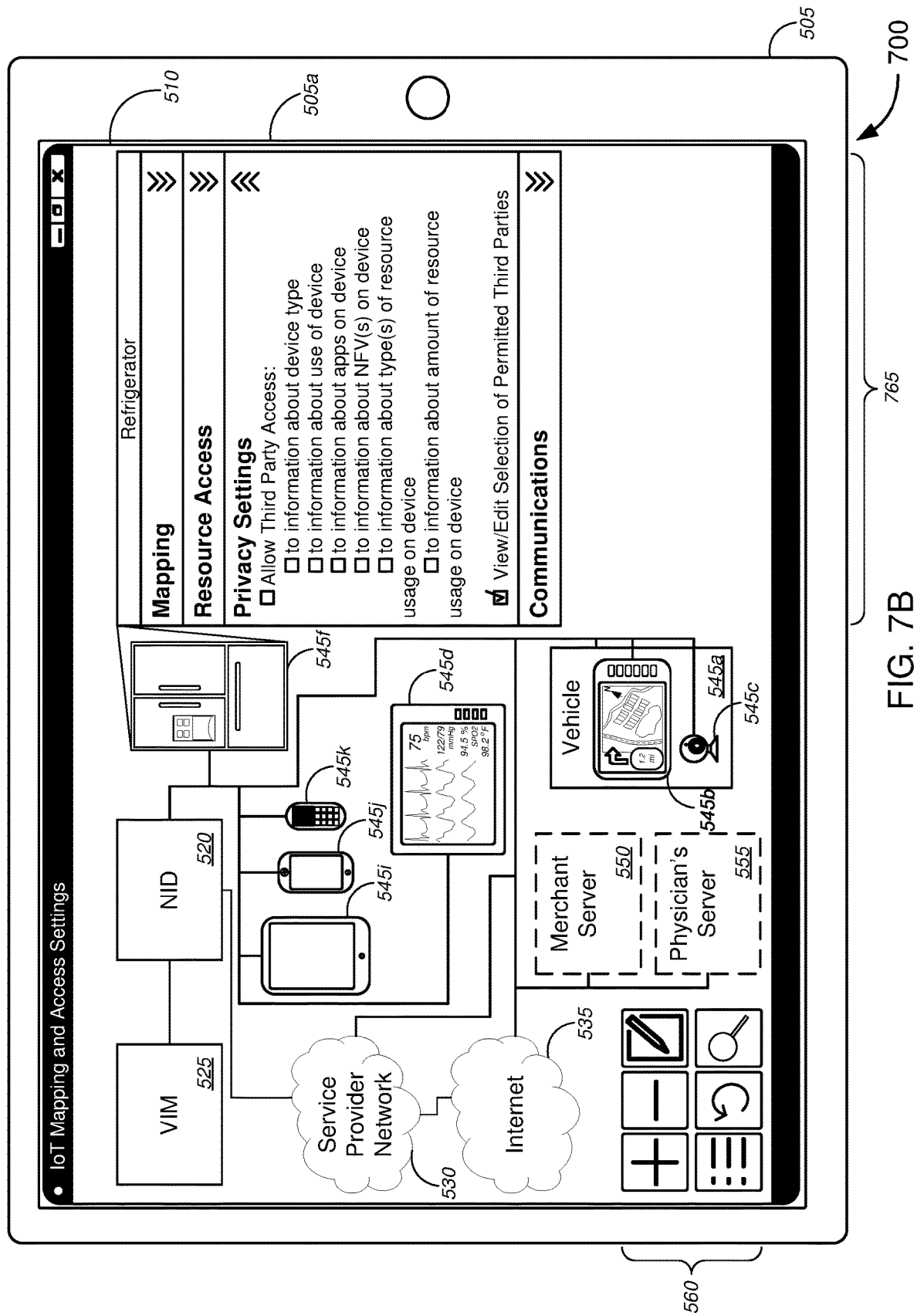
Figure 7C:
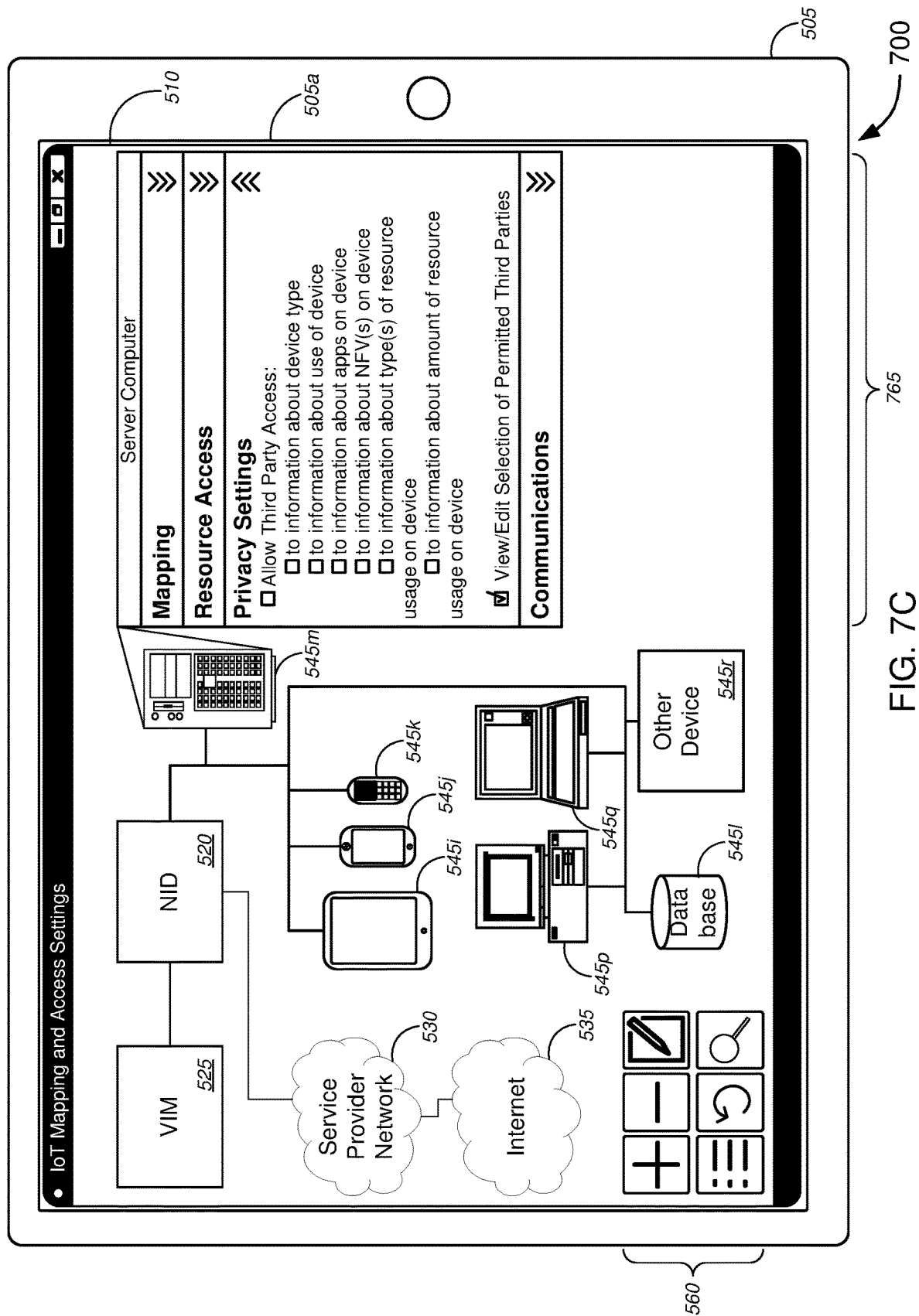
Figure 7D:
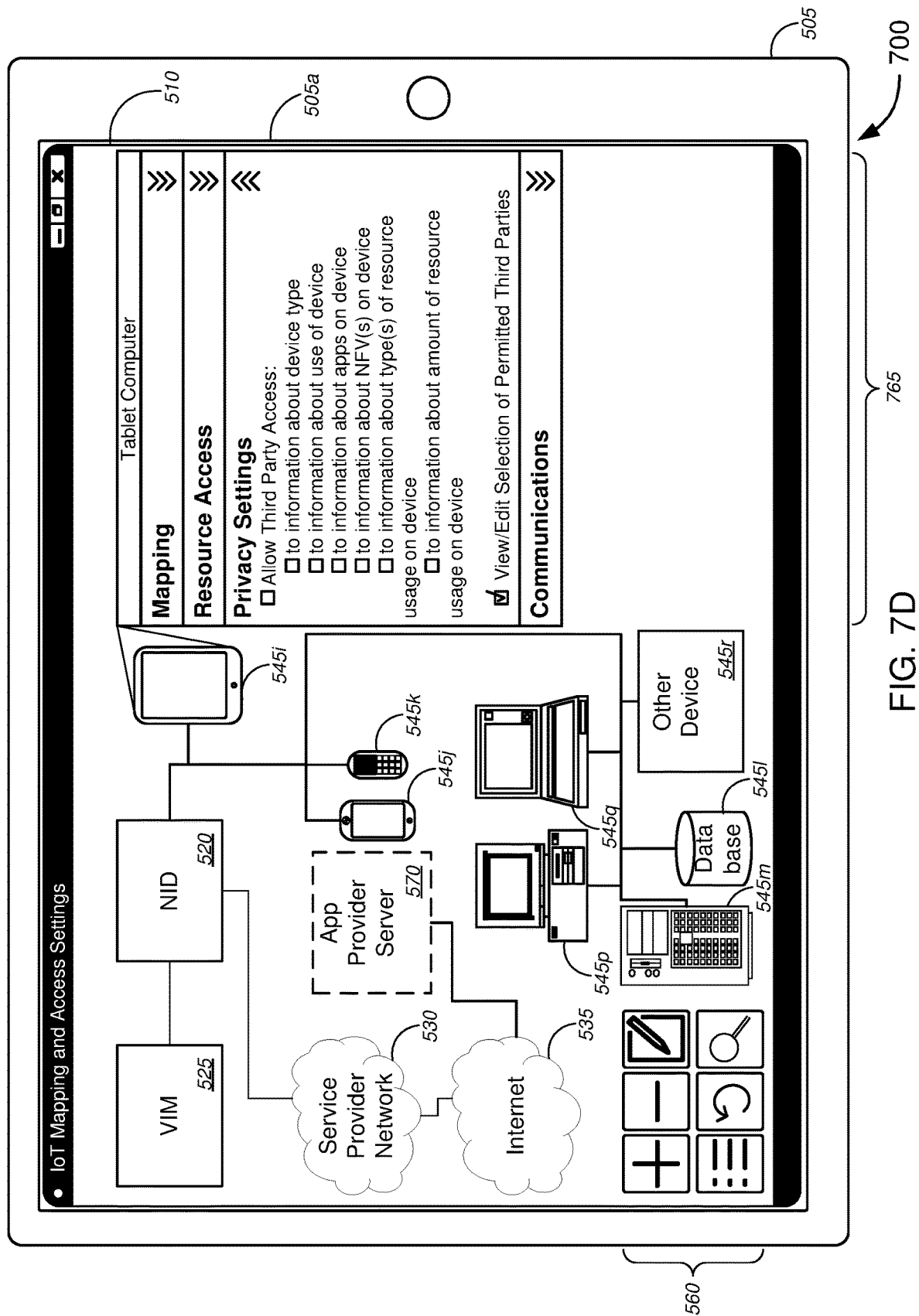
Figure 7E:
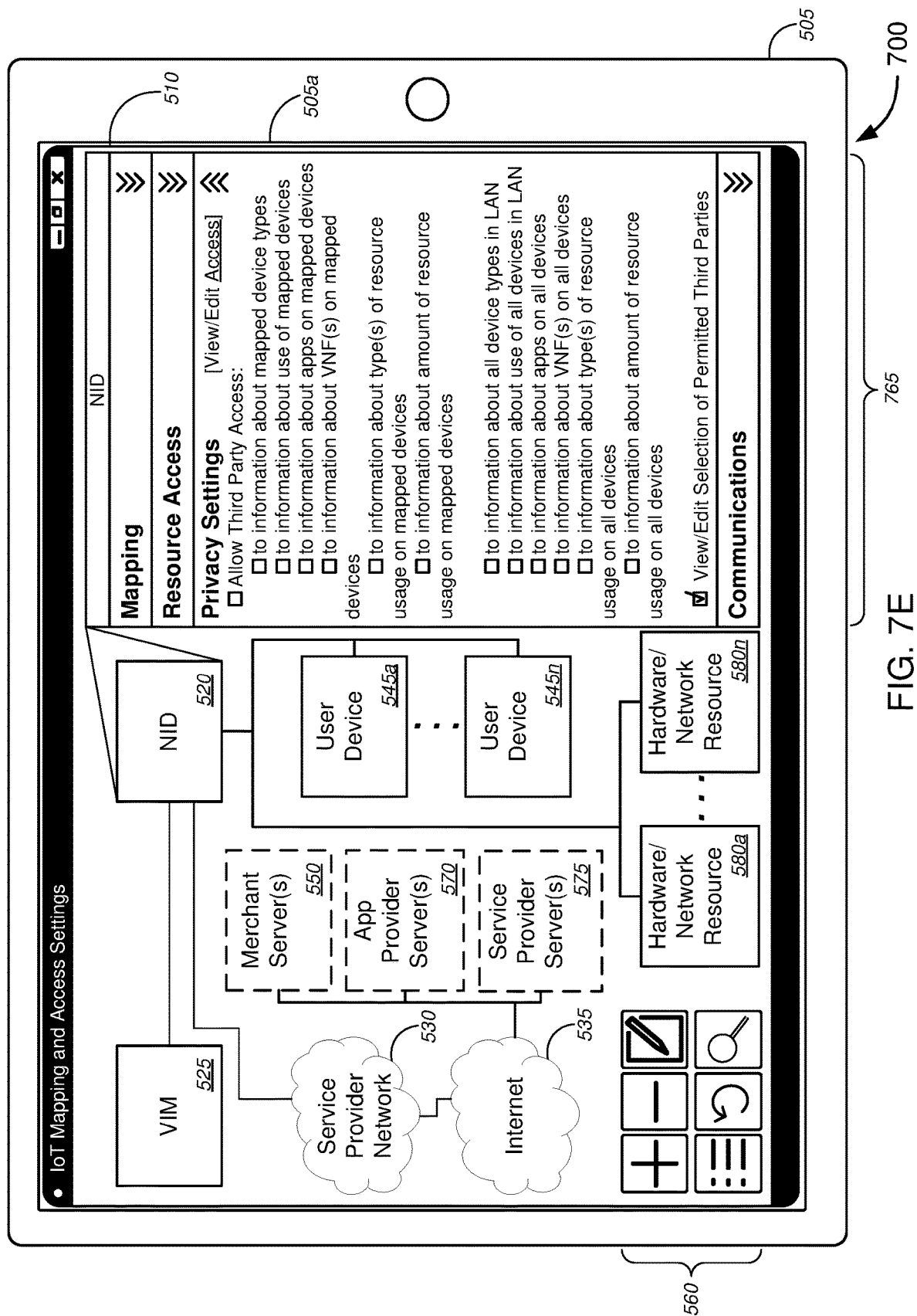
Figure 7F:
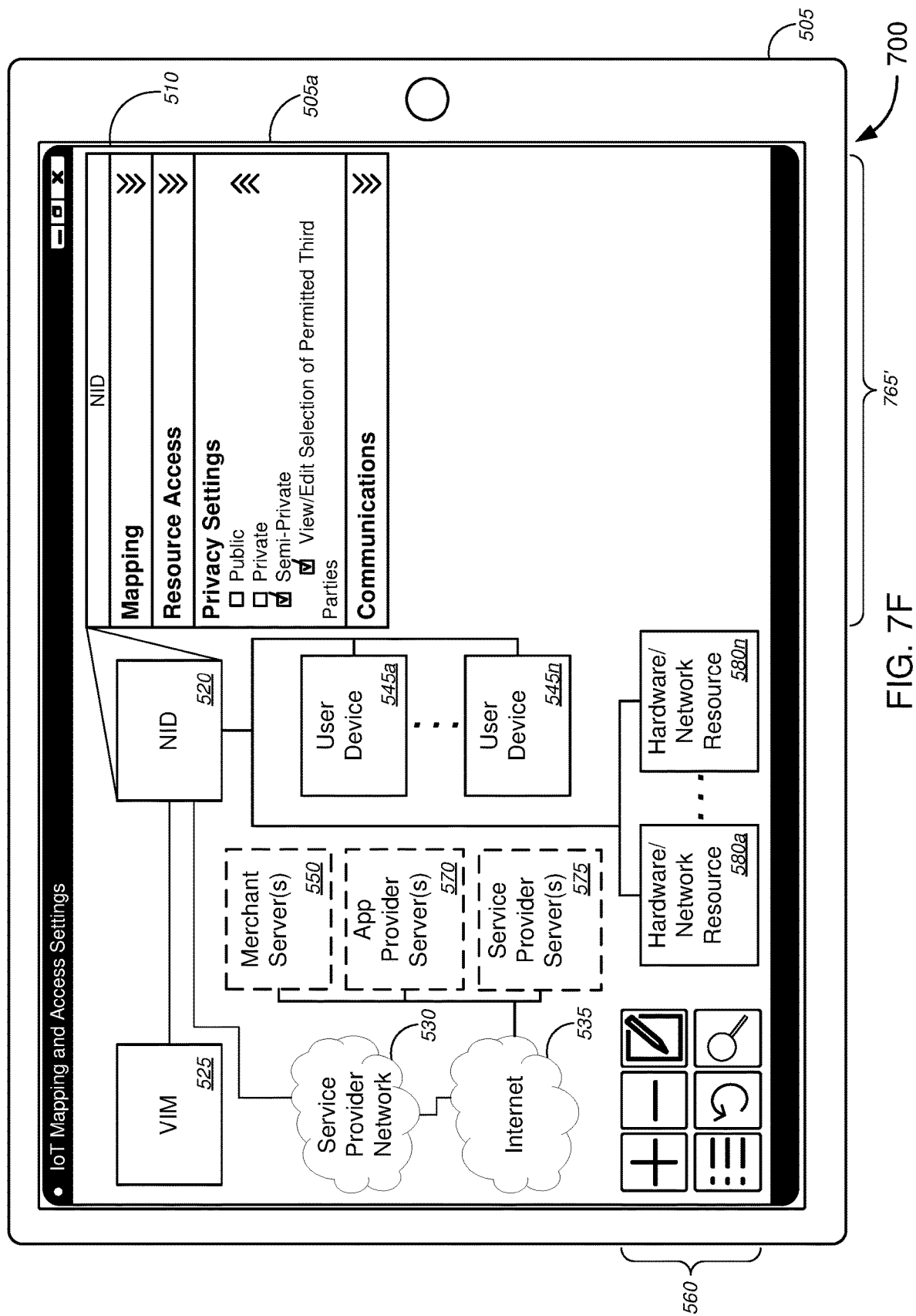

FIGS. 7A-7F (collectively, "FIG. 7") are exemplary illustrations of user devices 700 used by users that present graphical user interfaces configured for implementing customer-based IoT—transparent privacy functionality, in accordance with various embodiments. The embodiments of FIGS. 7A-7E are similar to, and otherwise identical to, the embodiments of FIGS. 5B-5F, respectively, except that FIGS. 7A-7E depict a non-limiting embodiment of privacy settings and options in panel 765, while hiding the settings and options for Mapping, Resource Access, and Communications (to be unhidden by clicking on the triple downward arrows or chevrons). FIG. 7F is an alternate implementation of the embodiment of FIG. 7E. The embodiments as represented in FIG. 7 are merely illustrative and are not intended to limit the scope of the various embodiments. For example, although the graphical user interfaces of FIG. 7, like those in FIG. 5, depict a line-by-line or line-to-line type GUI, various embodiments may employ a drag-and-drop type GUI (not shown) that allows for more intuitive graphical interaction between the user and the icons representing user devices, network devices, hardware resources, network resources, networks, permissions, and/or the like.

With reference to the embodiments of FIGS. 7A-7E, panel or sub-window 765 might be displayed with the mapping, resource access, and communications options for the security system 545o (of FIG. 5B), for the refrigerator 545f (of FIG. 5C), for the server computer 545m (of FIG. 5D), for the tablet computer 545i (of FIG. 5E), and for the NID 520 (of FIG. 5F), respectively. As shown in FIG. 7, however, the mapping, resource access, and communications options are hidden, although expandable by clicking on the downward pointing chevron icons (or similar icons or buttons) on the right of the sub-panel for each of the mapping, resource access, and communications options; once each sub-panel is displayed, the corresponding downward pointing chevron icon (or similar icon or button) becomes an upward pointing chevron icon (or similar icon or button). The privacy settings shown in FIG. 7, likewise, may be hidden by clicking on the upward pointing chevron (or similar icons or buttons) on the right of the sub-panel for the privacy settings; once the sub-panel is hidden, the upward pointing chevron icon (or similar icon or button) becomes a downward pointing chevron icon (or similar icon or button).

Turning to the embodiments of FIGS. 7A-7D, the privacy settings might provide the user with options to allow or deny general access by a third party (which might include, without limitation, at least one of a service provider, who is associated with one of an application ("app") or a VNF that is running on the one or more of the plurality of user devices, or a party that is unassociated with the app or the VNF, and the like), and/or options to allow or deny third party selective access to one or more of: information about device type of at least one user device of the one or more user devices; information about use of at least one user device of the one or more user devices; information about one or more applications running on at least one user device of the one or more user devices; information about one or more NFVs running on at least one user device of the one or more user devices; information about types of resource usage on at least one user device of the one or more user devices; information about amount of resource use on at least one user device of the one or more user devices; and/or the like. Alternatively, or additionally, the privacy settings might provide the user with options to "view/edit selection" of permitted third parties (as well as what each third party is permitted access to).

In a similar manner, with reference to FIG. 7E, the panel 765, in some embodiments, for editing or viewing the privacy options for the NID 520 might be set by a user to allow or deny general access by a third party and/or options to allow or deny third party selective access to one or more of: information about device type of at least one user device of the one or more user devices that is mapped to the NID; information about use of at least one user device of the one or more user devices that is mapped to the NID; information about one or more applications running on at least one user device of the one or more user devices that is mapped to the NID; information about one or more NFVs running on at least one user device of the one or more user devices that is mapped to the NID; information about types of resource usage on at least one user device of the one or more user devices that is mapped to the NID; information about amount of resource use on at least one user device of the one or more user devices that is mapped to the NID; information about device types of all devices in the LAN; information about use of all devices in the LAN; information about one or more applications running on all devices in the LAN; information about one or more VNF running on all devices in the LAN; information about types of resource usage on all devices in the LAN; information about amount of resource use on all devices in the LAN; and/or the like. Alternatively, or additionally, the privacy settings might provide the user with options to "view/edit selection" of permitted third parties (as well as what each third party is permitted access to).

Turning to FIG. 7F, rather than a full or partial list of specifically identified pieces of information that a user can select to allow or deny access to by a third party (as shown in panel 765 of FIG. 7E (for example), the privacy settings in panel 765' might simply allow a user to select amongst "public," "private," and "semi-private." Selection of the "public" option might allow a third party with access to one or more of: the one of the app or the VNF that is running on the one or more of the plurality of user devices; information regarding resources mapped to the one or more of the plurality of user devices on which the one of the app or the VNF that is running; information regarding all resources registered to the NID that are mapped to the one or more of the plurality of user devices; information regarding all resources registered to the NID; the resources mapped to the one or more of the plurality of user devices on which the one of the app or the VNF that is running; all resources registered to the NID that are mapped to the one or more of the plurality of user devices; the NID; and/or the like. Alternatively, selection of the "private" option might restrict a third party from access to one or more of: the one of the app or the VNF that is running on the one or more of the plurality of user devices; information regarding resources mapped to the one or more of the plurality of user devices on which the one of the app or the VNF that is running; information regarding all resources registered to the NID that are mapped to the one or more of the plurality of user devices; information regarding all resources registered to the NID; the resources mapped to the one or more of the plurality of user devices on which the one of the app or the VNF that is running; all resources registered to the NID that are mapped to the one or more of the plurality of user devices; the NID; and/or the like. In the third alternative, selection of the "semi-private" option might provide the user with options to "view/edit selection" of permitted third parties (as well as what each third party is permitted access to).

Panel 765 is otherwise similar, or identical, to panel 565 of FIG. 5. The various embodiments are not limited to the specific examples as described above with respect to FIGS. 7A-7F, and any suitable implementation in accordance with the embodiments described may be implemented as appropriate or as desired. In the various embodiments, one or more first VNFs might allow for inter-device/inter-network (autonomous) communications, while one or more second VNFs might allow for generating the GUI for mapping and access control of resources or device communications. In some cases, the one or more first VNFs and the one or more second VNFs might be the same VNFs.

Exemplary System and Hardware Implementation

FIG. 8 is a block diagram illustrating an exemplary computer or system hardware architecture, in accordance with various embodiments. FIG. 8 provides a schematic illustration of one embodiment of a computer system 800 of the service provider system hardware that can perform the methods provided by various other embodiments, as described herein, and/or can perform the functions of the customer device(s) 115, 215*a*, 315, or 545, the wireless customer device(s) 120, 215*b*, 315, or 545, the NID(s) 125, 205 or 520, the VIM(s) 130, 210, or 525, the gateway device(s) 145 or 540, the application provider server(s) 155 or 570, user devices 160 or 165, service provider or merchant server(s) 550, 555, or 575, resource nodes or hardware/network resources 170, 220, or 580, the customer portal 305, other user devices or computing systems in communication with any of these devices, virtual machines and/or virtualized network functions ("VNFs") running on any of these devices, and/or the like, as described above. It should be noted that FIG. 8 is meant only to provide a generalized illustration of various components, of which one or more (or none) of each may be utilized as appropriate. FIG. 8, therefore, broadly illustrates how individual system elements may be implemented in a relatively separated or relatively more integrated manner.

The computer or hardware system 800—which might represent an embodiment of the customer device(s) 115, 215*a*, 315, or 545, the wireless customer device(s) 120, 215*b*, 315, or 545, the NID(s) 125, 205 or 520, the VIM(s) 130, 210, or 525, the gateway device(s) 145 or 540, the application provider server(s) 155 or 570, user devices 160 or 165, service provider or merchant server(s) 550, 555, or 575, resource nodes or hardware/network resources 170, 220, or 580, the customer portal 305, other user devices or computing systems in communication with any of these devices, virtual machines and/or virtualized network functions ("VNFs") running on any of these devices, and/or the like, as described above with respect to FIGS. 1-5—is shown comprising hardware elements that can be electrically coupled via a bus 805 (or may otherwise be in communication, as appropriate). The hardware elements may include one or more processors 810, including, without limitation, one or more general-purpose processors and/or one or more special-purpose processors (such as digital signal processing chips, graphics acceleration processors, and/or the like); one or more input devices 815, which can include, without limitation, a mouse, a keyboard and/or the like; and one or more output devices 820, which can include, without limitation, a display device, a printer, and/or the like.

The computer or hardware system 800 may further include (and/or be in communication with) one or more storage devices 825, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 800 might also include a communications subsystem 830, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 830 may permit data to be exchanged with a network (such as the network described below, to name one example), with other computer or hardware systems, and/or with any other devices described herein. In many embodiments, the computer or hardware system 800 will further comprise a working memory 835, which can include a RAM or ROM device, as described above.

The computer or hardware system 800 also may comprise software elements, shown as being currently located within the working memory 835, including an operating system 840, device drivers, executable libraries, and/or other code, such as one or more application programs 845, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 825 described above. In some cases, the storage medium might be incorporated within a computer system, such as the system 800. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 800 and/or might take the form of source and/or installable code, which, upon compilation and/or installation on the computer or hardware system 800 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 800) to perform methods in accordance with various embodiments of the invention. According to a set of embodiments, some or all of the procedures of such methods are performed by the computer or hardware system 800 in response to processor 810 executing one or more sequences of one or more instructions (which might be incorporated into the operating system 840 and/or other code, such as an application program 845) contained in the working memory 835. Such instructions may be read into the working memory 835 from another computer readable medium, such as one or more of the storage device(s) 825. Merely by way of example, execution of the sequences of instructions contained in the working memory 835 might cause the processor(s) 810 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 800, various computer readable media might be involved in providing instructions/code to processor(s) 810 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 825. Volatile media includes, without limitation, dynamic memory, such as the working memory 835. In some alternative embodiments, a computer readable medium may take the form of transmission media, which includes, without limitation, coaxial cables, copper wire and fiber optics, including the wires that comprise the bus 805, as well as the various components of the communication subsystem 830 (and/or the media by which the communications subsystem 830 provides communication with other devices). In an alternative set of embodiments, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 800. These signals, which might be in the form of electromagnetic signals, acoustic signals, optical signals, and/or the like, are all examples of carrier waves on which instructions can be encoded, in accordance with various embodiments of the invention.

The communications subsystem 830 (and/or components thereof) generally will receive the signals, and the bus 805 then might carry the signals (and/or the data, instructions, etc. carried by the signals) to the working memory 835, from which the processor(s) 805 retrieves and executes the instructions. The instructions received by the working memory 835 may optionally be stored on a storage device 825 either before or after execution by the processor(s) 810.

As noted above, a set of embodiments comprises methods and systems for implementing IoT functionality, and, in some cases, for implementing customer-based IoT functionality and/or implementing customer-based IoT—transparent privacy functionality. FIG. 9 illustrates a schematic diagram of a system 900 that can be used in accordance with one set of embodiments. The system 900 can include one or more user computers or user devices 905. A user computer or user device 905 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer or user device 905 can also have any of a variety of applications, including one or more applications configured to perform methods provided by various embodiments (as described above, for example), as well as one or more office applications, database client and/or server applications, and/or web browser applications. Alternatively, a user computer or user device 905 can be any other electronic device, such as a thin-client computer, Internet-enabled mobile telephone, and/or personal digital assistant, capable of communicating via a network (e.g., the network(s) 910 described below) and/or of displaying and navigating web pages or other types of electronic documents. Although the exemplary system 900 is shown with two user computers or user devices 905, any number of user computers or user devices can be supported.

Certain embodiments operate in a networked environment, which can include a network(s) 910. The network(s) 910 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 910 can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol, such as the IEEE 802.15 protocols (e.g., Zigbee, etc.), Z-Wave, and/or the like; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 915. Each of the server computers 915 may be configured with an operating system, including, without limitation, any of those discussed above, as well as any commercially (or freely) available server operating systems. Each of the servers 915 may also be running one or more applications, which can be configured to provide services to one or more clients 905 and/or other servers 915.

Merely by way of example, one of the servers 915 might be a data server, a web server, a cloud computing device(s), or the like, as described above. The data server might include (or be in communication with) a web server, which can be used, merely by way of example, to process requests for web pages or other electronic documents from user computers 905. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 905 to perform methods of the invention.

The server computers 915, in some embodiments, might include one or more application servers, which can be configured with one or more applications accessible by a client running on one or more of the client computers 905 and/or other servers 915. Merely by way of example, the server(s) 915 can be one or more general purpose computers capable of executing programs or scripts in response to the user computers 905 and/or other servers 915, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer or user device 905 and/or another server 915. In some embodiments, an application server can perform one or more of the processes for implementing IoT functionality, and, in some cases, for implementing customer-based IoT functionality and/or implementing customer-based IoT—transparent privacy functionality, or the like, as described in detail above. Data provided by an application server may be formatted as one or more web pages (comprising HTML, JavaScript, etc., for example) and/or may be forwarded to a user computer 905 via a web server (as described above, for example). Similarly, a web server might receive web page requests and/or input data from a user computer 905 and/or forward the web page requests and/or input data to an application server. In some cases, a web server may be integrated with an application server.

In accordance with further embodiments, one or more servers 915 can function as a file server and/or can include one or more of the files (e.g., application code, data files, etc.) necessary to implement various disclosed methods, incorporated by an application running on a user computer 905 and/or another server 915. Alternatively, as those skilled in the art will appreciate, a file server can include all necessary files, allowing such an application to be invoked remotely by a user computer or user device 905 and/or server 915.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 920. The location of the database(s) 920 is discretionary: merely by way of example, a database 920a might reside on a storage medium local to (and/or resident in) a server 915a (and/or a user computer or user device 905). Alternatively, a database 920b can be remote from any or all of the computers 905, 915, so long as it can be in communication (e.g., via the network 910) with one or more of these. In a particular set of embodiments, a database 920 can reside in a storage-area network ("SAN") familiar to those skilled in the art. (Likewise, any necessary files for performing the functions attributed to the computers 905, 915 can be stored locally on the respective computer and/or remotely, as appropriate.) In one set of embodiments, the database 920 can be a relational database, such as an Oracle database, that is adapted to store, update, and retrieve data in response to SQL-formatted commands. The database might be controlled and/or maintained by a database server, as described above, for example.

According to some embodiments, system 900 might further comprise NID(s) 925 and/or VIM(s) 930, as described in detail above with respect to FIGS. 1-5. In some embodiments, one or more of the user device 905a, the user device 905b, the server 915a, the server 915b, the database 920a, and/or the database 920b might be in the same network 910 as one of the NID(s) 925 or the VIM(s) 930. In alternative or additional embodiments, one or more of the user device 905a, the user device 905b, the server 915a, the server 915b, the database 920a, and/or the database 920b might be in a first network 910 that is different from another network(s) 910 in which each of the NID(s) 925 or the VIM(s) 930 are located.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   providing, with a network interface device ("NID") serving as a demarcation point between a local area network ("LAN") at a customer premises and a service provider network, connectivity between the NID and each of one or more first user devices of a plurality of user devices associated with at least one of the customer premises or a user who is associated with the customer premises;
   providing a customer with a user interface to select privacy settings for Internet of Things ("IoT")-connected devices in a network;
   receiving, via the user interface, user selections for privacy settings for at least one of one or more first user devices connected to the network or one or more applications running on one or more first user devices connected to the network;
   in response to determining that the received user selections comprise a selection to restrict access to information regarding at least one portion of the at least one of one or more first user devices connected to the network or one or more applications running on one or more first user devices connected to the network, restricting, with the NID, access by a third party to the information regarding the at least one portion of the at least one of one or more first user devices connected to the network or one or more applications running on one or more first user devices connected to the network;
   based on a determination that the received user selections comprise a selection to set to privacy settings to private for one of a software application or a virtual network function ("VNF") that is running on one or more of the plurality of user devices, restricting, with the NID, a third party from access to resources mapped to the one or more of the plurality of user devices on which the one of the software application or the VNF that is running;
   determining, with a virtual infrastructure manager ("VIM"), a type and amount of resources required by each of the one or more first user devices to each perform one or more functions;
   determining, with the VIM, which resource nodes of a plurality of resource nodes in communication with the ND possess desired types and amount of resources that are determined to be required; and
   allocating, with the VIM, resources to each of the one or more first user devices based at least in part on the determined type and amount of resources required by each of the one or more first user devices to each perform the one or more functions, based at least in part on the determined resource nodes having the desired types and amount of resources determined to be required, and based at least in part on the mapping of each of the one or more first user devices with each of the one or more second user devices and with each resource node.

2. The method of claim 1, further comprising:
   sending, with the NID, at least one virtual network function ("VNF") to each of the one or more first user devices via the LAN, the at least one VNF comprising a device identifier and a LAN device interconnection VNF;
   wherein restricting, with the NID, access by a third party to the information regarding the at least one portion of the at least one of one or more first user devices connected to the network or one or more applications running on one or more first user devices connected to the network comprises restricting, with the NID and using the at least one VNF sent to each of the one or more first user devices, access by a third party to the information regarding the at least one portion of the at least one of one or more first user devices connected to the network or one or more applications running on one or more first user devices connected to the network.

3. The method of claim 1, further comprising:
   based on a determination that the received user selections comprise a selection to set to privacy settings to public for one of the software application ("app") or the VNF that is running on one or more of the plurality of user devices, providing, with the NID, a third party with at least one of:
   access to the one of the app or the VNF that is running on the one or more of the plurality of user devices;
   access to information regarding resources mapped to the one or more of the plurality of user devices on which the one of the app or the VNF that is running;
   access to information regarding all resources registered to the NID that are mapped to the one or more of the plurality of user devices;
   access to information regarding all resources registered to the NID;
   access to the resources mapped to the one or more of the plurality of user devices on which the one of the app or the VNF that is running;
   access to all resources registered to the NID that are mapped to the one or more of the plurality of user devices; or
   access to the NID.

4. The method of claim 1, wherein the privacy settings for at least one of one or more user devices connected to the network or one or more applications running on one or more user devices connected to the network comprise at least one of:
   option to allow or deny third party general access;
   option to allow or deny third party selective access to information about device type of at least one user device of the one or more user devices;
   option to allow or deny third party selective access to information about use of at least one user device of the one or more user devices;
   option to allow or deny third party selective access to information about one or more applications running on at least one user device of the one or more user devices;
   option to allow or deny third party selective access to information about one or more NFVs running on at least one user device of the one or more user devices;
   option to allow or deny third party selective access to information about types of resource usage on at least one user device of the one or more user devices; or option to allow or deny third party selective access to information about amount of resource use on at least one user device of the one or more user devices.

5. The method of claim 1, further comprising:
receiving, via the user interface, user selections for privacy settings for the NID, wherein the privacy settings for the NID comprises at least one of:
option to allow or deny third party general access;
option to allow or deny third party selective access to information about device type of at least one user device of the one or more user devices that is mapped to the NID;
option to allow or deny third party selective access to information about use of at least one user device of the one or more user devices that is mapped to the NID;
option to allow or deny third party selective access to information about one or more applications running on at least one user device of the one or more user devices that is mapped to the NID;
option to allow or deny third party selective access to information about one or more NFVs running on at least one user device of the one or more user devices that is mapped to the NID;
option to allow or deny third party selective access to information about types of resource usage on at least one user device of the one or more user devices that is mapped to the NID;
option to allow or deny third party selective access to information about amount of resource use on at least one user device of the one or more user devices that is mapped to the NID;
option to allow or deny third party selective access to information about device types of all devices in the LAN;
option to allow or deny third party selective access to information about use of all devices in the LAN;
option to allow or deny third party selective access to information about one or more applications running on all devices in the LAN;
option to allow or deny third party selective access to information about one or more VNF running on all devices in the LAN;
option to allow or deny third party selective access to information about types of resource usage on all devices in the LAN; or
option to allow or deny third party selective access to information about amount of resource use on all devices in the LAN.

6. The method of claim 1, wherein providing connectivity between the NID and each of the one or more first user devices of the plurality of user devices associated with at least one of the customer premises or the user who is associated with the customer premises comprises:
determining, with the NID, whether at least one second user device of the one or more first user devices is associated with at least one of the customer premises or the user who is associated with the customer premises;
authenticating, with the NID, each of the at least one second user device of the one or more first user devices as being associated with at least one of the customer premises or the user who is associated with the customer premises, based at least in part on a determination that each of the at least one second user device of the one or more first user devices is associated with at least one of the customer premises or the user who is associated with the customer premises; and
providing, with the NID, connectivity between the NID and each of the at least one second user device, in response to authenticating each of the at least one of the one or more user devices.

7. The method of claim 2, further comprising:
associating, with the NID, each of the one or more first user devices, prior to sending the at least one VNF to each of the one or more first user devices.

8. The method of claim 7, wherein associating each of the one or more first user devices comprises:
receiving, with the NID and from at least one third user device of the plurality of user devices, a user request to associate each of the one or more first user devices with the NID; and
associating, with the NID, each of the one or more first user devices based at least in part on the user request to associate each of the one or more first user devices with the NID.

9. The method of claim 7, wherein associating each of the one or more first user devices comprises:
determining, with the NID, whether at least one second user device of the one or more first user devices is connected to the LAN for the first time; and
automatically associating, with the NID, each of the at least one second user device in response to a determination that at least one second user device is connected to the LAN for the first time.

10. The method of claim 2, further comprising:
registering, with at least one of the NID or a network device in the service provider network, each of the one or more first user devices, prior to sending the at least one VNF to each of the one or more first user devices.

11. The method of claim 10, wherein registering each of the one or more first user devices comprises:
receiving, with at least one of the NID or the network device in the service provider network and from at least one third user device of the plurality of user devices, a user request to register each of the one or more first user devices with the NID; and
registering, with at least one of the NID or the network device in the service provider network, each of the one or more first user devices based at least in part on the user request to register each of the one or more first user devices with the NID.

12. The method of claim 10, wherein registering each of the one or more first user devices comprises:
determining, with at least one of the NID or the network device in the service provider network, whether at least one second user device of the one or more first user devices is connected to at least one of the LAN or the service provider network for the first time; and
automatically registering, with at least one of the NID or the network device in the service provider network, each of the at least one second user device in response to a determination that at least one second user device is connected to at least one of the LAN or the service provider network for the first time.

13. The method of claim 1, further comprising:
sending, with the NID, one or more VNFs to at least one network device in the service provider network that is accessible via one of LAN-to-network service chaining or network-to-LAN service chaining, each of the one or more VNFs comprising a device identifier and a LAN device interconnection VNF.

14. The method of claim 1, further comprising:
mapping, with the VIM that is communicatively coupled to the NID, each of the one or more first user devices with each of one or more second user devices of the plurality of user devices associated with at least one of the customer premises or the user who is associated with the customer premises, and with each resource node of the plurality of resource nodes in communication with the NID, based at least in part on first user input received via at least one third user device of the plurality of user devices.

15. The method of claim 1, wherein allocating resources to each of the one or more first user devices is further based on second user input received via the at least one third user device of the plurality of user devices, wherein the second user input indicates at least one of access permissions for one or more of the plurality of user devices associated with at least one of the customer premises or the user who is associated with the customer premises, or resource usage permissions for the one or more of the plurality of user devices associated with at least one of the customer premises or the user who is associated with the customer premises.

16. The method of claim 14, further comprising:
bridging the NID with one or more second NIDs that are communicatively coupled to the service provider network; and
mapping, with the VIM, each of the one or more first user devices with each of the one or more second user devices of the plurality of user devices associated with at least one of the customer premises or the user who is associated with the customer premises, with each resource node of a plurality of resource nodes in communication with the NID, with each of one or more fifth user devices associated with at least one second customer premises that is separate from the customer premises, and with each resource node of a plurality of second resource nodes in communication with at least one second NID of the one or more second NIDs.

17. A system, comprising:
a network interface device ("NID") serving as a demarcation point between a local area network ("LAN") at a customer premises and a service provider network, the NID comprising:
at least one first processor;
a first non-transitory computer readable medium in communication with the at least one first processor, the first non-transitory computer readable medium having encoded thereon computer software comprising a first set of instructions that, when executed by the at least one first processor, causes the NID to perform one or more operations, the first set of instructions comprising:
instructions for providing, connectivity between the NID and each of one or more first user devices of a plurality of user devices associated with at least one of the customer premises or a user who is associated with the customer premises;
instructions for, in response to determining that user selections that are received, via a user interface that is provided to a customer to select privacy settings for Internet of Things ("IoT")-connected devices in a network, comprise a selection to restrict access to information regarding at least one portion of at least one of one or more first user devices connected to the network or one or more applications running on one or more first user devices connected to the network, restricting access by a third party to the information regarding the at least one portion of the at least one of one or more first user devices connected to the network or one or more applications running on one or more first user devices connected to the network;
instructions for, based on a determination that the received user selections comprise a selection to set to privacy settings to private for one of a software application or a virtual network function ("VNF") that is running on one or more of the plurality of user devices, restricting, with the NID, a third party from access to resources mapped to the one or more of the plurality of user devices on which the one of the software application or the VNF that is running;
instructions for determining, with a virtual infrastructure manager ("VIM"), a type and amount of resources required by each of the one or more first user devices to each perform one or more functions;
instructions for determining, with the VIM, which resource nodes of a plurality of resource nodes in communication with the NID possess desired types and amount of resources that are determined to be required; and
instructions for allocating, with the VIM, resources to each of the one or more first user devices based at least in part on the determined type and amount of resources required by each of the one or more first user devices to each perform the one or more functions, based at least in part on the determined resource nodes having the desired types and amount of resources determined to be required, and based at least in part on the mapping of each of the one or more first user devices with each of the one or more second user devices and with each resource node.

18. A network interface device ("NID") serving as a demarcation point between a local area network ("LAN") at a customer premises and a service provider network, the NID comprising:
at least one processor;
a non-transitory computer readable medium in communication with the at least one processor, the computer readable medium having encoded thereon computer software comprising a set of instructions that, when executed by the at east one processor, causes the NID to perform one or more operations, the set of instructions comprising:
instructions for providing connectivity between the NID and each of one or more first user devices of a plurality of user devices associated with at least one of the customer premises or a user who is associated with the customer premises;
instructions for, in response to determining that user selections that are received, via a user interface that is provided to a customer to select privacy settings for Internet of Things ("IoT")-connected devices in a network, comprise a selection to restrict access to information regarding at least one portion of at least one of one or more first user devices connected to the network or one or more applications running on one or more first user devices connected to the network, restricting access by a third party to the information regarding the at least one portion of the at least one of one or more first user devices connected to the network or one or more applications running on one or more first user devices connected to the network;
instructions for, based on a determination that the received user selections comprise a selection to set to privacy settings to private for one of a software application or a virtual network function ("VNF") that is running on one or more of the plurality of user devices, restricting, with the NID, a third party from access to resources mapped to the one or more of the plurality of user devices on which the one of the software application or the VNF that is running;

instructions for determining, with a virtual infrastructure manager ("VIM"), a type and amount of resources required by each of the one or more first user devices to each perform one or more functions;

instructions for determining, with the VIM, which resource nodes of a plurality of resource nodes in communication with the NID possess desired types and amount of resources that are determined to be required; and instructions for allocating, with the VIM, resources to each of the one or more first user devices based at least in part on the determined type and amount of resources required by each of the one or more first user devices to each perform the one or more functions, based at least in part on the determined resource nodes having the desired types and amount of resources determined to be required, and based at least in part on the mapping of each of the one or more first user devices with each of the one or more second user devices and with each resource node.

* * * * *